(12) United States Patent
Shin et al.

(10) Patent No.: US 11,973,555 B2
(45) Date of Patent: Apr. 30, 2024

(54) METHOD AND DEVICE FOR MEASURING AND REPORTING CHANNEL STATE IN SIDELINK COMMUNICATION

(71) Applicant: Samsung Electronics Co., Ltd., Gyeonggi-do (KR)

(72) Inventors: Cheolkyu Shin, Gyeonggi-do (KR); Younsun Kim, Gyeonggi-do (KR); Hyunseok Ryu, Gyeonggi-do (KR); Jonghyun Bang, Gyeonggi-do (KR); Jeongho Yeo, Gyeonggi-do (KR); Jinyoung Oh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 360 days.

(21) Appl. No.: 17/627,553

(22) PCT Filed: Jul. 16, 2020

(86) PCT No.: PCT/KR2020/009390
§ 371 (c)(1),
(2) Date: Jan. 14, 2022

(87) PCT Pub. No.: WO2021/010773
PCT Pub. Date: Jan. 21, 2021

(65) Prior Publication Data
US 2022/0329301 A1    Oct. 13, 2022

(30) Foreign Application Priority Data

Jul. 17, 2019 (KR) .................. 10-2019-0086498
Aug. 16, 2019 (KR) .................. 10-2019-0100520

(51) Int. Cl.
*H04B 7/06* (2006.01)
*H04L 1/00* (2006.01)
(Continued)

(52) U.S. Cl.
CPC ......... *H04B 7/0626* (2013.01); *H04B 7/0632* (2013.01); *H04L 1/0003* (2013.01);
(Continued)

(58) Field of Classification Search
None
See application file for complete search history.

(56) References Cited

U.S. PATENT DOCUMENTS

2020/0163155 A1    5/2020 Lee et al.
2021/0337509 A1 * 10/2021 Selvanesan ....... H04W 72/0446
2022/0225136 A1 *  7/2022 Park ..................... H04W 76/19

FOREIGN PATENT DOCUMENTS

KR    10-2020-0127850    11/2020
WO    WO 2018/203669    11/2018

OTHER PUBLICATIONS

PCT/ISA/210 Search Report issued on PCT/KR2020/009390, Sep. 25, 2020, pp. 5.
(Continued)

*Primary Examiner* — Hong S Cho
(74) *Attorney, Agent, or Firm* — The Farrell Law Firm, P.C.

(57) ABSTRACT

The present disclosure relates to a communication technique for combining, with IoT technology, a 5G communication system for supporting a higher data transmission rate than a 4G system, and a system therefor. The present disclosure may be applied to intelligent services, such as smart homes, smart buildings, smart cities, smart cars or connected cars, health care, digital education, retail businesses, security and safety related services, and the like on the basis of 5G communication technologies and IoT-related technologies. A method of a transmitting terminal, according to an embodiment of the present invention, comprises the steps of: receiving, from a receiving terminal, channel state information (CSI) determined on the basis of channel busy ratio
(Continued)

(CBR) information, and the CBR information; determining a transmission parameter on the basis of the CSI; and transmitting the transmission parameter to the receiving terminal.

15 Claims, 13 Drawing Sheets

(51) Int. Cl.
  *H04W 28/02* (2009.01)
  *H04W 72/02* (2009.01)
  *H04W 72/20* (2023.01)
(52) U.S. Cl.
  CPC ....... *H04W 28/0289* (2013.01); *H04W 72/02* (2013.01); *H04W 72/20* (2023.01)

(56) References Cited

OTHER PUBLICATIONS

PCT/ISA/237 Written Opinion issued on PCT/KR2020/009390, Sep. 25, 2020, pp. 5.
Samsung, 3GPP TSG RAN WG1 #97, R1-1906949, Reno, USA, "On Sidelink CSI Procedure", May 3, 2019, pp. 5.
Ericsson, 3GPP TSG RAN WG4 Meeting #80bis, R4-168516, Ljubljana, Slovenia, "Requirements on measurements for congestion control for V2X", Oct. 19, 2016, pp. 8.
LG Electronics, 3GPP TSG RAN WG1 #97, R1-1907019, Reno, USA, "Disussion on QoS management for NR sidelink", May 4, 2019, pp. 5.
Intel Corporation, 3GPP TSG RAN WG1 Meeting #88, R1-1702142, Athens, Greece, "Details of congestion control for V2V communication", Feb. 7, 2017, pp. 9.

* cited by examiner ial service
METHOD AND DEVICE FOR MEASURING AND REPORTING CHANNEL STATE IN SIDELINK COMMUNICATION

TECHNICAL FIELD

The disclosure relates to a mobile communication system, and more particularly, to a method and device for a receiving terminal to measure a channel state and report the channel state to a transmitting terminal in a process in which a vehicle terminal supporting vehicle-to-everything (hereinafter, V2X) transmits and receives information to and from another vehicle terminal and a pedestrian portable terminal using a sidelink.

BACKGROUND ART

In order to satisfy increases in demand for wireless data traffic now that a 4G communication system is commercially available, efforts are being made to develop an enhanced 5G communication system or a pre-5G communication system. Therefore, a 5G communication system or a pre-5G communication system is referred to as a beyond 4G network communication system or a post LTE system. In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna are being discussed for the 5G communication system. Further, in order to enhance networks in the 5G communication system, the technologies of an innovative small cell, advanced small cell, cloud radio access network (cloud RAN), ultra-dense network, device to device communication (D2D), wireless backhaul, moving network-, cooperative communication, coordinated multi-points (CoMP), and interference cancellation are being developed. Further, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, are being developed for the 5G system.

Innovation of Internet from a human-centered connection network in which a human generates and consumes information to an Internet of Things (IoT) network that gives and receives and processes information to and from distributed constituent elements such as things has occurred. Internet of Everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things. In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through convergence and complex connections between existing information technology (IT) and various industries.

Accordingly, various attempts for applying a 5G communication system to an IoT network have been undertaken. For example, 5G communication technologies such as a sensor network, machine to machine (M2M), and machine type communication (MTC) have been implemented by the technique of beamforming, MIMO, and array antenna. Application of a cloud RAN as the foregoing big data processing technology may be an example of convergence of 5G technology and IoT technology.

DISCLOSURE OF INVENTION

Technical Problem

The disclosure relates to a mobile communication system, and more particularly, to a method and device for a receiving terminal to measure a channel state and report the channel state to a transmitting terminal in a process in which a vehicle terminal supporting V2X transmits and receives information to and from another vehicle terminal and a pedestrian portable terminal using a sidelink.

Specifically, the disclosure proposes a method of transmitting a reference signal for a transmitting terminal to measure a channel state in a sidelink, and a method for a receiving terminal to measure and report a channel through the method.

Solution to Problem

According to the disclosure, a method performed by a transmitting terminal includes receiving, from a receiving terminal, channel busy ratio (CBR) information and channel state information (CSI) determined based on the CBR information; determining a transmission parameter based on the CSI; and transmitting the transmission parameter to the receiving terminal.

According to the disclosure, a method performed by a receiving terminal includes determining channel state information (CSI) based on channel busy ratio (CBR) information; transmitting the CSI; and receiving a transmission parameter determined based on the CSI.

According to the disclosure, a transmitting terminal includes a transceiver; and a controller configured to receive channel busy ratio (CBR) information and channel state information (CSI) determined based on the CBR information from a receiving terminal, to determine a transmission parameter based on the CSI, and to transmit the transmission parameter to the receiving terminal.

According to the disclosure, a receiving terminal includes a transceiver; and a controller configured to determine channel state information (CSI) based on channel busy ratio (CBR) information, to transmit the CSI, and to receive a transmission parameter determined based on the CSI.

Advantageous Effects of Invention

According to the disclosure, by proposing a method for a receiving terminal to measure a channel state and report the channel state to a transmitting terminal in sidelink communication, it is possible to increase transmission efficiency of a sidelink. Further, the channel state reporting method according to the proposed method can be effectively used for congestion control.

In order for the receiving terminal to more stably support link state measurement through the method, a reference signal transmission method according to the proposed method of the disclosure can be used.

MODE FOR THE INVENTION

Figure 1A:
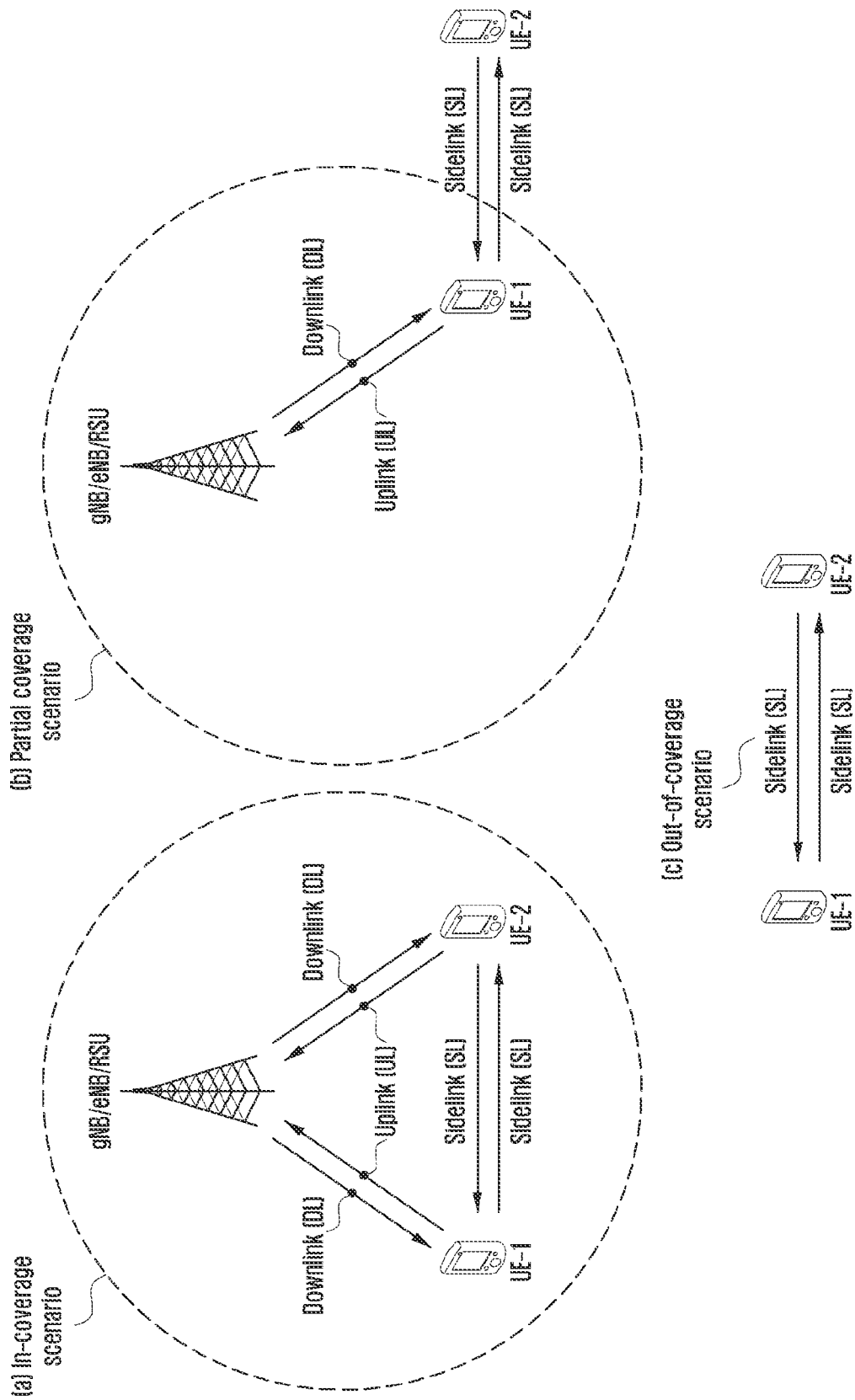
FIG. 1A is a diagram illustrating a system according to an embodiment of the disclosure.

Hereinafter, embodiments of the disclosure will be described in detail with reference to the accompanying drawings.

In describing the embodiments, descriptions of technical contents that are well known in the technical field to which the disclosure pertains and that are not directly related to the disclosure will be omitted. This is to more clearly convey the gist of the disclosure without obscuring the gist of the disclosure by omitting unnecessary description.

For the same reason, some components are exaggerated, omitted, or schematically illustrated in the accompanying drawings. Further, the size of each component does not fully reflect the actual size. In each drawing, the same reference numerals are given to the same or corresponding components.

Advantages and features of the disclosure, and a method of achieving them will become apparent with reference to the embodiments described below in detail in conjunction with the accompanying drawings. However, the disclosure is not limited to the embodiments disclosed below, but may be implemented in various different forms, and only the present embodiments enable the disclosure to be complete, and are provided to fully inform the scope of the disclosure to those of ordinary skill in the art to which the disclosure pertains, and the disclosure is only defined by the scope of the claims. Like reference numerals refer to like components throughout the specification.

In this case, it will be understood that each block of message flow diagrams and combinations of the message flow diagrams may be performed by computer program instructions. Because these computer program instructions may be mounted in a processor of a general purpose computer, special purpose computer, or other programmable data processing equipment, the instructions performed by a processor of a computer or other programmable data processing equipment generate a means that performs functions described in the message flow diagram block(s). Because these computer program instructions may be stored in a computer usable or computer readable memory that may direct a computer or other programmable data processing equipment in order to implement a function in a particular manner, the instructions stored in the computer usable or computer readable memory may produce a production article containing instruction means for performing the function described in the message flow diagram block(s). Because the computer program instructions may be mounted on a computer or other programmable data processing equipment, a series of operational steps are performed on the computer or other programmable data processing equipment to generate a computer-executed process; thus, instructions for performing a computer or other programmable data processing equipment may provide steps for performing functions described in the message flow diagram block(s).

Further, each block may represent a module, a segment, or a portion of a code including one or more executable instructions for executing specified logical function(s). Further, it should be noted that in some alternative implementations, functions recited in the blocks may occur out of order. For example, two blocks illustrated one after another may in fact be performed substantially simultaneously, or the blocks may be sometimes performed in the reverse order according to the corresponding function.

In this case, a term '-unit' used in this embodiment means software or hardware components such as a field programmable gate array (FPGA) or an application specific integrated circuit (ASIC), and '-unit' performs certain roles. However, '-unit' is not limited to software or hardware. '-unit' may be configured to reside in an addressable storage medium or may be configured to reproduce one or more processors. Therefore, as an example, '-unit' includes components such as software components, object-oriented software components, class components, and task components, processes, functions, properties, procedures, subroutines, segments of program code, drivers, firmware, microcode, circuitry, data, databases, data structures, tables, arrays, and variables. Functions provided in the components and '-units' may be combined into a smaller number of components and '-units' or may be further separated into additional components and '-units'. Further, components and '-units' may be implemented to reproduce one or more CPUs in a device or secure multimedia card. Further, in an embodiment, '-unit' may include one or more processors.

In describing in detail the embodiments of the disclosure, a packet core (5G system, 5G core network, or next generation core (NG core)), which is a core network and a radio access network New RAN (NR) on a 5G mobile communication standard disclosed by 3rd generation partnership project long term evolution (3GPP), which is a mobile communication standard standardization organization are a main target, but the main gist of the disclosure is applicable to other communication systems having a similar technical background with slight modifications within the scope not significantly departing from the scope of the disclosure, which will be possible at the discretion of a person skilled in the art of the disclosure.

In the 5G system, in order to support network automation, a network data collection and analysis function (NWDAF), which is a network function that provides a function of analyzing and providing data collected in a 5G network, may be defined. The NWDAF may collect/store/analyze information from the 5G network and provide a result thereof to an unspecified network function (NF), and an analysis result thereof may be used independently in each NF.

Hereinafter, for convenience of description, some terms and names defined in the 3GPP standard (standards of 5G, NR, LTE, or similar systems) may be used. However, the disclosure is not limited by terms and names, and may be equally applied to systems conforming to other standards.

Further, a term for identifying an access node used in the following description, a term referring to a network entity, a term referring to messages, a term referring to an interface between network entities, and terms referring to various identification information and the like are exemplified for convenience of description. Therefore, the terms are not limited to terms used in the disclosure, and other terms referring to objects having equivalent technical meanings may be used.

In order to satisfy increases in demand for wireless data traffic now that a 4G communication system is commercially available, efforts are being made to develop an enhanced 5G communication system (NR, new radio). In order to achieve a high data transmission rate, the 5G communication system is designed to enable resources in a mmWave band (e.g., 28 GHz frequency band). In order to mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna have been discussed for the 5G communication system. Further, unlike LTE, the 5G communication system supports various subcarrier spacing such as 30 kHz, 60 kHz, and 120 kHz, including 15 kHz, a physical control channel uses polar coding, and a physical data channel uses a low density parity identify (LDPC). Further, CP-OFDM as well as DFT-S-OFDM is used as a waveform for uplink transmission. In LTE, hybrid ARQ (HARQ) retransmission in units of transport block (TB) is supported, whereas 5G may additionally support code block group (CBG)-based HARQ retransmission in which a plurality of CBs (code blocks) are bundled.

Further, in order to enhance networks in the 5G communication system, the technologies of an innovative small cell, advanced small cell, cloud radio access network (cloud RAN), ultra-dense network, device to device communication (D2D), wireless backhaul, vehicle to everything (V2X) network, cooperative communication, coordinated multipoints (CoMP), and interference cancellation are being developed.

Innovation of Internet from a human-centered connection network in which a human generates and consumes information to an Internet of Things (IoT) network that gives and receives and processes information to and from distributed constituent elements such as things has occurred. Internet of Everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things. In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through convergence and complex connections between existing information technology (IT) and various industries.

Accordingly, various attempts for applying a 5G communication system to an IoT network have been undertaken. For example, 5G communication technologies such as a sensor network, machine to machine (M2M), and machine type communication (MTC) have been implemented by the technique of beamforming, MIMO, and array antenna. Application of a cloud RAN as the foregoing big data processing technology may be an example of convergence of 5G technology and IoT technology. In this way, a plurality of services may be provided to a user in a communication system, and in order to provide such a plurality of services to a user, a method and device using the same are required to provide each service within the same time period according to characteristics. Various services provided in the 5G communication system are being studied, and one of them is a service that satisfies requirements of low latency and high reliability.

In the case of vehicle communication, an LTE-based V2X standardization work has been completed in 3GPP Rel-14 and Rel-15 based on a Device-to-Device (D2D) communication structure, and efforts are currently underway to develop V2X based on 5G new radio (NR). NR V2X is planned to support unicast communication, groupcast (or multicast) communication, and broadcast communication between UEs. Further, NR V2X aims to provide more advanced services such as platooning, advanced driving, extended sensor, and remote driving, unlike LTE V2X, which aims to transmit and receive basic safety information necessary for vehicle road driving.

Because only broadcast communication was supported in a sidelink of D2D and V2X based on the existing LTE system, a function in which a receiving UE measures a channel state and reports the channel state to a transmitting UE was not supported. In the case of NR V2X, not only broadcast communication but also unicast and groupcast communication between UEs are considered, and because it aims to support advanced services requiring more improved transmission efficiency, a function in which the receiving UE reports a channel state to the transmitting UE is required. Specifically, measurement and report of the channel state in the sidelink is a function in which the receiving UE measures a channel using a reference signal transmitted by the transmitting UE and feeds back sidelink channel state information (hereinafter, SL CSI) to the transmitting UE using the measured channel. In this case, a reference signal transmitted by the transmitting UE in order for the transmitting UE to receive a report of SL CSI in the sidelink is referred to as a sidelink channel state information reference signal (SL CSI-RS). However, terms used in the disclosure may be changed, and terms such as SL CSI-RS, CSI-RS, and a reference signal may be used interchangeably.

The receiving UE estimates a channel state using the SL CSI-RS, thereby reporting the SL CSI to the transmitting UE. Accordingly, the transmitting UE may use SL CSI information so as to allocate transmission resources and determine transmission parameter. Further, the receiving UE may measure SL reference signal received power (RSRP) using the SL CSI-RS transmitted by the transmitting UE and feed SL RSRP back to the transmitting UE. The transmitting UE may use the information to perform power control. Further, the receiving UE may perform radio link monitoring (RLM) using the SL CSI-RS transmitted by the transmitting UE.

In the case of a Uu interface between a base station and a UE, when the UE reports SL CSI information to the base station, the base station only refers to the SL CSI information upon determining a transmission parameter, but in the case of a V2X sidelink, a different operation may be considered. Considering that the V2X sidelink is communication between UEs, a method of enabling the transmitting UE to follow SL CSI information transmitted by the receiving UE may be considered.

Further, in the V2X sidelink, a configuration range of the transmission parameter may be determined according to whether the corresponding channel is congested. This is a congestion control function in which the UE determines whether to access the channel when the channel is congested, and configures a transmission parameter so as to increase the transmission success probability of the UE when the UE is accessed to the channel. Accordingly, the UE may measure a channel busy ratio (CBR), thereby determining a configuration range of the transmission parameter. Therefore, in a process in which the receiving UE transmits SL CSI or when the transmitting UE determines a transmission parameter based on the SL CSI reported by the receiving UE, the CBR may be considered together.

Further, in a case in which periodic SL CSI-RS transmission is not supported in the V2X sidelink, when the receiving UE estimates a channel, measures SL RSRP, or performs RLM using this, measurement inaccuracy may occur. Therefore, a UE operation to solve such a problem should be defined. However, there is not any discussion related to this. Therefore, the disclosure proposes CSI-RS transmission, measurement, and CSI reporting method appropriate for a transmission scenario in the sidelink in consideration of a transmission scenario in the sidelink. Specifically, in the case of a unicast operation between UEs in the sidelink, a method and device for operating a UE for SL CSI-RS transmission and SL CSI reporting method in consideration of CBR reflection, SL RSRP reporting, and RLM support are proposed.

An embodiment of the disclosure is proposed to support the above-described scenario, and relates to a method and device for a receiving UE to measure a channel state and to report the channel state to a transmitting UE in a process where a vehicle UE supporting V2X exchanges information with another vehicle UE and a pedestrian portable UE using a sidelink. Specifically, a method for a transmitting UE to transmit a reference signal for measuring a channel state in a sidelink and a method for a receiving UE to measure and report a channel through the method are proposed. The embodiment relates to an operation of the receiving UE and the transmitting UE according to the proposed method.

FIG. 1 is a diagram illustrating a system according to an embodiment of the disclosure.

Referring to FIG. 1, FIG. 1A illustrates an example of In-Coverage (IC) in which all V2X UEs (UE-1 and UE-2) are positioned inside coverage of the base station.

All V2X UEs may receive data and control information (DL) from the base station through a downlink or transmit data and control information to the base station through an uplink (UL). In this case, the data and control information may be data and control information for V2X communication. The data and control information may be data and control information for general cellular communication. Further, V2X UEs may transmit and receive data and control information for V2X communication through a sidelink (SL).

Figure 1B:
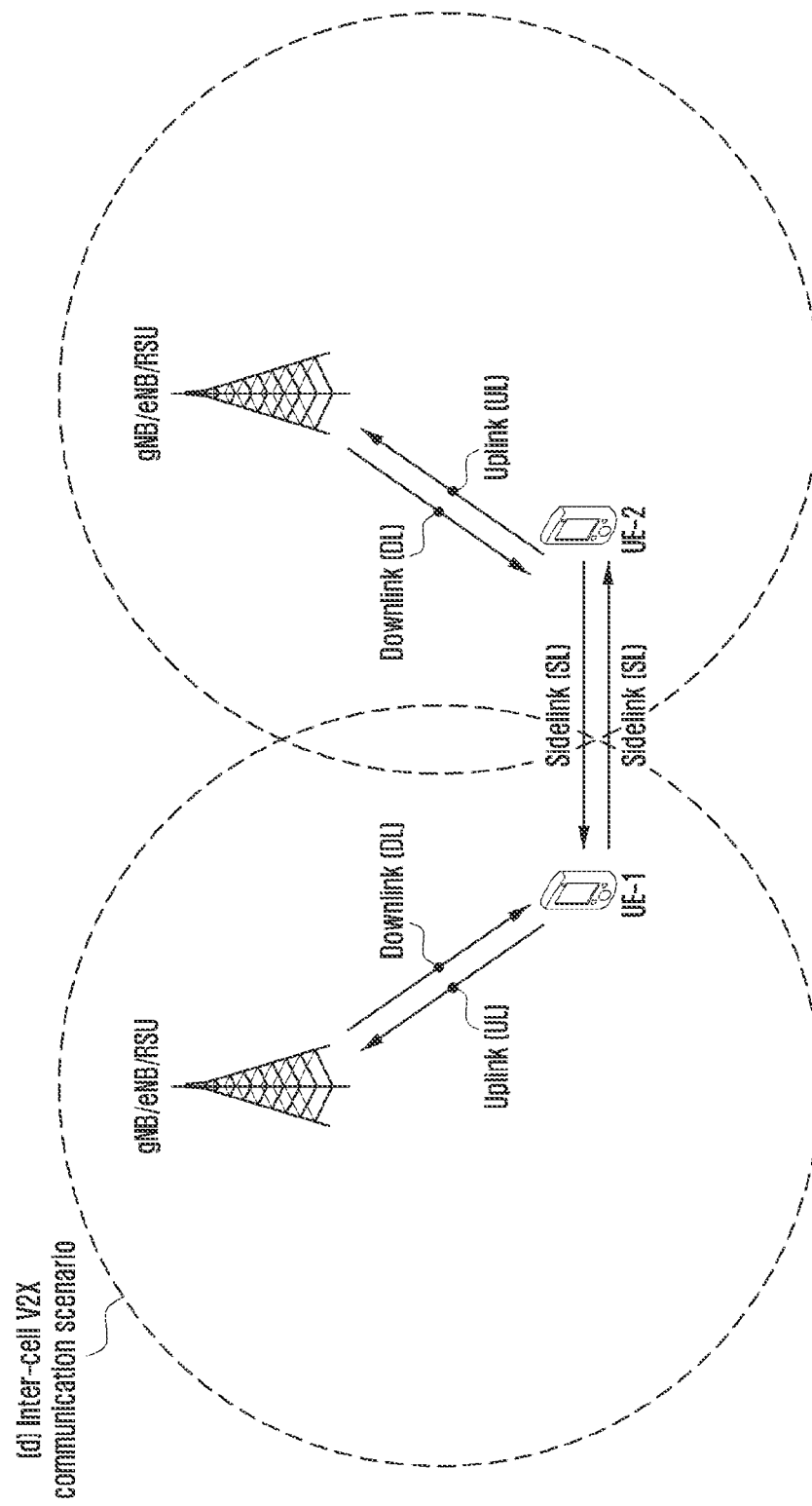
FIG. 1B is a diagram illustrating a system according to an embodiment of the disclosure.

Referring to FIG. 1, FIG. 1B illustrates an example of a case in which an UE-1 among V2X UEs is positioned inside coverage of the base station and in which an UE-2 among V2X UEs is positioned outside coverage of the base station. That is, FIG. 1B illustrates an example of partial coverage (PC) in which another V2X UE (UE-2) is positioned outside coverage of the base station.

The UE-1 positioned inside coverage of the base station may receive data and control information from the base station through a downlink or transmit data and control information to the base station through an uplink.

The UE-2 positioned outside coverage of the base station cannot receive data and control information from the base station through the downlink, and cannot transmit data and control information to the base station through the uplink.

The UE-2 may transmit and receive data and control information for V2X communication to and from the UE-1 through the sidelink.

Referring to FIG. 1, FIG. 1C illustrates an example of a case in which all V2X UEs are positioned at out-of coverage (OOC) of the base station.

Therefore, the UE-1 and the UE-2 cannot receive data and control information from the base station through the downlink, and cannot transmit data and control information to the base station through the uplink.

The UE-1 and the UE-2 may transmit and receive data and control information for V2X communication through the sidelink.

Referring to FIG. 1, FIG. 1D illustrates an example of a scenario of performing V2X communication between the UE-1 and the UE-2 positioned in different cells. Specifically, FIG. 1D illustrates a case in which the UE-1 and the UE-2 are accessed to different base stations (RRC connection state) or camped (RRC connection release state, i.e., RRC idle state). In this case, the UE-1 may be a V2X transmitting UE and the UE-2 may be a V2X receiving UE. Alternatively, the UE-1 may be a V2X receiving UE, and the UE-2 may be a V2X transmitting UE. The UE-1 may receive a system information block (SIB) from the base station to which the UE-1 is accessed (or in which the UE-1 is camped), and the UE-2 may receive an SIB from another base station to which the UE-2 is accessed (or in which the UE-2 is camped). In this case, as the SIB, an existing SIB may be used or an SIB defined separately for V2X may be used. Further, information of an SIB received by the UE-1 and information of an SIB received by the UE-2 may be different from each other. Therefore, in order to perform V2X communication between the UE-1 and the UE-2 positioned at different cells, a method of unifying information or an assumption and interpretation method thereof may be additionally required.

FIG. 1 illustrates a V2X system configured with the UE-1 and the UE-2 for convenience of description, but the disclosure is not limited thereto, and communication may be made between more V2X UEs. Further, an interface (uplink and downlink) between the base station and the V2X UEs may be referred to as a Uu interface, and a sidelink between the V2X UEs may be referred to as a PC5 interface. Therefore, in the disclosure, these may be used interchangeably.

In the disclosure, the UE may include a vehicle supporting vehicular-to-vehicular (V2V), a vehicle supporting vehicular-to-pedestrian (V2P) or a pedestrian's handset (e.g., smart phone), a vehicle supporting vehicular-to-network (V2N), or a vehicle supporting vehicular-to-infrastructure (V2I). Further, in the disclosure, the UE may include a road side unit (RSU) equipped with a UE function, an RSU equipped with a base station function, or an RSU equipped with a part of the base station function and a part of the UE function.

Further, according to an embodiment of the disclosure, the base station may be a base station supporting both V2X communication and general cellular communication, or a base station supporting only V2X communication. In this case, the base station may be a 5G base station (gNB), a 4G base station (eNB), or an RSU. Accordingly, in the disclosure, the base station may be referred to as an RSU.

Figure 2:
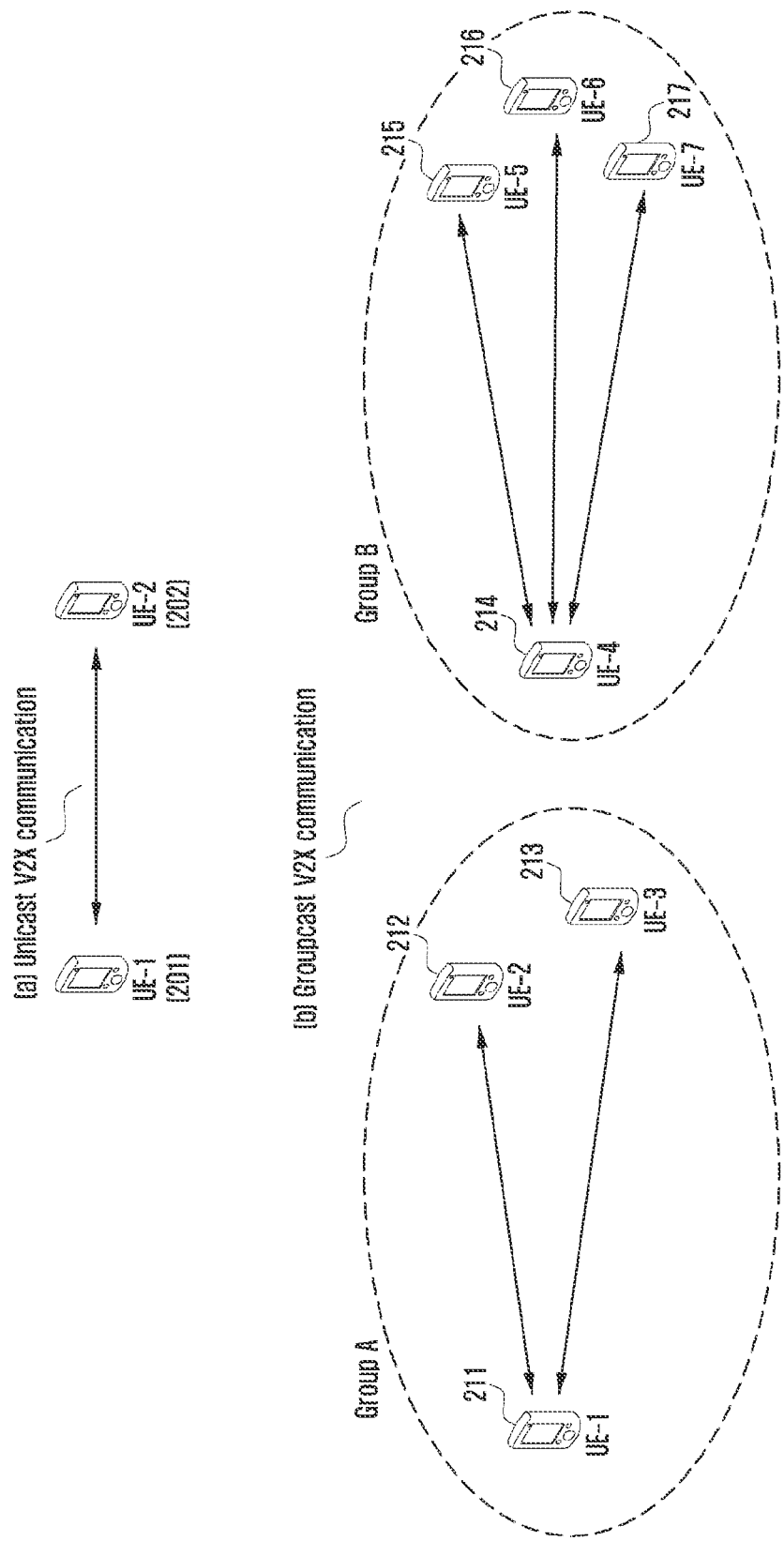
FIG. 2 is a diagram illustrating a V2X communication method performed through a sidelink according to an embodiment of the disclosure.

FIG. 2 is a diagram illustrating a V2X communication method performed through a sidelink according to an embodiment of the disclosure.

Referring to FIG. 2A, a UE-1 201 (e.g., TX UE) and a UE-2 202 (e.g., RX UE) may perform one-to-one communication, which may be referred to as unicast communication.

Referring to FIG. 2B, the TX UE and the RX UE may perform one-to-many communication, which may be referred to as groupcast or multicast.

In FIG. 2B, a UE-1 211, a UE-2 212, and a UE-3 213 may form one group (group A) to perform groupcast communication, and a UE-4 214, a UE-5 215, a UE-6 216, and a UE-7 217 may form another group (group B) to perform groupcast communication. Each UE may perform groupcast communication only within a group to which it belongs, and communication with other groups may be performed through unicast, groupcast, or broadcast communication. FIG. 2B illustrates that two groups (group A, group B) are formed, but the disclosure is not limited thereto.

Although not illustrated in FIG. 2, V2X UEs may perform broadcast communication. Broadcast communication means a case in which all V2X UEs receive data and control information transmitted by a V2X transmitting UE through a sidelink. As an example, in FIG. 2B, when it is assumed that the UE-1 211 is a transmitting UE for broadcast, all UEs (UE-2 212, UE-3 213, UE-4 214, UE-5 215, UE-6 216, and UE-7 217) may receive data and control information transmitted by the UE-1 211.

In NR V2X, the support of a form in which a vehicle UE transmits data to only one specific node through unicast and a form in which a vehicle UE transmits data to a plurality of specific nodes through groupcast may be considered, unlike in LTE V2X. For example, in service scenarios such as platooning, which is technology for moving two or more vehicles in a group by connecting them to one network, these unicast and group cast technologies may be usefully used. Specifically, unicast communication may be required for a leader node of a group connected by platooning to control one specific node, and group cast communication may be required for the purpose of simultaneously controlling a group consisting of a plurality of specific nodes.

Figure 3:
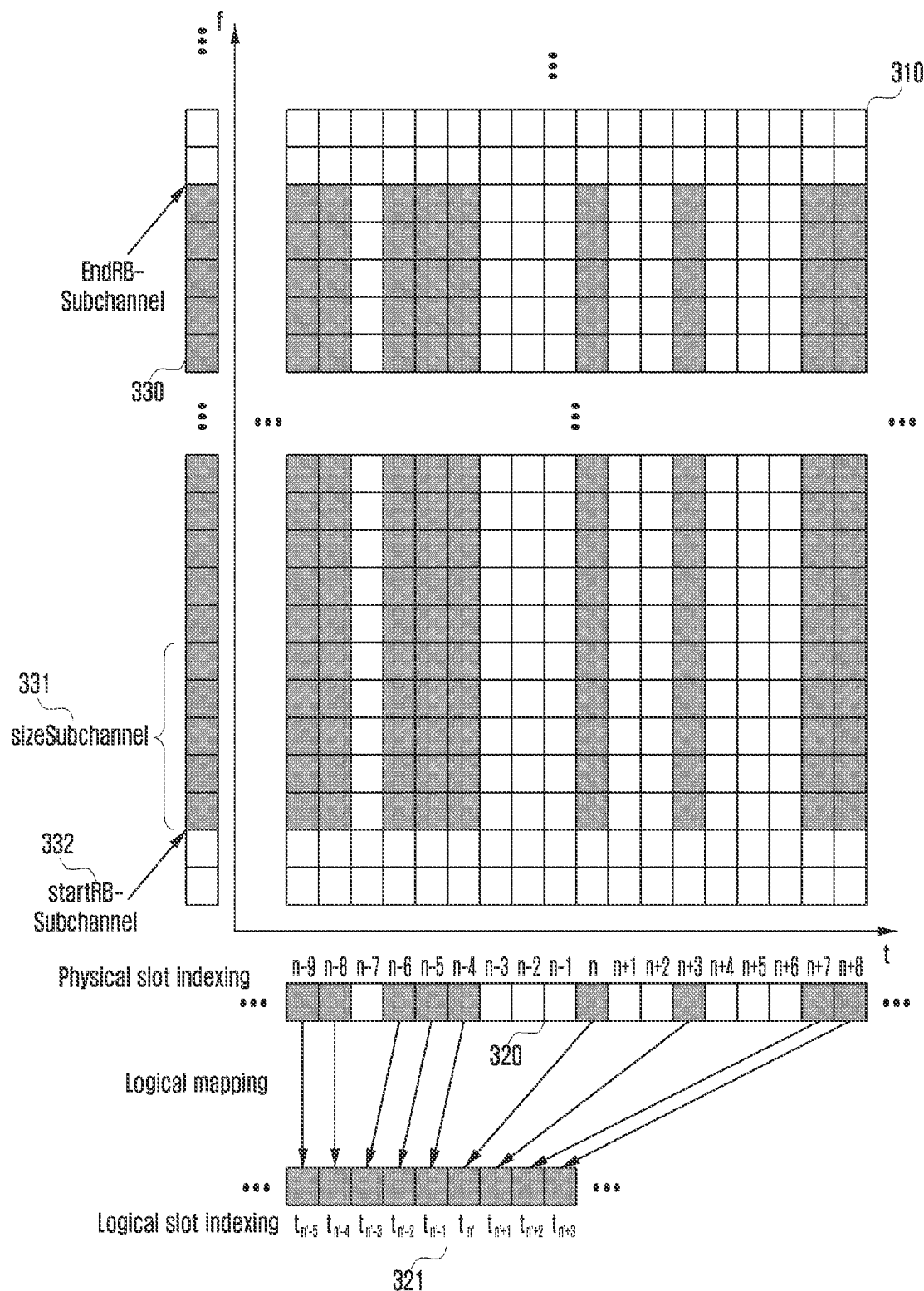
FIG. 3 is a diagram illustrating a resource pool defined to a set of resources on a time and frequency used for transmission and reception of a sidelink according to an embodiment of the disclosure.

FIG. 3 is a diagram illustrating a resource pool defined to a set of resources on a time and frequency used for transmission and reception of a sidelink according to an embodiment of the disclosure.

In the resource pool, resource granularity on the time axis may be one or more OFDM symbols. Further, resource granularity of the frequency axis may be one or more physical resource blocks (PRB).

When the resource pool is allocated on a time and frequency (310), a colored area indicates an area configured as the resource pool on a time and frequency. In the disclosure, a case in which the resource pool is discontinuously allocated on a time is described as an example, but the resource pool may be continuously allocated on a time. Further, in the disclosure, a case in which the resource pool is continuously allocated on a frequency is described as an example, but the resource pool may be allocated discontinuously on a frequency.

FIG. 3 illustrates a case 320 in which a resource pool is discontinuously allocated on a time. FIG. 3 illustrates a case in which granularity of resource allocation on a time consists of slots. Specifically, one slot configured with a plurality of OFDM symbols may be a resource allocation basic unit on a time axis. In this case, the number of OFDM symbols constituting the slot may be, for example, 14, and the number of OFDM symbols may be changed. Referring to FIG. 3, a colored slot indicates a slot included in the resource pool on a time, and a slot to which the resource is allocated may be indicated through time resource pool configuration information included in an SIB. In this case, the time resource pool configuration information may be configured by being included in the resource pool configuration information together with frequency resource pool configuration information, or the time resource pool configuration information and the frequency resource pool configuration information may be configured respectively. For example, a slot in which a resource is configured may be indicated through a bitmap.

Referring to FIG. 3, a physical slot 320 belonging to a resource pool discontinuous on a time may be mapped to a logical slot 321. In general, a set of slots belonging to a physical sidelink shared channel (PSSCH) resource pool may be represented by $t_0, t_1, \ldots, t_l, \ldots, t_{Tmax}$.

FIG. 3 illustrates a case 330 in which a resource pool is continuously allocated on a frequency.

Resource allocation on a frequency axis may be performed in units of subchannels 331. The subchannel 331 may be defined to resource granularity on a frequency configured with one or more RBs. That is, the subchannel 331 may be defined to an integer multiple of RB. Referring to FIG. 3, the subchannel 331 may be configured with five consecutive PRBs, and a subchannel size (sizeSubchannel) may be a size of five consecutive PRBs. However, the content illustrated in the drawings is only an example of the disclosure, and the size of the subchannel may be configured differently, and although it is general that one subchannel is configured with continuous PRBs, it is not necessarily configured with continuous PRBs. The subchannel 331 may be a basic unit of resource allocation for a PSSCH.

A startRB-Subchannel 332 may indicate a start position of the subchannel 331 on a frequency in the resource pool. When resource allocation is performed in units of subchannel 331 on the frequency axis, a resource on a frequency may be allocated through an RB index (startRB-Subchannel) 332 in which the subchannel 331 starts, information (sizeSubchannel) on how many RBs the subchannel 331 is configured with, and configuration information on the total number (numSubchannel) of subchannels 331. In this case, information on the startRB-Subchannel, the sizeSubchannel, and the numSubchannel may be configured through frequency resource pool configuration information included in the SIB.

Figure 4:
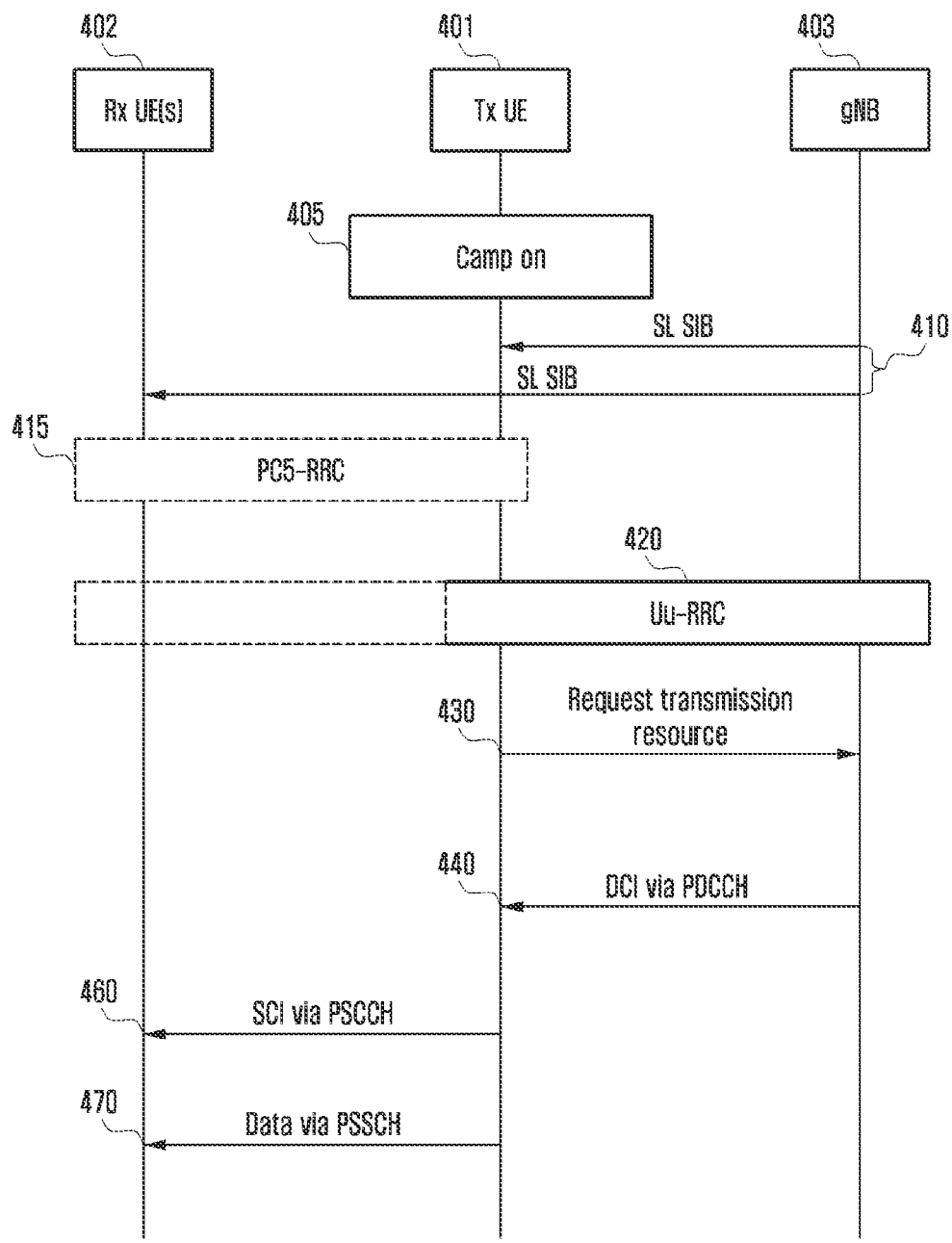
FIG. 4 is a message flow diagram illustrating a method for a base station to allocate transmission resources in a sidelink according to an embodiment of the disclosure.

FIG. 4 is a message flow diagram illustrating a method for a base station to allocate transmission resources in a sidelink according to an embodiment of the disclosure.

A method for the base station to allocate transmission resources in the sidelink will be referred to as a mode 1 hereinafter. The mode 1 may be scheduled resource allocation. The mode 1 may indicate a method in which the base station allocates resources used for sidelink transmission to RRC-connected UEs in a dedicated scheduling method. The method of the mode 1 may be valid for interference management and resource pool management because the base station may manage sidelink resources.

Referring to FIG. 4, a transmitting UE 401 and receiving UE 402 in a camp on state (405) may receive a sidelink system information block (SL-SIB) from a base station 403 (410). Here, the receiving UE 402 represents a UE receiving data transmitted by the transmitting UE 401. SL-SIB information may include sidelink resource pool information for sidelink transmission and reception, parameter configuration information for a sensing operation, information for configuring sidelink synchronization, or carrier information for sidelink transmission and reception operating at different frequencies.

When data traffic for V2X is generated in the transmitting UE 401, the transmitting UE 401 may be RRC-connected to the base station 403 (420). Here, the RRC connection between the UE and the base station may be referred to as Uu-RRC. A Uu-RRC connection process (420) may be performed before data traffic generation of the transmitting UE 401. Further, in the mode 1, in a state in which the Uu-RRC connection process (420) between the base station 403 and the receiving UE 402 is performed, the transmitting UE may perform transmission to the receiving UE through the sidelink. In contrast, in the mode 1, even in a state in which the Uu-RRC connection process (420) between the base station 403 and the receiving UE 402 is not performed, the transmitting UE may perform transmission to the receiving UE through the sidelink.

The transmitting UE 401 may request a transmission resource capable of performing V2X communication with the receiving UE 402 to the base station (430). In this case, the transmitting UE 401 may request a sidelink transmission resource to the base station 403 using a physical uplink control channel (PUCCH), an RRC message, or a MAC CE. The MAC CE may be a buffer status report (BSR) MAC CE of a new format (including information on a size of data buffered for D2D communication and an indicator indicating that it is at least a buffer status report for V2X communication). Further, the transmitting UE 401 may request a sidelink resource through a scheduling request (SR) bit transmitted through the PUCCH.

Thereafter, the base station 403 may allocate a V2X transmission resource to the transmitting UE 401. The base station may allocate transmission resources in a dynamic grant or configured grant method.

In the case of the dynamic grant method, the base station may allocate resources for TB transmission through downlink control information (DCI). Sidelink scheduling information included in DCI may include parameters related to occasion and frequency allocation position information fields of initial transmission and retransmission. DCI for a dynamic grant method may be CRC scrambled with SL-V-RNTI so as to indicate that it is a dynamic grant method.

In the case of the configured grant method, by configuring a semi-persistent scheduling (SPS) interval through Uu-RRC, the base station may periodically allocate resources for TB transmission. Further, in order to allocate resources in the configured grant method, the base station may allocate resources for a plurality of TBs through DCI. Sidelink scheduling information included in DCI may include parameters related to occasion and frequency allocation position information fields of initial transmission and retransmission. When the resource is allocated in the configured grant method, an occasion and frequency allocation position of initial transmission and retransmission may be determined according to the DCI, and the resource may be repeated at an SPS interval. DCI for the configured grant method may be CRC scrambled with SL-SPS-V-RNTI so as to indicate that it is a configured grant method.

Further, the configured grant (CG) method may be classified into type1 CG and type2 CG. In the case of type2 CG, it is possible to activate/deactivate a resource configured to configured grant through DCI.

Accordingly, in the case of the mode 1, the base station 403 may instruct the transmitting UE 401 to schedule for sidelink communication with the receiving UE 402 for DCI transmission through the PDCCH (440).

In the case of broadcast transmission, the transmitting UE 401 may broadcast sidelink control information (SCI) to the receiving UE 402 through the PSCCH in broadcast without an RRC configuration 415 for the sidelink (460). Further, the transmitting UE 401 may broadcast data to the receiving UE 402 through the PSSCH (470).

Alternatively, in the case of unicast or groupcast transmission, the transmitting UE 401 may perform RRC connection with other UEs on a one-to-one basis. Here, the RRC connection between UEs may be referred to as a PC5-RRC (415) to be distinguished from the Uu-RRC. Even in the case of groupcast, the PC5-RRC (415) may be individually connected between UEs in the group.

Referring to FIG. 4, although connection of the PC5-RRC (415) is illustrated as an operation after transmission of an SL-SLB (410), it may be performed at any time before transmission of the SL-SIB (410) or before broadcast of the SCI (460). When RRC connection between UEs is required, sidelink PC5-RRC connection is performed, and the transmitting UE 401 may transmit the SCI to the receiving UE 402 through a PSCCH in unicast or groupcast (460). In this case, groupcast transmission of SCI may be interpreted as group SCI. Further, the transmitting UE 401 may transmit data to the receiving UE 402 through a PSSCH in unicast or groupcast (470). In the case of the mode 1, the transmitting UE 401 may interpret sidelink scheduling information included in the DCI received from the base station 403, thereby performing scheduling for the sidelink, and include the following scheduling information in the SCI to transmit the SCI.

- Occasion and frequency allocation position information field of initial transmission and retransmission
- New data indicator (NDI) field
- Redundancy version (RV) field
- Information field indicating a reservation interval When a resource for a plurality of TBs (a plurality of MAC PDUs) is selected through an information field indicated by the reservation interval, an interval between TBs is indicated as a single fixed value, and when a resource is selected for only one TB, the corresponding value may be configured to '0'.

Figure 5:
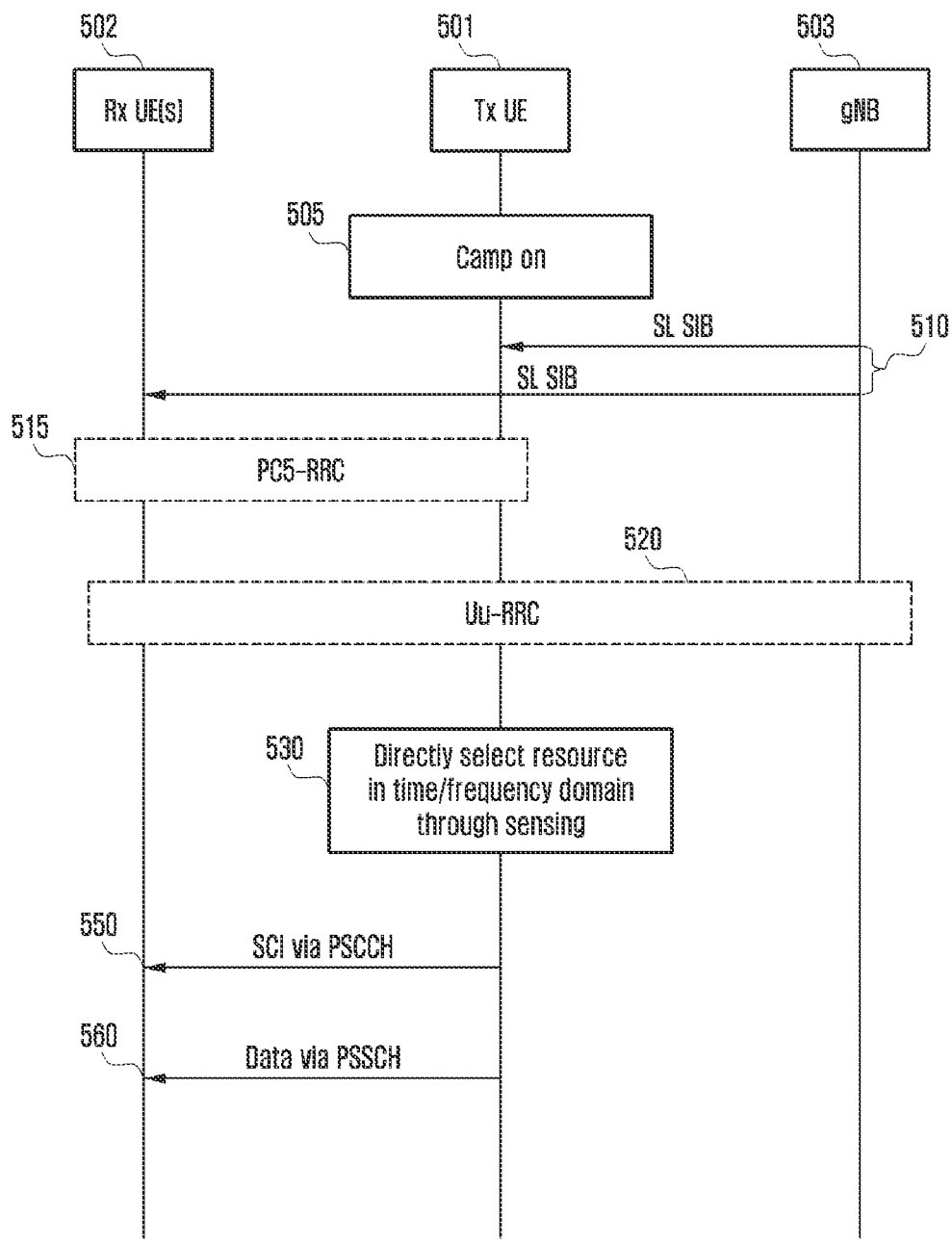
FIG. 5 is a message flow diagram illustrating a method in which a UE directly allocates transmission resources of a sidelink through sensing in the sidelink according to an embodiment of the disclosure.

FIG. 5 is a message flow diagram illustrating a method in which a UE directly allocates transmission resources of a sidelink through sensing in the sidelink according to an embodiment of the disclosure.

Hereinafter, a method in which the UE directly allocates transmission resources of the sidelink through sensing in the sidelink will be referred to as a mode 2. The mode 2 may be referred to as UE autonomous resource selection.

In the mode 2, a base station 503 may provide a sidelink transmission and reception resource pool for V2X as system information, and a transmitting UE 501 may select a transmission resource according to a predetermined rule. Unlike the mode 1 in which the base station directly participates in resource allocation, there is a difference in that the transmitting UE 501 autonomously selects resources and transmits data based on a resource pool previously received through system information in FIG. 5.

Referring to FIG. 5, the transmitting UE 501 and a receiving UE 502 in a camp on state (505) may receive an SL-SIB from the base station 503 (510). Here, the receiving UE 502 represents a UE that receives data transmitted by the transmitting UE 501. SL-SIB information may include sidelink resource pool information for sidelink transmission and reception, parameter configuring information for a sensing operation, information for configuring sidelink synchronization, or carrier information for sidelink transmission and reception operating at different frequencies.

The difference between FIG. 4 and FIG. 5 is that in FIG. 4, the base station 503 and the UE 501 operate in an RRC connected state, whereas in FIG. 5, the UE may operate in an idle mode (520) (RRC not-connected state). Further, even in the RRC connected state (520), the base station 503 may enable the transmitting UE 501 to autonomously select a transmission resource without directly participating in resource allocation. Here, the RRC connection between the UE 501 and the base station 503 may be referred to as Uu-RRC (520).

When data traffic for V2X is generated in the transmitting UE 501, the transmitting UE 501 receives a configuration of a resource pool through system information received from the base station 503, and the transmitting UE 501 may directly select a resource in a time/frequency domain through sensing within the configured resource pool (530).

In the case of broadcast transmission, the transmitting UE 501 may broadcast SCI to the receiving UE 502 through a PSCCH in broadcast without an RRC configuration (520) for an additional sidelink (550). Further, the transmitting UE 510 may broadcast data to the receiving UE 502 through a PSSCH (560).

Alternatively, in the case of unicast and groupcast transmission, the transmitting UE 501 may perform RRC connection with other UEs on a one-to-one basis. Here, the RRC connection between UEs may be PC5-RRC to be distinguished from Uu-RRC. Even in the case of groupcast, PC5-RRC may be individually connected among UEs in a group.

In FIG. 5, although PC5RRC (515) connection is illustrated as an operation after transmission of an SL-SIB (510), it may be performed at any time before transmission of an SL-SIB (510) or before transmission of the SCI (550). When RRC connection between UEs is required, PC5-RRC connection of the sidelink may be performed (515), and the transmitting UE 501 may transmit SCI to the receiving UE 502 through a PSCCH in unicast or groupcast (550). In this case, groupcast transmission of SCI may be interpreted as group SCI. Further, the transmitting UE 501 may transmit data to the receiving UE 502 through a PSSCH in unicast or groupcast (560). In the case of the mode 2, the transmitting UE 501 may perform sensing and transmission resource selection operations to directly perform scheduling for the sidelink, and include the following scheduling information in the SCI and transmit the SCI.

Occasion and frequency allocation position information field of initial transmission and retransmission NDI field RV field Information field indicating a reservation interval When a resource for a plurality of TBs (a plurality of MAC PDUs) is selected through an information field indicated by the reservation interval, an interval between TBs is indicated as a single fixed value, and when a resource is selected for only one TB, the corresponding value may be configured to '0'.

Figure 6:
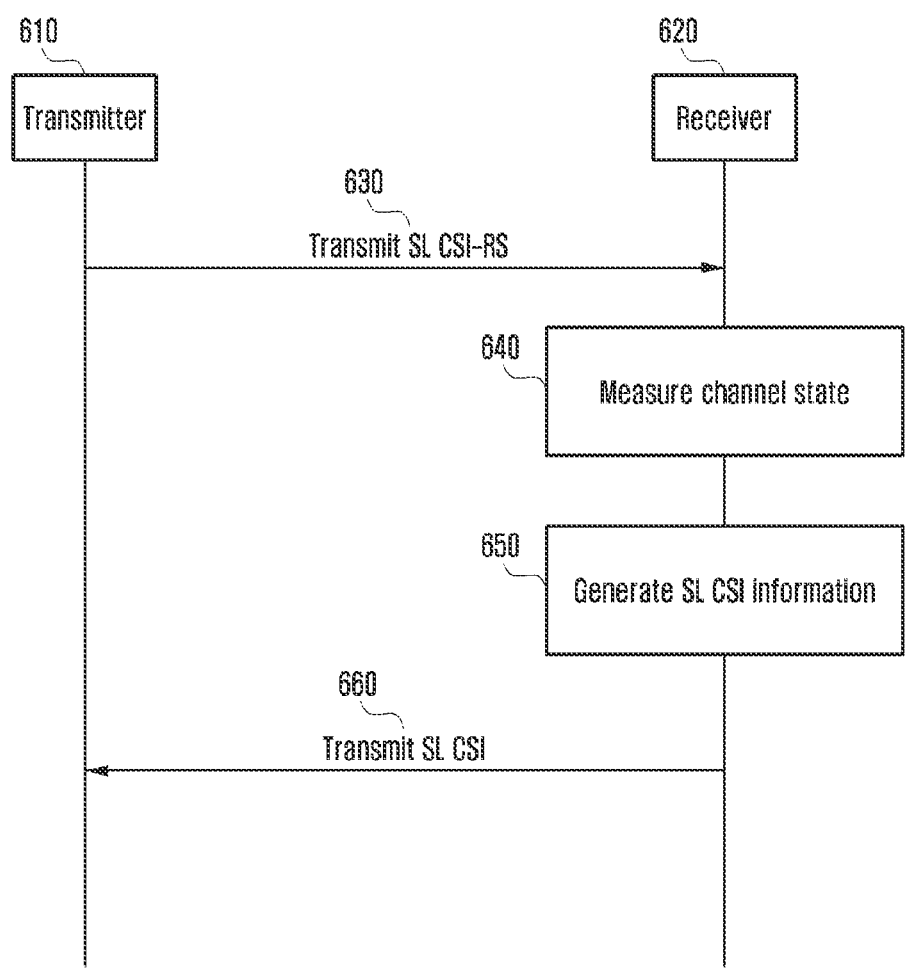
FIG. 6 is a message flow diagram illustrating an example in which a receiving UE measures a channel state in a sidelink and reports the channel state to a transmitting UE according to an embodiment of the disclosure.

FIG. 6 is a message flow diagram illustrating an example in which a receiving UE measures a channel state in a sidelink and reports the channel state to a transmitting UE according to an embodiment of the disclosure.

Referring to FIG. 6, reference numeral 610 denotes a transmitter (or may be used interchangeably with a transmitting part, a transmitting device, and a transmitting end), and reference numeral 620 denotes a receiver (or a receiving part, a receiving device, and a receiving end). In general, each of a transmitter and a receiver may be indicated as a subject that transmit and receive data. In a V2X system, the UE may be a transmitter or a receiver.

Further, the receiver 620 may be one UE or a plurality of UEs. For example, when the receiver 620 is a plurality of UEs, a scenario such as platooning may be performed. A transmitting UE corresponding to the transmitter 610 transmits an SL CSI-RS so as to obtain channel information from the receiving UE, and the receiving UE corresponding to the receiver may receive the SL CSI-RS (630). In this case, configuration information for transmitting an SL CSI-RS and reporting SL CSI may be transmitted to the receiving UE. A description of specific configuration information will be described later.

Further, the transmitting UE may request SL CSI to the receiving UE. In this case, the transmitting UE may transmit a request for CSI while transmitting a CSI-RS, or may transmit a request for CSI before and after each step disclosed in the drawing.

SL CSI-RS transmission step in step 630 includes a method of configuring and transmitting an SL CSI-RS resource, a condition for transmitting an SL CSI-RS, and a method of configuring an SL CSI-RS pattern, and specific details thereof will be described in detail in the following embodiment.

Further, a transmission channel configuration of SL CSI, an SL CSI triggering/activation method, and a valid SL CSI determination method are required, and specific details thereof will be described in detail in the following embodiment.

The receiver may measure a channel state of the sidelink using the received SL CSI-RS (640).

The receiver generates information on the SL CSI using a measurement result of the channel state (650). In the following embodiment, when the SL CSI-RS is transmitted only in an scheduled PSSCH region instead of being transmitted in all bands in the sidelink, a method of ensuring accuracy of measurement using the SL CSI-RS, a method for the receiving UE to obtain an SL CSI-RS EPRE, and a method of considering a CBR when generating SL CSI are proposed.

A UE corresponding to the receiver transmits SL CSI to a UE corresponding to the transmitter. A specific operation thereof will be described through the following examples.

The disclosure considers a case of performing an operation of SL CSI-RS transmission and SL CSI reporting in unicast between UEs in the sidelink. However, the embodiment of the disclosure is not limited thereto, and for example, the SL CSI-RS transmission and SL CSI reporting method proposed in the disclosure may be applied to a case of operating in unicast between UEs in a group.

In the disclosure, aperiodic SL CSI-RS transmission and aperiodic SL CSI reporting are considered. Further, the SL CSI may include various types of information. For example, information that may be included in SL CSI may include a channel quality indicator (CQI), a precoding matrix indicator (PMI), a rank indicator (RI), a CSI-RS resource indicator (CRI), an SS/PBCH block resource indicator (SSBRI), a layer indicator (LI), and an LI-RSRP. Further, a channel busy ratio (CBR) may be considered as information that may be included in the SL CSI.

In order for the receiving UE to provide SL CSI information to the transmitting UE, the receiving UE should receive an SL CSI-RS. Therefore, the receiving UE needs to receive a resource setting/resource configuration for receiving the SL CSI-RS and a report setting/report configuration for reporting the generated CSI.

Figure 7:
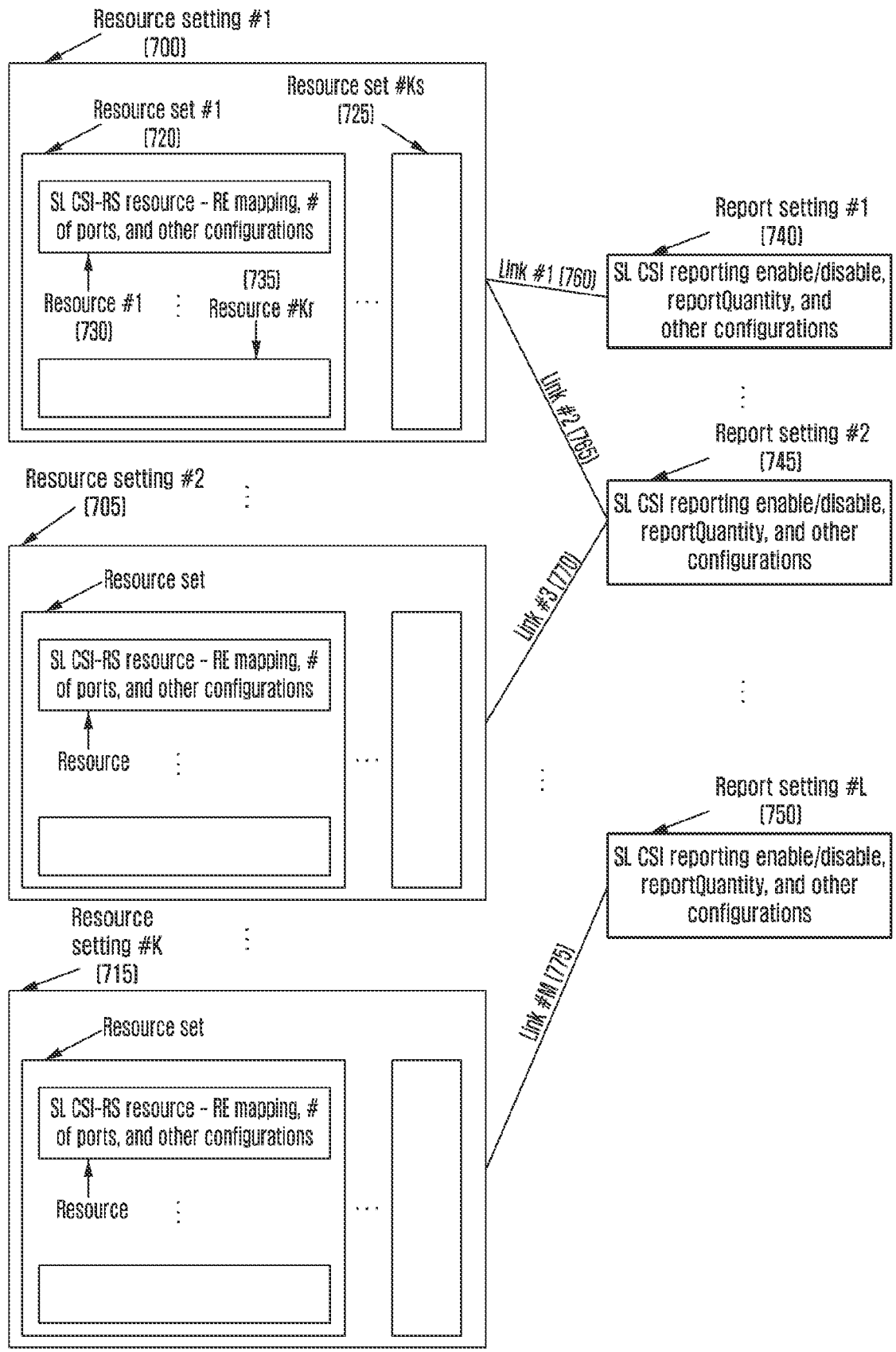
FIG. 7 is a diagram illustrating a channel state information framework of an NR sidelink system according to an embodiment of the disclosure.

Specific details will be described hereinafter. FIG. 7 is a diagram illustrating a channel state information framework of an NR sidelink system according to an embodiment of the disclosure.

The CSI framework of FIG. 7 may be configured with two elements of resource setting and report setting. The report setting may constitute at least one link with reference to an ID thereof.

According to an embodiment of the disclosure, the resource setting may include information related to a reference signal (RS). At least one resource setting 700, 705, and 715 may be configured to the receiving UE. Each resource setting may include at least one resource set 720 and 725. Each resource set may include at least one resource 730 and 735. Each resource 730 and 735 may include detailed information on the RS, for example, transmission band information in which the RS is transmitted (e.g., sidelink bandwidth part, SL BWP), resource element (RE) position information in which the RS is transmitted, offset in an RS transmission period and time axis, the number of ports of the RS, and the like. As described above, the corresponding RS may be referred to as an SL CSI-RS, and when a periodic SL CSI-RS is not supported, the RS transmission period and offset information in the time axis may not be included.

According to an embodiment of the disclosure, the report setting may include information related to the SL CSI reporting method. The base station may configure at least one report setting 740, 745, and 750 to the JE. In this case, in each report setting, enabling/disabling configuration information for SL CSI reporting, enabling/disabling configuration information for CBR report, a type of a channel in which the report is transmitted (e.g., PSSCH or physical sidelink feedback channel (PSFCH), and band information in which SL CSI is reported (e.g., SL BWP), configuration information on a codebook when PMI is supported, time-domain behavior for SL CSI reporting, frequency granularity for SL CSI reporting, configuration information on measurement restriction, valid SL CSI window configuration information, and reportQuantity, which is information included in SL CSI, and the like may be included in parameter information of SL-CSI-ReportConfig. Specifically, the time-domain behavior for SL CSI reporting may be information on whether SL CSI reporting is periodic or non-periodic, and the disclosure considers a case in which SL CSI reporting is configured aperiodically. Further, frequency granularity for SL CSI reporting means a unit on a frequency for SL CSI reporting.

In the disclosure, in consideration of a transmission environment of the sidelink, non-subband-based aperiodic SL CSI reporting may be transmitted through the PSSCH or the PSFCH only in the frequency domain corresponding to the PSSCH, unlike a Uu interface between a base station and a UE.

Configuration information on measurement restriction means a configuration on whether there is a restriction on a time or frequency measurement period for channel measurement when measuring the channel.

The valid SL CSI window configuration information is information for determining that the SL CSI is invalid when the SL CSI window is exceeded in consideration of a CSI feedback delay. A detailed description thereof will be described later.

Finally, reportQuantity indicates information included in SL CSI, and the disclosure considers a configuration of CQI, CQI-RI, or CQI-RI-PMI. Further, reportQuantity may include CBR information of the receiving UE. In this case, the report setting may include at least one ID (ID of resource setting) for referring to reference signal (or RE position) information for interference measurement or a channel referenced by the UE when reporting CSI. In this way, the resource configuration and report setting may be linked and be, for example, schematically illustrated as in links 760, 765, 770, and 775 of FIG. 7. However, embodiments of the disclosure are not limited thereto. For example, there is also possible a method in which an ID of at least one resource setting and an ID of report setting are included in one measurement configuration (mea-Config) and are linked.

According to an embodiment of the disclosure, when one reporting setting 740 and one resource setting 700 are connected according to the link 760, the resource setting 700 may be used for channel measurement. Further, the receiving UE may report CSI using information included in the reporting setting.

According to an embodiment of the disclosure, when connecting one reporting setting 745 and two resource settings 700 and 705 according to the links 765 and 770, one resource setting of the two may be used for channel measurement, and the remaining resource setting may be used for interference measurement.

Further, according to an embodiment of the disclosure, resource setting and report setting may be connected to a resource pool to be (pre-)configured for each resource pool. Information configured for each resource pool may be indicated through an SL-SIB or UE-specific higher signaling. When the information is indicated through the SL-SIB, a corresponding value may be configured in the resource pool information among the corresponding system information. Even when the information is configured through a higher layer, the information may be UE-specifically configured through Uu-RRC or PC5-RRC as information in the resource pool. Further, a configuration method for resource setting and report setting may be different according to whether the UE is in an IC/PC/OCC environment in the sidelink or the transmission resource allocation mode (mode 1/2). As described above, in a channel state information framework of the NR sidelink system, each resource setting may include at least one resource set, and each resource set may include at least one resource. Hereinafter, when detailed information on the SL CSI-RS is configured in each resource setting, conditions and methods for transmitting an actual SL CSI-RS will be described. Prior to this, in the case of the Uu interface between the base station and the UE, the CSI-RS is transmitted over all configured frequency band. Further, the UE feeds back the CSI report in the form of a wideband or a sub-band in all frequency bands, so that the base station may receive the CSI report in the entire frequency band. However, considering that a sidelink of V2X is communication between UEs, it is considered that SL CSI-RS transmission is limited to the transmission region of the PSSCH. In other words, the SL CSI-RS may be transmitted together with the PSSCH only in a frequency domain in which resources are allocated with the PSSCH.

As described above, the disclosure considers aperiodic SL CSI-RS transmission. In a condition in which an aperiodic SL CSI-RS is transmitted, the following methods may be considered.

SL CSI-RS Transmission Conditions

Method 1: When data is transmitted only in the case where SL CSI reporting is enabled and SL CSI reporting is triggered/activated, an SL CSI-RS is transmitted along with data through a PSSCH.

Method 2: When SL CSI reporting is enabled, whenever data is transmitted, an SL CSI-RS is transmitted along with data through the PSSCH.

Method 3: The method 1 or 2 may be used according to specific conditions.

Method 4: When a signal transmission method is configured to unicast, whenever data is transmitted, an SL CSI-RS is transmitted along with the data through the PSSCH.

For example, when an SL CSI-RS is configured to be used for sidelink radio link monitoring (SL RLM) or sidelink reference signal received power (SL RSRP) measurement and reporting, whenever data is transmitted, an SL CSI-RS is transmitted along with data through a PSSCH, and when an SL CSI-RS is not configured for SL RLM or SL RSRP measurement and reporting, SL CSI reporting is enabled, and when data is transmitted only in the case where SL CSI reporting is triggered/activated, an SL CSI-RS is transmitted along with the data through the PSSCH.

As described above, only when SL CSI reporting is enabled, the SL CSI reporting may be triggered/activated. Enabling/disabling the SL CSI reporting may be configured to report setting of a channel state information framework, as described above. In the proposed method 1/2/3, it is assumed that an SL CSI-RS is transmitted only in the scheduled PSSCH region.

More specifically, the method 1 is a method of transmitting a CSI-RS when SL CSI reporting is triggered/activated through signaling. A signaling method of triggering/activating SL CSI reporting will be described in more detail hereinafter.

More specifically, the method 2 is a method in which data and SL CSI-RS are transmitted through a PSSCH whenever data is transmitted when SL CSI reporting is enabled without signaling that triggers/activates SL CSI reporting. In the case of the method 2, because the SL CSI-RS is transmitted together with data, the more frequently the data is scheduled, the more SL CSI-RS samples for measuring the channel state may be increased.

Even in the case of the method 1, when SL CSI reporting is triggered/activated whenever data is transmitted, the transmission frequency of the SL CSI-RS may be increased. In this case, the SL CSI-RS may be transmitted periodically on the assumption that data is transmitted periodically. However, the method 1 has a disadvantage in that it is necessary to trigger/activate SL CSI reporting in order to increase the transmission frequency of an SL CSI-RS compared to the method 2.

Therefore, in the case of the method 3, when the SL CSI-RS is configured for the purpose of measurement of SL RLM or SL RSRP, which requires to identify an average state of a channel rather than to identify a current state of the channel in consideration of disadvantages of the method 1, the method 2 is used and otherwise, the method 1 is used.

The method 4 is a method of transmitting an SL CSI-RS together with data through the PSSCH whenever data is transmitted when the signal transmission method is configured to unicast regardless of whether SL CSI reporting is enabled/disabled. The method 4 is a method considering that SL CSI-RS transmission is supported only in unicast.

A method of distinguishing whether a signal transmission method is broadcast, unicast, or groupcast may include various methods.

For example, the signal transmission method may be distinguished in a higher layer. Further, the signal transmission method may be classified by a resource pool. This is a case of using a different transmission method in each resource pool. Further, when more than one transmission method may be used simultaneously in one resource pool, the methods may be distinguished by indicating configuration information on a signal transmission method in the resource pool. Alternatively, the methods may be distinguished by a SCI format or by indicating configuration information on a signal transmission method in the SCI field. Further, a method of distinguishing by a DCI format transmitted by the base station to the UE, a method of indicating configuration information on the signal transmission method in a DCI field and distinguishing by the SCI format, and a method of indicating configuration information on a signal transmission method in a SCI field may be used simultaneously.

However, in all of the above methods 1/2/3/4, because an SL CSI-RS is transmitted only in the scheduled PSSCH region instead of all bands, when a frequency domain of the scheduled PSSCH is small, a sample of the SL CSI-RS is insufficient; thus, there is a problem that inaccuracy may occur in the measurement result. Accordingly, a method for solving such a problem will be described in more detail with reference to embodiments to be described later.

An SL CSI-RS pattern may reuse a CSI-RS pattern in the NR system as much as possible. However, in the disclosure, the SL CSI-RS pattern is not limited to only the CSI-RS pattern in the NR system. [Table 1] may be considered as an SL CSI-RS pattern. [Table 1] illustrates an SL CSI-RS pattern considering up to 2 ports.

Figure 8:
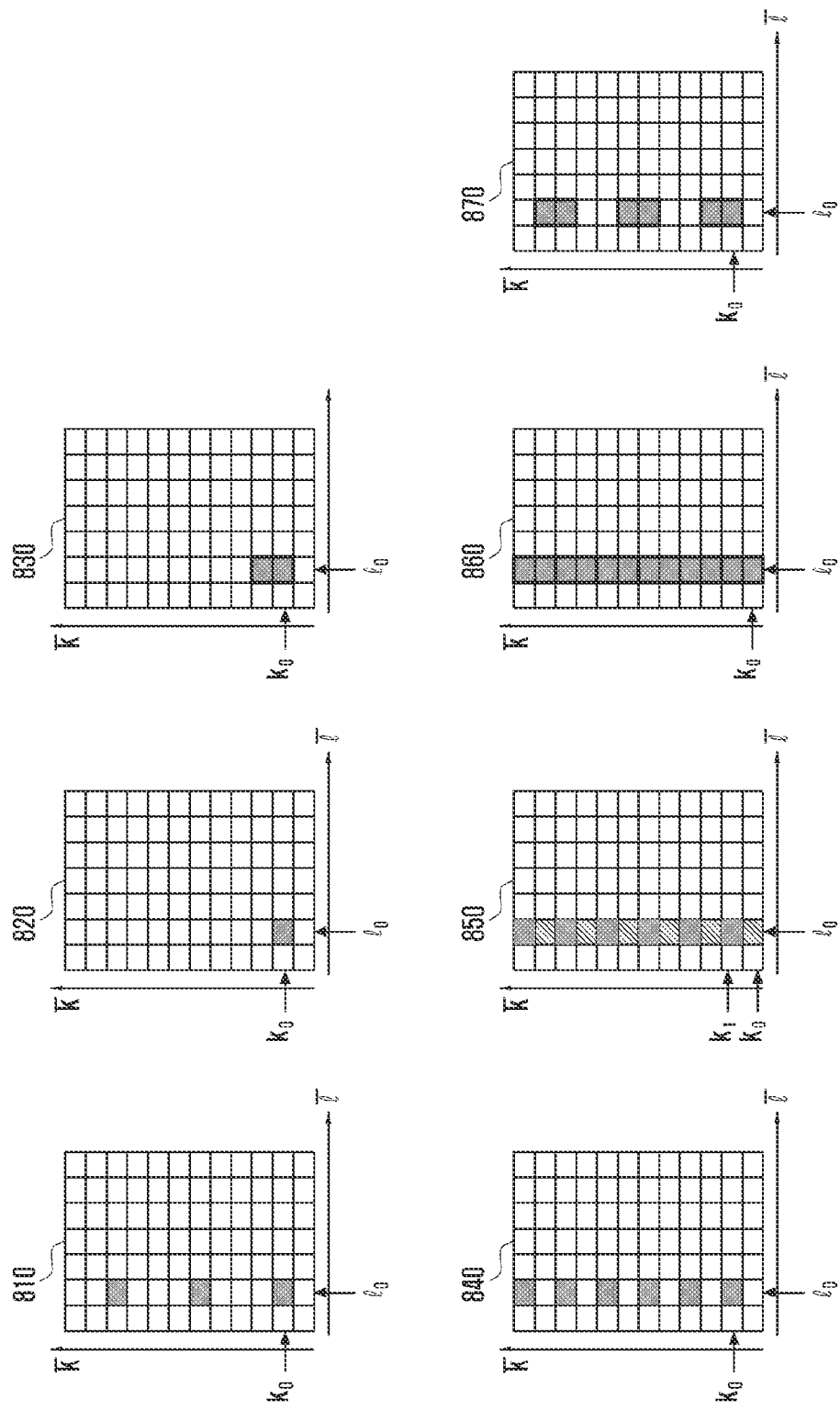
FIG. 8 is a diagram illustrating a CSI-RS pattern according to an embodiment of the disclosure.
Figure 9:
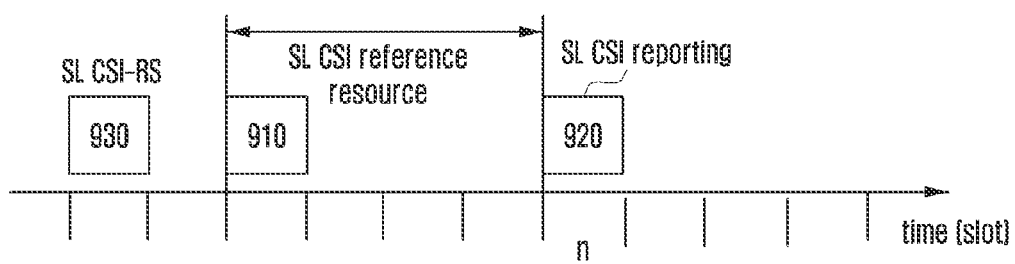
FIG. 9 is a diagram illustrating a CSI-RS transmission resource and a CSI-RS reporting resource according to an embodiment of the disclosure.

In [Table 1], rows 2, 3, and 6 are patterns already defined to a CSI-RS pattern in the NR system, and are illustrated in FIG. 8.

FIG. 8 is a diagram illustrating a CSI-RS pattern according to an embodiment of the disclosure.

Referring to FIG. 8, a pattern 810 is an example illustrating a 1-port CSI-RS pattern corresponding to a row 2 in [Table 1], and is a pattern in which a frequency density of each port per PRB is 3, as illustrated in the drawing. This may be used for the purpose of securing a sample of an SL CSI-RS according to a pattern used as a tracking reference signal (TRS) in NR or a frequency domain of a PSSCH scheduled in a sidelink. Further, in the pattern 810, a method of allowing data and FDM to an RE in which an SL CSI-RS is not transmitted in a symbol in which an SL CSI-RS is transmitted and a method of not allowing data and FDM to an RE in which an SL CSI-RS is not transmitted in a symbol in which an SL CSI-RS is transmitted may be considered. When FDM of an SL CSI-RS and data is not allowed in a symbol in which the SL CSI-RS is transmitted, power of the SL CSI-RS may be boosted by 6 dB. This may be a method of improving accuracy of measurement using the SL CSI-RS in an environment where samples of the SL CSI-RS according to a frequency domain of the PSSCH scheduled in the sidelink are insufficient.

A pattern 820 is an example illustrating a pattern corresponding to 1-port SL CSI-RS in a row 3 in [Table 1], and is a pattern in which a frequency density of each port per PRB is 1, as illustrated in the drawing. In the sidelink, a pattern having a density of 0.5 among patterns corresponding to a row 3 in [Table 1] may not be used.

A pattern 830 is an example illustrating a 2-port SL CSI-RS pattern corresponding to a row 6 in [Table 1] and is a pattern in which a frequency density of each port per PRB is 1, as illustrated in the drawing. In the case of the corresponding pattern, FD-CDM2 is applied and an orthogonal cover code of a length 2 is applied to two REs of adjacent frequencies, so that two ports may be distinguished. In the sidelink, a pattern having a density of 0.5 among patterns corresponding to a row 6 of [Table 1] may not be used.

In [Table 1], the rows 1, 4, and 6 are patterns newly defined to SL CSI-RS patterns of the sidelink, and are illustrated in FIG. 8. The SL CSI-RS patterns of the rows 1, 4, and 6 may be used for the purpose of securing samples of the SL CSI-RS according to the frequency domain of the PSSCH scheduled in the sidelink.

A pattern 840 is an example illustrating a 1-port SL CSI-RS pattern corresponding to the row 1 in [Table 1] and is a pattern in which a frequency density of each port per PRB is 6, as illustrated in the drawing. In the pattern 840, in a symbol in which the SL CSI-RS is transmitted, a method of allowing data and FDM to an RE in which an SL CSI-RS is not transmitted and a method of not allowing data and FDM to an RE in which an SL CSI-RS is not transmitted may be considered. When FDM of the SL CSI-RS and data is not allowed in a symbol in which the SL CSI-RS is transmitted, power of the SL CSI-RS may be boosted by 3 dB. This may be a method capable of improving accuracy of measurement using the SL CSI-RS in an environment where samples of the SL CSI-RS according to the frequency domain of the PSSCH scheduled in the sidelink are insufficient.

A pattern 850 is an example illustrating a 2-port SL CSI-RS pattern corresponding to a row 4 (Alt 1) in [Table 1] and is a pattern in which a frequency density of each port per PRB is 6, as illustrated in the drawing. The pattern 850 is a pattern in which a pattern corresponding to the pattern 840 is extended to 2 ports, and may be a value determined to a value corresponding to k0=0 and k1=1 in [Table 1]. In [Table 1], different ports may be mapped to REs corresponding to k0 and k1, respectively.

A pattern 860 is an example illustrating a 2-port SL CSI-RS pattern corresponding to a row 4 (Alt 2) in [Table 1] and is a pattern in which a frequency density of each port per PRB is 6, as illustrated in the drawing. In the pattern 860, unlike the pattern 850, FD-CDM2 is applied and thus an orthogonal cover code of a length 2 is applied to two REs of adjacent frequencies, so that two ports may be distinguished.

A pattern 870 is an example illustrating a 2-port SL CSI-RS pattern corresponding to a row 5 in [Table 1] and is a pattern in which a frequency density of each port per PRB is 3, as illustrated in the drawing. In the case of the corresponding pattern, FD-CDM2 is applied and thus an orthogonal cover code of a length 2 is applied to two REs of adjacent frequencies, so that two ports may be distinguished. In the pattern 870, in a symbol in which an SL CSI-RS is transmitted, a method of allowing data and FDM to an RE in which an SL CSI-RS is not transmitted and a method of not allowing data and FDM to an RE in which an SL CSI-RS is not transmitted may be considered. When FDM of the SL CSI-RS and data is not allowed in a symbol in which an SL CSI-RS is transmitted, power of the SL CSI-RS may be boosted by 3 dB. This may be a method of improving accuracy of measurement using the SL CSI-RS in an environment where samples of the SL CSI-RS according to the frequency domain of the PSSCH scheduled in the sidelink are insufficient.

Further, the CSI-RS pattern in the NR system is relatively free to configure a position in a time and frequency, but the SL CSI-RS pattern of the sidelink illustrated in FIG. 8 may have a limit to a position on a configurable time and frequency.

TABLE 1

| Row | Ports X | Density ρ | cdm-Type | $(\bar{k}, \bar{l})$ | CDM group index j | k' | l' |
|---|---|---|---|---|---|---|---|
| 1 | 1 | 6 | No CDM | $(k_0, l_0), (k_0 + 2, l_0), (k_0 + 4, l_0), (k_0 + 6, l_0),$ $(k_0 + 8, l_0), (k_0 + 10, l_0)$ | 0, 0, 0, 0, 0, 0 | 0 | 0 |
| 2 | 1 | 3 | No CDM | $(k_0, l_0), (k_0 + 4, l_0), (k_0 + 8, l_0)$ | 0, 0, 0 | 0 | 0 |
| 3 | 1 | 1, 0.5 | No CDM | $(k_0, l_0),$ | 0 | 0 | 0 |
| 4 (Alt 1) | 2 | 6 | No CDM | $(k_0, l_0), (k_0 + 2, l_0), (k_0 + 4, l_0), (k_0 + 6, l_0),$ $(k_0 + 8, l_0), (k_0 + 10, l_0), (k_1, l_0), (k_1 + 2, l_0),$ $(k_1 + 4, l_0), (k_1 + 6, l_0), (k_1 + 8, l_0), (k_1 + 10, l_0)$ | 0, 0, 0, 0, 0, 0, 1, 1, 1, 1, 1, 1 | 0 | 0 |
| 4 (Alt 2) | 2 | 6 | FD-CDM2 | $(k_0, l_0), (k_0 + 2, l_0), (k_0 + 4, l_0), (k_0 + 6, l_0),$ $(k_0 + 8, l_0), (k_0 + 10, l_0)$ | 0, 0, 0, 0, 0, 0 | 0, 1 | 0 |
| 5 | 2 | 3 | FD-CDM2 | $(k_0, l_0), (k_0 + 4, l_0), (k_0 + 8, l_0)$ | 0, 1, 2 | 0, 1 | 0 |
| 6 | 2 | 1, 0.5 | FD-CDM2 | $(k_0, l_0),$ | 0 | 0, 1 | 0 |

Hereinafter, a configuration for a channel through which SL CSI is transmitted and a channel selection method according to a transmission resource allocation mode (mode 1/2) will be described. The channel through which the SL CSI is transmitted may consider the following methods.

SL CSI Transmission Channel
  Method 1: SL CSI is piggybacked through a PSSCH together with data and transmitted
  Method 2: SL CSI is transmitted through a PSSCH without data (SL CSI only transmission)
  Method 3: SL CSI is transmitted through a PSFCH As in the method 1 or 2, when the receiving UE reports SL CSI to the transmitting UE through the PSSCH, a channel selection method may vary according to a transmission resource allocation mode (mode 1/2). In the sidelink, a mode (mode 1) in which the corresponding base station configures allocation of transmission resources, as described with reference to FIG. 4 and a mode (mode 2) in which the UE allocates transmission resources through direct sensing, as described with reference to FIG. 5 are supported.

In the case of the mode 1, the UE requests a transmission resource to the base station for SL CSI reporting (see step 430 of FIG. 4) and receives allocation of a PSSCH resource from the base station through DCI (see step 440 of FIG. 4). Therefore, the UE may transmit data through a PSSCH allocated from the base station, and in this case, the receiving UE may report SL CSI information to the transmitting UE through the PSSCH (method 1 or 2).

In this case, when the receiving UE determines whether to use the method 1 or the method 2 as one method, and reports SL CSI to the transmitting UE, the receiving UE may indicate whether to use the method 1 or the method 2. As a method of indicating the method 1 or the method 2, an explicit signaling method and an implicit indication method may be considered while the receiving UE transmits SCI to the transmitting UE through the PSCCH.

In an explicit method, the method 1 or the method 2 may be indicated using the predetermined number of bit information (e.g., 1-bit information) in SCI.

In an implicit method, for example, if the condition that an MCS index is a predetermined value (e.g., 29) in the SCI field and that a CSI report field is ON and that a size of the scheduled PRB is smaller than or equal to a predetermined value or a configured value (X) is satisfied, it may be interpreted as indicating the method 2 and otherwise indicating the method 1. Alternatively, the opposite interpretation is possible.

Alternatively, when the transmitting UE requests SL CSI reporting by SCI through the PSCCH, whether the receiving UE may explicitly or implicitly indicate through SCI whether to use the method 1 or the method 2.

In an explicit method, the method 1 or the method 2 may be indicated using the predetermined number of bit information (e.g., 1-bit information) in SCI.

In an implicit method, for example, if the condition that an MCS index is a predetermined value (e.g., 29) in the SCI field and that the CSI report field is ON and that a size of the scheduled PRB is smaller than or equal to a predetermined value or a configured value (X) is satisfied, it may be interpreted as indicating the method 2 and otherwise indicating the method 1. Alternatively, the opposite interpretation is possible.

The transmitting UE that has received SL CSI reported by the receiving UE through the PSSCH in an indication method of the above proposed method 1 or method 2 may decode the PSSCH and interpret the corresponding information.

Alternatively, in the case of the mode 2, the UE directly selects a PSSCH resource through sensing. Further, the transmitting UE notifies the receiving UE of transmission resource allocation information through SCI. Therefore, the mode 2 may operate not only in IC but also in an OCC/PC environment. In the mode 2, when the receiving UE feeds back SL CSI to the transmitting UE, a method in which the receiving UE directly determines a PSSCH resource for transmitting the SL CSI through sensing of the mode 2 and resource selection, and a method in which the transmitting UE requests feedback of SL CSI to the PSSCH resource determined through sensing of the mode 2 and resource selection may be considered.

Even in the mode 2, when the receiving UE reports SL CSI to the transmitting UE, as the method 1 or 2 to be used, a method in which the receiving UE explicitly or implicitly indicates the transmitting UE by SCI and a method in which the transmitting UE explicitly or implicitly indicates through SCI when the transmitting UE requests SL CSI reporting to the receiving UE, as described above may be considered.

The method 3 is a method in which the receiving UE reports SL CSI to the transmitting UE through a PSFCH. For the method 3, it is assumed that a PSFCH format capable of transmitting SL CSI is defined. In this case, the UE may receive allocation of a PSFCH transmission resource in the resource pool. Unlike a PSSCH transmission resource allocation method, the UE may (pre-)configured with the PSFCH transmission resource having a period of N slots. Specifically, a preconfiguration method is a method of pre-storing a PSFCH transmission resource period N in the UE, or a PSFCH transmission resource period N value may be configured in an upper layer. When using a higher layer, the PSFCH transmission resource period N value may be configured through Uu-RRC or PC5-RRC. A (pre-)configuration for the PSFCH transmission resource may include a configuration that does not allocate the PSFCH transmission resource.

When the PSSCH and the PSFCH are simultaneously supported as a channel through which SL CSI is transmitted, the UE receiving the SL CSI may not know information on a channel through which the SL CSI is transmitted, and there is uncertainty as to whether SL CSI is transmitted to the PSSCH or the PSFCH. To solve this problem, the following two methods may be considered.

Configuration for a Channel Through which SL CSI is Transmitted (when Both the PSSCH and the PSFCH are Supported as Channels Through which SL CSI is Transmitted)

Method 1: When the transmitting UE triggers/activates SL CSI reporting, the receiving UE signals whether to feed back the SL CSI to the PSSCH or the PSFCH through 1-bit SCI.

Method 2: When the receiving UE feeds back SL CSI to the transmitting UE, the receiving UE signals to the transmitting UE on whether the SL CSI is transmitted to the PSSCH or the PSFCH through 1-bit SCI.

The method 1 is a method in which the transmitting UE indicates the receiving UE information on a channel through which the SL CSI is to be transmitted. In contrast, the method 2 is a method in which the receiving UE determines a channel to feed back SL CSI and notifies the transmitting UE of the channel. Compared to the method 1, the method 2 has an advantage that a UE performing feedback can directly determine a channel appropriate for feedback among currently valid feedback channels.

Unlike a channel state information framework in a Uu interface between the base station and the UE, in a channel state information framework of an NR sidelink system, difficulties may arise in a process in which the transmitting UE requests SL CSI reporting and in which the receiving UE performs SL CSI reporting.

Specifically, in the case of the mode 1, the UE may transmit SL CSI information through a PSSCH resource allocated from the base station (see the above SL CSI transmission channel method 1 or method 2). However, when the transmitting UE requested SL CSI reporting, but the receiving UE does not receive allocation of the PSSCH resource from the base station in time, a problem may occur that SL CSI reporting of the receiving UE is delayed.

In the mode 2, when the receiving UE feeds back SL CSI to the transmitting UE, a method in which the receiving UE directly determines a PSSCH resource for transmitting the SL CSI through sensing of the mode 2 and resource selection and a method in which the transmitting UE requests feedback of SL CSI to the PSSCH resource determined through sensing of the mode 2 and resource selection may be considered. Even in the mode 2, even when the receiving UE feeds back SL CSI to the transmitting UE, the available PSSCH resources may not be allocated in time.

In order to solve such a problem, the following valid SL CSI window configuring method may be considered.

Method of Configuring a Valid SL CSI Window

Method 1: When a valid SL CSI window is configured to the transmitting UE and it is determined that it is difficult to receive SL CSI feedback from the receiving UE within the SL CSI window, the transmitting UE does not request SL CSI or when the transmitting UE does not receive feedback until the SL CSI window is exceeded, the transmitting UE may determine that feedback will not come from the receiving UE.

Method 2: When a valid SL CSI window is configured to the receiving UE and the SL CSI window is exceeded, the receiving UE does not report SL CSI to the transmitting UE.

The valid SL CSI window may be configured to report setting of a channel state information framework of the NR sidelink system. Further, the SL CSI window may be configured in units of slots. The SL CSI window may be configured by reflecting the feedback delay requirement.

As in the methods 1 and 2, the SL CSI window may be separately configured for the transmitting UE and the receiving UE, and the SL CSI window may be commonly configured for the transmitting UE and the receiving UE.

In the method 1, when the transmitting UE requests feedback of SL CSI through the PSSCH resource determined through sensing and resource selection in the mode 2, the transmitting UE may determine whether the PSSCH resource is valid to receive SL CSI feedback by referring to the valid SL CSI window. For example, when a valid PSSCH resource does not satisfy a feedback delay, the transmitting UE may not request SL CSI. Further, when the SL CSI window is exceeded by referring to the valid SL CSI window, the transmitting UE may determine that feedback from the receiving UE is not received.

In the method 2, as an occasion of the PSSCH resource allocated from the base station in the mode 1 or the PSSCH resource selected to transmit SL CSI through sensing and resource selection in the mode 2 by the receiving UE exceeds the SL CSI window referring to the valid SL CSI window, when a feedback delay is not satisfied, the receiving UE may not report the SL CSI to the transmitting UE. As described above, when the valid SL CSI window is used, the SL CSI request and reporting may be more effectively operated in the sidelink.

Further, when both a PSSCH and PSFCH are supported as channels through which SL CSI is transmitted and the receiving UE may select a channel to report SL CSI to the transmitting UE, the UE reporting SL CSI may use a method of selecting and transmitting a channel capable of transmitting faster among valid PSSCH and PSFCH resources. Further, when the receiving UE reports SL CSI using the corresponding channel, a method of notifying the transmitting UE of information on which channel is selected and transmitted may be used. In this case, the receiving UE may consider a method of notifying the transmitting UE through SCI of the PSCCH.

As described above, when the SL CSI is transmitted through the PSSCH or the PSFCH, as SL CSI reporting, non-subband-based aperiodic SL CSI reporting, which is reported only for the frequency domain corresponding to the PSSCH transmitted by the transmitting UE, is considered. An Uu interface between the base station and the UE determines whether to use wideband PMI/CQI in which a CSI-RS is transmitted in all bands and that reports one PMI or CQI in the entire frequency band or whether to use subband PMI/CQI that divides the frequency band into several subbands and that then reports one PMI or CQI for each subband and receives CSI reporting, but because the sidelink is communication between UEs, an SL CSI-RS is not transmitted in all bands, but is transmitted through the PSSCH only in a frequency domain in which resources are allocated to the PSSCH, non-subband-based aperiodic SL CSI reporting is used.

As described above, aperiodic SL CSI reporting is considered in the disclosure. SL CSI reporting may be enabled/disabled separately from triggering/activation of aperiodic SL CSI reporting. Enabling/disabling for SL CSI reporting may be configured to report setting of a channel state information framework of the NR sidelink system. Further, only when SL CSI reporting is enabled, the SL CSI reporting may be triggered/activated. Various methods for triggering/activating SL CSI reporting may be considered as follows.

Method of Triggering/Activating SL CSI Reporting

Method 1: When SL CSI reporting is enabled, the SL CSI reporting is automatically triggered/activated.

Method 2: SL CSI reporting is enabled and the SL CSI reporting is triggered/activated by SCI.

Method 3: SL CSI reporting is enabled and the SL CSI reporting is triggered/activated by an MAC CE.

Method 4: When SL HARQ-ACK reporting is enabled and the receiving UE transmits NACK to the transmitting UE a predetermined number of times ($X(\geq 1)$ times), SL CSI reporting is triggered/activated.

Method 5: When an SL RSRP value reported by the receiving UE to the transmitting UE is lower than the threshold X, SL CSI reporting is triggered/activated.

Method 6: When SL CSI reporting is enabled and CSI-RS transmission is configured, SL CSI reporting is triggered/activated.

Method 7: When SL CSI reporting is enabled and a timer configured to the receiving UE is terminated, SL CSI reporting is triggered/activated.

Method 8: When SL CSI reporting is enabled and a timer configured to the transmitting UE is terminated, SL CSI reporting is triggered/activated.

First, the methods 1, 4, 5, 6, and 7 are methods in which the transmitting UE does not use additional signaling in triggering/activating SL CSI reporting to the receiving UE.

The methods 2, 3, 6, and 8 are methods in which the transmitting UE uses additional signaling in triggering/activating SL CSI reporting to the receiving UE. Specifically, the method 2 is a method using SCI, the method 3 is a method using an MAC CE, and the method 6 is an implicit method and is a method of triggering/activating SL CSI reporting.

The method 6 is a method of indirectly determining whether SL CSI reporting is triggered/activated according to whether CSI-RS transmission is configured. In this case, a configuration of SL CSI-RS transmission may be included in a configuration for an SL CSI-RS in a resource set in resource setting of a channel state information framework of the NR sidelink system. Alternatively, SL CSI-RS transmission may be configured through SCI or MAC CE. Therefore, the method 6 is a method in which SL CSI reporting is triggered/activated when SL CSI-RS transmission is configured and thus an SL CSI-RS is transmitted.

The method 8 is a method of triggering/activating SL CSI reporting after SL CSI reporting is enabled and a timer configured to the transmitting UE is terminated. The timer may be operated from a time point when SL CSI reporting is enabled. Further, an operation of randomly selecting whether to trigger/activate SL CSI reporting at a time point when the timer configured to the transmitting UE is terminated may be additionally considered. Thereafter, the timer may be restarted immediately after the timer is terminated. Alternatively, after the timer is terminated and whether to trigger/activate SL CSI reporting is selected, the timer may be restarted. In this case, a configuration value of the timer may be the same as a previous value or may be selected again to a different value.

Specifically, in the method 8, after the timer configured to the transmitting UE is terminated, an SL CSI-RS is transmitted in an available resource pool, and one of the methods 2, 3, and 6 may be used for triggering/activating SL CSI reporting. The method 8 may be used as a simple method of operating aperiodic SL CSI reporting in the sidelink and be described as an operation of a transmitting UE. Further, in the method 2, an SCI format for triggering/activating SL CSI reporting may be designed in the same way as a general SCI format or may be designed to be distinguished from a different format. Further, in an extended form of the method 4, in sidelink groupcast, a method in which SL HARQ-ACK reporting is enabled and in which only an UE that has transmitted NACK X($\geq$1) times among UEs in the group triggers/activates SL CSI reporting may be used.

The method 7 is a method in which SL CSI reporting is triggered/activated when SL CSI reporting is enabled and a timer configured to the receiving UE is terminated. The timer may be operated from a time point when SL CSI reporting is enabled. Further, an operation of randomly selecting whether to trigger/activate SL CSI reporting at a time point when the timer configured to the receiving UE is terminated may be additionally considered. Thereafter, the timer may be restarted immediately after the timer is terminated. Alternatively, after the timer is terminated and whether to trigger/activate SL CSI reporting is selected, the timer may be restarted. In this case, a configuration value of the timer may be the same as a previous value or may be selected again to a different value.

The methods 7 and 8 are methods in which each of the receiving UE and the transmitting UE configures a timer. The configuration of the timer may be UE implementation and a method of configuring a configuration value of the timer to report setting of a channel state information framework of the above-described NR sidelink system may be used. For example, a single timer value may be configured to report setting of the channel state information framework, and a method in which a plurality of timer values are configured and in which the UE randomly selects a timer among the configured values may be considered.

When there are one or more pieces of information included in SL CSI, there may be dependency between SL CSI information. Specifically, when the UE feeds back CQI+RI, the CQI may be calculated based on the RI. In the disclosure, reporting on CQI+RI assumes that CQI and RI are always reported together. When the UE feeds back CQI+RI+PMI, the CQI is calculated based on the determined PMI and RI. Hereinafter, a method of generating SL CSI will be described in more detail through a definition of CQI in the sidelink and a definition of a CSI reference resource. First, the CQI in the sidelink may be defined as follows.

SL CQI

In FIG. 6, the UE 620 corresponding to the receiver in the sidelink determines each CQI value reported in a slot n to the highest CQI index satisfying the following condition.

* One PSSCH TB transport block configured with a combination of a modulation scheme, a target code rate, and a transport block size corresponding to the CQI index should be receivable so as not to exceed the following transport block error probability. Here, the PSSCH TB transport block occupies a sidelink physical resource block or subchannels referred to as SL CSI reference resources.

** 0.1, if a cqi-Table in SL-CSI-ReportConfig indicates a 'table1' ([Table 2] or [Table 5]) or a 'table2' ([Table 3] or [Table 6]) as an upper layer configuration,

** 0.00001, if a cqi-Table in SL-CSI-ReportConfig indicates a 'table3' ([Table 4] or [Table 7]) as a higher layer configuration, A case in which a target transport block error probability is configured to 0.1 is a case configured to use a 'table1' ([Table 2] or [Table 5]) or a 'table2' ([Table 3] or [Table 6]). Both the 'table1' and the 'table2' are CQI tables designed in consideration of a target transport block error probability of 0.1.

In the 'table1' ([Table 2] or [Table 5]), modulation was considered to QPSK, 16QAM, and 64QAM, and in the 'table2' ([Table 3] or [Table 6]), modulation was considered to QPSK, 16QAM, 64QAM, and 256QAM. When up to 64QAM is supported in the sidelink, the 'table1' ([Table 2] or [Table 5]) may be used, and when up to 256QAM is supported in the sidelink, the 'table2' ([Table 3]) or [Table 6]) may be used. Further, it is possible to indicate whether to use the 'table1' ([Table 2] or [Table 5]) or the 'table2' ([Table 3] or [Table 6]) according to a situation through a configuration. A corresponding configuration may be indicated by an SL-SIB through a configuration in the resource pool or may be indicated through Uu-RRC or PC5-RRC connection. Further, a method of indicating through SCI may be considered.

A case in which the target transport block error probability is configured to 0.00001 is a case configured to use a 'table3' [Table 4] or [Table 7]). The 'table3' ([Table 4] or [Table 7]) is a CQI table designed in consideration of a target transport block error probability of 0.00001, and modulation was considered to QPSK, 16QAM, and 64QAM.

As described above, the reason why two target transport block error probabilities of 0.1 and 0.00001 are considered is that service requirements may be different. The NR sidelink also defines PQIs (PC5 5QIs) for various QoS requirements, and PQI includes a default priority level, a packet delay budget, a packet error rate, a default maximum date burst volume, and a default averaging window. Here, the packet error rate may be configured to various values between 10^-1 and 10^-5. As described above, it may be operated using a configuration of two target transport block error probabilities of 1 and 0.00001, but for more accurate QoS support, it is also possible to support a configuration of more subdivided target transport block error probabilities other than 1 and 0.00001. For example, when a target transport block error probability configuration of 0.001 is additionally introduced, a corresponding CQI table may be additionally defined.

[Table 2], [Table 3], and [Table 4] are CQI tables configured with 4 bits, and [Table 5], [Table 6], and [Table 7] are CQI tables configured with 5 bits. When the CQI tables of [Table 2], [Table 3], and [Table 4] are used, it is possible to save the number of feedback bits by 1 bit, compared to the case of using the CQI tables of [Table 5], [Table 6], and [Table 7]. Alternatively, when the CQI tables of [Table 5], [Table 6], and [Table 7] are used, the CQI tables may be one-to-one mapping with an index of an MCS table used by the transmitting UE, so that it may be more convenient for the transmitting UE to receive CQI reporting from the receiving UE and to determine a transmission parameter.

In [Tables 2 to 7], reporting of a CQI index 0 to the transmitting UE by the receiving UE may be interpreted as an operation indicating that a current channel state is a state in which reception is impossible. Further, in Tables 2 to 7, reporting of a CQI index 1 to the transmitting UE by the receiving UE may be interpreted as an operation indicating that a current channel state is a state in which reception of a PSCCH is possible but reception of a PSSCH is impossible.

Further, when a channel busy ratio (CBR) is considered upon transmitting SL CSI, an index available in the CQI table may be limited. A specific method thereof will be described in more detail below. Therefore, in this case, the highest CQI index in the CQI definition may be selected from a CQI index region limited by the CBR.

TABLE 2

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 499 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 3

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

TABLE 4

| CQI index | modulation | code rate × 1024 | efficiency |
|---|---|---|---|
| 0 | | out of range | |
| 1 | QPSK | 30 | 0.0586 |
| 2 | QPSK | 50 | 0.0977 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |

TABLE 4-continued

| CQI index | modulation | code rate × 1024 | efficiency |
|---|---|---|---|
| 14 | 64QAM | 666 | 3.9023 |
| 15 | 64QAM | 772 | 4.5234 |

TABLE 5

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 157 | 0.3066 |
| 4 | QPSK | 193 | 0.3770 |
| 5 | QPSK | 251 | 0.4902 |
| 6 | QPSK | 308 | 0.6016 |
| 7 | QPSK | 379 | 0.7402 |
| 8 | QPSK | 449 | 0.8770 |
| 9 | QPSK | 526 | 1.0273 |
| 10 | QPSK | 602 | 1.1758 |
| 11 | QPSK | 679 | 1.3262 |
| 12 | 16QAM | 340 | 1.3281 |
| 13 | 16QAM | 378 | 1.4766 |
| 14 | 16QAM | 434 | 1.6953 |
| 15 | 16QAM | 490 | 1.9141 |
| 16 | 16QAM | 553 | 2.1602 |
| 17 | 16QAM | 616 | 2.4063 |
| 18 | 16QAM | 658 | 2.5703 |
| 19 | 64QAM | 438 | 2.5664 |
| 20 | 64QAM | 466 | 2.7305 |
| 21 | 64QAM | 517 | 3.0293 |
| 22 | 64QAM | 567 | 3.3223 |
| 23 | 64QAM | 616 | 3.6094 |
| 24 | 64QAM | 666 | 3.9023 |
| 25 | 64QAM | 719 | 4.2129 |
| 26 | 64QAM | 772 | 4.5234 |
| 27 | 64QAM | 822 | 4.8164 |
| 28 | 64QAM | 873 | 5.1152 |
| 29 | 64QAM | 910 | 5.3320 |
| 30 | 64QAM | 948 | 5.5547 |
| 31 | | reserved | |

TABLE 6

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 434 | 1.6953 |
| 9 | 16QAM | 490 | 1.9141 |
| 10 | 16QAM | 553 | 2.1602 |
| 11 | 16QAM | 616 | 2.4063 |
| 12 | 16QAM | 638 | 2.5703 |
| 13 | 64QAM | 466 | 2.7305 |
| 14 | 64QAM | 517 | 3.0293 |
| 15 | 64QAM | 567 | 3.3223 |
| 16 | 64QAM | 616 | 3.6094 |
| 17 | 64QAM | 666 | 3.9023 |
| 18 | 64QAM | 719 | 4.2129 |
| 19 | 64QAM | 772 | 4.5234 |
| 20 | 64QAM | 822 | 4.8164 |
| 21 | 64QAM | 873 | 5.1152 |
| 22 | 256QAM | 682.5 | 5.3320 |
| 23 | 256QAM | 711 | 5.5547 |
| 24 | 256QAM | 754 | 5.8906 |
| 25 | 256QAM | 797 | 6.2266 |
| 26 | 256QAM | 841 | 6.5703 |
| 27 | 256QAM | 885 | 6.9141 |
| 28 | 256QAM | 916.5 | 7.1602 |

TABLE 6-continued

| CQI index | modulation | code rate × 1024 | efficiency |
|---|---|---|---|
| 29 | 256QAM | 948 | 7.4063 |
| 30 | | reserved | |
| 31 | | reserved | |

TABLE 7

| CQI index | modulation | code rate × 1024 | efficiency |
|---|---|---|---|
| 0 | | out of range | |
| 1 | QPSK | 30 | 0.0586 |
| 2 | QPSK | 40 | 0.0781 |
| 3 | QPSK | 50 | 0.0977 |
| 4 | QPSK | 64 | 0.1250 |
| 5 | QPSK | 78 | 0.1523 |
| 6 | QPSK | 99 | 0.1934 |
| 7 | QPSK | 120 | 0.2344 |
| 8 | QPSK | 157 | 0.3066 |
| 9 | QPSK | 193 | 0.3770 |
| 10 | QPSK | 251 | 0.4902 |
| 11 | QPSK | 308 | 0.6016 |
| 12 | QPSK | 379 | 0.7402 |
| 13 | QPSK | 449 | 0.8770 |
| 14 | QPSK | 526 | 1.0273 |
| 15 | QPSK | 602 | 1.1758 |
| 16 | 16QAM | 340 | 1.3281 |
| 17 | 16QAM | 378 | 1.4766 |
| 18 | 16QAM | 434 | 1.6953 |
| 19 | 16QAM | 490 | 1.9141 |
| 20 | 16QAM | 553 | 2.1602 |
| 21 | 16QAM | 616 | 2.4063 |
| 22 | 64QAM | 438 | 2.5664 |
| 23 | 64QAM | 466 | 2.7305 |
| 24 | 64QAM | 517 | 3.0293 |
| 25 | 64QAM | 567 | 3.3223 |
| 26 | 64QAM | 616 | 3.6094 |
| 27 | 64QAM | 666 | 3.9023 |
| 28 | 64QAM | 719 | 4.2129 |
| 29 | 64QAM | 772 | 4.5234 |
| 30 | | reserved | |
| 31 | | reserved | |

Hereinafter, the CSI reference resource in the sidelink may be defined as follows.

SL CSI Reference Resource Definition

An SL CSI reference resource in which the UE 620 corresponding to the receiving end in the sidelink receives a CSI-RS so as to generate SL CSI information may be defined as follows.

* In the frequency domain, the SL CSI reference resource is defined by a sidelink physical resource block or a group of subchannels corresponding to a band inducing SL CSI.
* In the time domain, a CSI reference resource 910 is defined to a slot n-nCSIref when channel state information reporting is performed in a sidelink slot n (920).
** For aperiodic SL CSI reporting, nCSIref may be classified as follows.
*** When it is configured to report channel state information in the same slot as a sidelink slot in which an SL CSI request is transmitted, nCSIref is 0 and indicates the sidelink slot in which the CSI request is transmitted.
*** In other cases, nCSIref is greater than or equal to a time required for the UE to calculate CSI and may be a value corresponding to a sidelink slot in which an SL CSI-RS closest to n is transmitted.

According to an embodiment of the disclosure, when the UE reports channel state information, the UE may report channel state information measured based on a CSI-RS resource 930 at the same time point as or at a previous time point of that of a CSI reference resource corresponding to channel state information reporting. A related operation may be determined by configuration information on measurement restriction to CSI report setting of the channel state information framework of the NR sidelink system. When measurement restriction is configured, the channel state is measured using only a CSI-RS resource at the same time point as that of the CSI reference resource, and when measurement restriction is not configured, channel measurement may be performed using both the CSI-RS resource at the same time point as and the CSI-RS resource at the previous time point of that of the CSI reference resource.

When it is configured to determine the CQI index in the SL CSI reference resource, the UE corresponding to the receiver in the sidelink may assume part or all of the following cases for the purpose of deriving the CQI index.

* The A number of OFDM symbols are used as a control channel.
* The B number of OFDM symbols are used as AGC symbols.
* The C number of OFDM symbols are used for a GP.
* The number of PSSCH and DMRS symbols is D.
* The same SCS as SL BWP is configured for receiving a PSSCH.
* A reference resource uses a CP length and SCS configured for receiving a PSSCH.
* No RE is used as an SSB.
* A value of RV is 0.
* EPRE of the PSSCH and CSI-RS are the same.
* No RE is allocated as NZP CSI-RS or ZP CSI-RS.
* It is assumed that the number of front-loaded DMRS symbols is one and the number of additional DMRSs is a value configured by the SCI or the resource pool.
* It is assumed that the PSSCH symbol does not include a DMRS.
* A PRB bundling size is assumed to 2PRB.
* PSSCH transmission may be performed up to two transmission layers. In order to calculate the CQI index, the UE assumes that the PSSCH of [0, v−1] corresponding to the v number of layers is transmitted to an antenna port of [0, . . . , P−1], as in the following equation.

$$\begin{bmatrix} y^{(0)}(i) \\ \dots \\ y^{(P-1)}(i) \end{bmatrix} = W(i) \begin{bmatrix} x^{(0)}(i) \\ \dots \\ x^{(v-1)}(i) \end{bmatrix}$$

Here, $x(i)=[x^{(0)}(i) \dots x^{(v-1)}(i)]^T$ denotes a vector for a PSSCH symbol. P denotes the number of SL CSI-RS ports. When one CSI-RS port is configured, $W(i)$ becomes 1. When reportQuantity of SL-CSI-ReportConfig is configured to 'CQI-RI-PMI', $W(i)$ becomes a precoding matrix corresponding to the reported PMI applicable to $x(i)$. When reportQuantity of SL-CSI-ReportConfig is configured to 'CQI' or 'CQI-RI', $W(i)$ becomes an identity matrix scaled to $1/\sqrt{v}$ by the number v of layers.

In the above description, the assumption for time domain resource use of a slot for determining the sidelink CQI index is as follows. When it is configured to report the CQI index in the SL CSI reference resource, the UE corresponding to the receiving end in the sidelink assumes the following description for the purpose of deriving the CQI index.

[Assumption Set 1]
* The first two OFDM symbols in the slot are used as control channels.
* The number of PSSCH and DMRS symbols in the slot is 8
* One OFDM symbol is used for a GP.
* Two OFDM symbols are used as a PSFCH.
* One OFDM symbol is used for a GP.

Alternatively, the assumption set 2 may be applied as follows.

[Assumption Set 2]
* The first two OFDM symbols in the slot are used as control channels.
* The number of PSSCH and DMRS symbols in the slot is 11
* One OFDM symbol is used for a GP.

The assumption set 1 may be for a case in which a resource occupied by the PSFCH exists in the slot, and the assumption set 2 may be for a case where there is no resource occupied by the PSFCH in the slot.

Whether the assumption used by the UE measuring and reporting CSI upon generating CSI is applied as the assumption set 1 or the assumption set 2 may be determined according to the resource pool configuration or may be determined according to a bit field of PC5-RRC or SCI.

Alternatively, an assumption set to be used among the assumption sets to be used upon generating CSI may be determined according to presence or absence of a PSFCH resource included in a slot in which a sidelink CSI-RS is transmitted. That is, if the PSFCH resource is present in a slot in which a CSI-RS is transmitted, the assumption set 1 is applied, and if the PSFCH resource is not present in a slot in which a CSI-RS is transmitted, the assumption set 2 is applied.

As another example, a method of generating CSI feedback information including the CQI index and assuming time domain resource use of a slot for determining a sidelink CQI index using a structure of a slot in which an actual sidelink CSI-RS is transmitted is possible. That is, when a CSI-RS is transmitted in the sidelink, the CSI-RS is always transmitted together with the PSSCH; thus, in a slot in which the CSI-RS is transmitted, by utilizing and assuming actual mapping resources such as the number of symbols and the frequency resource occupied by the PSSCH, it may be possible to generate the CQI index and the like.

Embodiment 1

In the sidelink, because an SL CSI-RS is not transmitted in all bands but is transmitted only in the scheduled PSSCH region, a frequency domain of the scheduled PSSCH is small and a sample of the SL CSI-RS is insufficient, which may cause inaccuracy in the measurement result, and a method of solving this is proposed in the embodiment 1. To solve such a problem, the following methods may be considered.

Method of Ensuring Accuracy of Measurement Using an SL CSI-RS
* Method 1: Method of increasing a frequency density per port per RB of an SL CSI-RS
* Method 2: Method of boosting power of an SL CSI-RS
* Method 3: Method of forcing to schedule the number of subchannels (or the number of RBs) on a frequency of a PSSCH to a predetermined value (X) or more
* Method 4: Method of preventing an SL CSI-RS from being transmitted when the number of subchannels (or number of RBs) on a frequency of a PSSCH is smaller than a predetermined value (X)
* Method 5: Method of allowing SL CSI-RS transmission, but limiting an operation of the UE even when the number of subchannels (or RBs) on a frequency of a PSSCH is smaller than X The method 1 is a method of using a pattern in which a frequency density per port per RB of the SL CSI-RS is greater than 1, as suggested in [Table 1]. In [Table 1], there was proposed a pattern in which, when an SL CSI-RS port is 1, a frequency density per port per RB of the SL CSI-RS is 6, and when an SL CSI-RS port is 2, there was proposed a pattern in which a frequency density per port per RB of the SL CSI-RS are 3 and 6.

In [Table 1], when the SL CSI-RS port is 1, a pattern in which a frequency density per port per RB of an SL CSI-RS is 3 is a pattern used as a TRS in NR Uu, and may be used for the purpose of securing a sample of the SL CSI-RS according to the frequency domain of the scheduled PSSCH.

When the method 1 is used, a receiving UE operation may be considered as follows. A first operation is a method in which a pattern in which a frequency density per port per RB of an SL CSI-RS is greater than 1 is always used and in which the UE uses the pattern for SL RLM and SL RSRP measurement as well as for SL CSI reporting. A second operation is a method in which, when a pattern in which a frequency density per port per RB of an SL CSI-RS is 1 is transmitted, the UE does not use the corresponding SL CSI-RS for SL RLM and SL RSRP measurement, but uses the corresponding SL CSI-RS for only SL CSI reporting.

The method 2 is a method of applying power boosting to the SL CSI-RS and is a method in which the transmitting UE may apply 3 dB power boosting to an SL CSI-RS RE for SL CSI-RS patterns of patterns 840 and 870. This may be a method of improving accuracy of measurement using the SL CSI-RS in an environment where samples of the SL CSI-RS according to the frequency domain of the PSSCH scheduled in the sidelink are insufficient. A method of obtaining an SL CSI-RS EPRE of the receiving UE according to power boosting of the SL CSI-RS refers to an embodiment 2.

The method 3 is a method of forcing to schedule the number of subchannels (or the number of RBs) on a frequency of a PSSCH to a predetermined value (X) or more. For example, a method of enabling to schedule 10 RB or more on a frequency of the PSSCH or a method of defining a minimum size of a configurable subchannel (sizeSubchannel) to 10 RB or more, as described in FIG. 3 may be considered. However, there is a disadvantage in that a scheduling restriction occurs when the method 3 is used.

The method 4 is a method of preventing an SL CSI-RS from being transmitted when the number of subchannels (or the number of RBs) on a frequency of a PSSCH is smaller than a predetermined value (X). When the method 4 is used, a receiving UE operation may be considered as follows. Because an SL CSI-RS is not transmitted, the UE does not perform SL RLM and SL RSRP measurement using the corresponding SL CSI-RS. Further, the UE does not measure and report SL CSI. Although the predetermined value of the disclosure is denoted by X for convenience of description, it may be configured differently according to each embodiment and method.

The method 5 is a method of allowing SL CSI-RS transmission but limiting an operation of the receiving UE, when the number of subchannels (or the number of RBs) on a frequency of a PSSCH is smaller than a predetermined value (X). When the method 5 is used, a receiving UE operation may be considered as follows. The first method determines that the SL CSI-RS received by the receiving UE is not valid and does not perform SL RLM and SL RSRP measurement using the SL CSI-RS. Further, the receiving UE does not measure and report SL CSI.

In another method, the receiving UE determines that the received SL CSI-RS is not valid and does not perform SL RLM and SL RSRP measurement using the corresponding SL CSI-RS. However, when SL CSI reporting is triggered/activated together with transmission of an SL CSI-RS that cannot guarantee measurement accuracy, the SL CSI-RS that cannot guarantee measurement accuracy is not used for SL CSI generation, and as described above, when there is a received SL CSI-RS in the SL CSI window of the receiving UE, SL CSI may be generated and reported using the corresponding SL CSI-RS. Such an operation refers to the above description.

When there is no received SL CSI-RS in the SL CSI window of the UE, the receiving UE may not report SL CSI to the transmitting UE or may report SL CSI configured as a default value. Here, the default value may be the previously fed back SL CSI.

In the method 3/4/5, the number of subchannels (or the number of RBs) on a frequency of the PSSCH may mean the number of subchannels, the number of total RBs determined by the number of transmitted subchannels, or the number of RBs configured by one subchannel.

Embodiment 2

In the embodiment 2 of the disclosure, a UE operation related to an SL CSI-RS power configuration is proposed. A UE-to-UE communication environment in the sidelink is very different from a base station-to-UE communication environment in Uu. In the case of downlink communication between the base station and the UE in Uu, the base station transmits a signal with fixed power, and a magnitude of the signal received by the UE varies according to a reception environment of the UE. Therefore, when the base station transmits a CSI-RS in a downlink of Uu, if CSI-RS power is not boosted, the CSI-RS is transmitted with the same power as that of data transmitted to the PDSCH.

However, in the sidelink, a power control operation of the transmitting UE is supported. Therefore, power of the signal transmitted by the UE is not fixed but may vary. Power of an SL CSI-RS transmitted by the transmitting UE is also not fixed but may vary. In order for the receiving UE to generate SL CSI, the receiving UE receives the SL CSI-RS, identifies a channel state through channel estimation thereof, and feeds back CSI information such as CQI and RI appropriate for a PSSCH to the transmitting UE. Therefore, when the receiving UE knows an SL CSI-RS energy per resource element (EPRE) corresponding to transmission power of the SL CSI-RS, which is a reference signal, the receiving UE may receive the SL CSI-RS based on the SL CSI-RS EPRE, perform channel estimation, and generate and report SL CSI corresponding thereto. Transmission power of the SL CSI-RS (SL CSI-RS EPRE) in the sidelink may be defined as average power (in [W]) to an RE in which the SL CSI-RS configured in a system BW is transmitted. As a method for the receiving UE to obtain the SL CSI-RS EPRE in the sidelink, the following methods may be considered.

Method for the Receiving UE to Obtain an SL CSI-RS EPRE
* Method 1: Directly receive information on SL CSI-RS transmission power
* Method 2: When information on other reference transmission power is transmitted to the receiving UE, use the information or receive offset information on the information.
* Method 3: Assume as maximum transmission power for a PSSCH
* Method 4: Receive reference power information for SL CSI-RS transmission power In the method 1, SL CSI-RS transmission power may be transmitted through the specific number of bits (e.g., [x] bits). For example, the transmission power may be displayed from −41 dBm to 31 dBm at intervals of 1 dBm. For example, the transmitting UE may transmit information on the SL CSI-RS EPRE through 7 bits. The specific number is the predetermined number or a transmitting UE of a predetermined sidelink may include information on the SL CSI-RS EPRE as a bit field in sidelink control information (SCI) transmitted to a sidelink control channel. In this way, when information on an SL CSI-RS EPRE is directly transmitted through SCI, a signaling overhead may occur.

The method 2 is a method of using, when information on another reference transmission power is transmitted to the receiving UE in the sidelink, the information or receiving and using offset information on the information. For example, the other reference transmission power may include transmission power of a synchronization signal, a DMRS transmitted to a PSBCH, or another reference signal. However, the above description is only an example, and the disclosure does not limit a reference signal that may be used as another reference transmission power.

When information on another reference transmission power is transmitted to the receiving UE, the transmitting UE does not need to separately transmit information on SL CSI-RS transmission power to the receiving UE. If the information on the other reference transmission power and the SL CSI-RS transmission power are the same, it may be determined that the receiving UE assumes the other reference transmission power as the SL CSI-RS transmission power. If the information on the other reference transmission power and the SL CSI-RS transmission power are not the same, the transmitting UE may transmit only offset information of the other reference transmission power and the SL CSI-RS transmission power to the receiving UE. In this case, the offset information may be defined as a ratio of an EPRE of another reference signal and an SL CSI-RS EPRE. The corresponding offset information may be transmitted through SCI and may be signaled with the number of bits smaller than the number of bits used for transmitting the SL CSI-RS transmission power in the method 1.

When the method 1 or 2 is used, there is an advantage in that SL CSI information may be generated based on the SL CSI-RS EPRE actually transmitted by the transmitting UE. Further, when the method 1 or 2 is used, an operation in which the receiving UE performs pathloss estimation from the SL CSI-RS EPRE is also possible. In this case, path pathloss estimation may be calculated as the difference between the SL CSI-RS EPRE and SL RSRP measured at the receiving end.

The method 3 is a method of assuming an SL CSI-RS EPRE as the maximum transmission power for a PSSCH. Therefore, the maximum transmission power for the PSSCH may be a value configured to $P_{CMAX,PSSCH}$. Here, $P_{CMAX,PSSCH}$ may be a value defined for a corresponding cell and a carrier transmitted with the maximum transmission power configured at a PSSCH occasion. However, when congestion control is performed, actual maximum transmission power may be limited. In this case, the maximum transmission power value limited by the CBR may be applied. Details thereof refer to [Table 8].

The method 4 is a method of transmitting reference power information on SL CSI-RS transmission power to the receiving UE. When reference power for SL CSI-RS transmission power is determined as the maximum transmission power for the PSSCH, the method 4 may be the same method as the method 3. However, in the method 4, the base station or the transmitting UE may configure reference power for SL CSI-RS transmission power, and change a configuration value.

For example, a method of configuring differently reference power according to a CBR may be considered. Specifically, a reference power value may be applied differently according to the CBR. When it is determined that channel occupancy is high because the CBR is high, reference power may be configured low. In contrast, when it is determined that channel occupancy is low because the CBR is low, reference power may be configured high. In this case, the reference power may be configured in a range from −41 dBm to 31 dBm. Reference power information on SL CSI-RS transmission power of the base station may be included in a resource pool configuration. The corresponding value may be pre-stored in the UE (preconfiguration). Alternatively, the information may be a value transmitted to an SL-SIB or configured through Uu-RRC or PC5-RRC. Alternatively, a method for indicating the information through SCI may also be considered.

When the receiving UE uses the above-described methods 3 and 4 for obtaining the SL CSI-RS EPRE, the SL CSI-RS EPRE may be different from an SL CSI-RS EPRE actually transmitted by the transmitting UE. Therefore, when an SL CSI-RS is received, channel estimation is performed, and SL CSI is generated using the methods 3 and 4, SL CSI appropriate for an actual sidelink channel environment may not be reported. Therefore, when the method 3 or 4 is used, the transmitting UE needs to correct and use SL CSI information received from the receiving UE. In this case, the transmitting UE may directly correct information on the SL CSI at the transmitter, but when generating SL CSI, the transmitting UE may request the receiving UE to correct the SL CSI.

Even in the case of using the methods 1 and 2, when correction of the SL CSI information fed back by the receiving UE is required, the transmitting UE may request correction to the receiving UE.

Method for the Transmitting UE to Request Correction to the Receiving UE when Generating SL CSI
 * The transmitting UE transmits powerControlOfffset to the receiving UE In the above description, powerControlOfffset may be defined as a ratio of an SL CSI-RS EPRE to a PSSCH EPRE that the receiving UE assumes when generating and reporting SL CSI. For example, powerControlOfffset may be displayed in 1 dB interval from −8 dB to 15 dB. The corresponding value may be transmitted to the receiving UE through PC5-RRC. Alternatively, a method of signaling through SCI may also be considered. However, in the case of signaling through SCI, a method of dividing and indicating powerControlOfffset into a value of a smaller range than that in the above example may be considered in consideration of a signaling overhead.

Embodiment 3

The embodiment 3 of the disclosure proposes a method in which a transmitting UE determines a transmission parameter according to whether SL CSI is reported in a sidelink. Accordingly, an operation in which the transmitting UE determines the transmission parameter may vary according to whether there is SL CSI reporting. Here, whether there is SL CSI reporting may be determined by one of the following conditions.

Condition of Determining Whether there is SL CSI Reporting in Determining Transmission Parameters
 * Condition 1: According to whether SL CSI reporting is enabled
 * Condition 2: According to whether SL CSI reporting is triggered/activated
 * Condition 3: According to whether the transmitting UE has received CSI reporting from the receiving UE The condition 1 is a method of determining that there is SL CSI reporting when SL CSI reporting is enabled. The condition 2 is a method of determining that there is SL CSI reporting when SL CSI reporting is enabled and activated. The conditions 1 and 2 may or may not be the same condition according to the above-described method in which SL CSI reporting is triggered/activated.

Finally, the condition 3 is a method of determining that there is SL CSI reporting when the transmitting UE actually receives CSI reporting from the receiving UE. The reason why the transmitting UE considers a method of determining a transmission parameter according to whether SL CSI is reported from the receiving UE is that SL CSI reporting may not always be supported in the sidelink.

In the disclosure, it was considered that SL CSI-RS transmission and SL CSI reporting operate as UE-to-UE unicast in the sidelink. In other words, SL CSI-RS transmission and SL CSI reporting may not be supported in broadcast. Further, in the case of groupcast, an SL CSI-RS transmission and SL CSI reporting method for groupcast are not separately considered. Therefore, when it is not operated as UE-to-UE unicast, the transmitting UE of the sidelink cannot receive SL CSI reporting from the receiving UE. Further, even in the case of UE-to-UE unicast of the sidelink, only aperiodic SL CSI reporting is considered.

Therefore, a case in which the transmitting UE receives SL CSI reporting from the receiving UE in the sidelink may be very limited. When the vehicle UE performs sidelink communication with another vehicle UE, a very high moving speed may be considered. Accordingly, a UE-to-UE channel changes very quickly. In such an environment, it is necessary to improve a performance of channel estimation by increasing a tracking performance for time-varying channels by increasing the number of symbols in time of a PSSCH demodulation reference signal (DMRS). Alternatively, it is necessary to increase a reception performance by using a low modulation and coding scheme (MCS). When the transmitting UE receives SL CSI reporting from the receiving UE, information on the UE-to-UE channel state may be identified from the SL CSI. However, when the transmitting UE does not receive SL CSI reporting from the receiving UE, the UE-to-UE channel state cannot be known; thus, it may be difficult to select transmission parameters so that the receiving UE successfully receives data transmitted by the transmitting UE.

As described above, there are a mode 1, which is a method in which the base station allocates transmission resources in the sidelink and a mode 2, which is a method in which the UE directly allocates transmission resources in the sidelink through sensing. First, in the case of the mode 1, the base station may signal an occasion and frequency allocation position information of initial transmission and retransmission to the transmitting UE through DCI. Further, in the mode 1, the base station may indicate information such as pattern information of a PSSCH DMRS, an MCS configuration, and the number of transmission layers to the transmitting UE through Uu-RRC. When the base station indicates such information to the transmitting UE through Uu-RRC, the transmitting UE may configure a transmission parameter according to the indication.

However, when there is no configuration of such information in the Uu-RRC, the transmitting UE should directly select a transmission parameter. In this case, according to whether the receiving UE reports SL CSI, a method for the transmitting UE to configure information such as PSSCH DMRS pattern information, MCS configuration, and the number of transmission layers may vary. When there is no SL CSI reporting, a parameter to be selected by the transmitting UE may be determined by UE implementation.

When there is SL CSI reporting, the transmitting UE may identify a channel state through SL CSI and directly determine a configuration of transmission parameters such as pattern information of a PSSCH DMRS appropriate for the channel state, an MCS configuration, and the number of transmission layers. Details related thereto refer to a method in which the transmitting UE selects a transmission parameter for SL CSI reporting in embodiments 3 and 4. The transmitting UE may transmit the selected PSSCH DMRS pattern information, MCS configuration, and information on the number of transmission layers to the receiving UE through SCI. Alternatively, a method of transmitting PSSCH DMRS pattern information through Pc5-RRC and transmitting MCS configuration information and information on the number of transmission layers through SCI may also be considered.

In the mode 1, the transmitting UE may transmit SL CSI reporting received from the receiving UE to the base station so that the base station may indicate more accurate transmission parameters to the transmitting UE when there is SL CSI reporting. Specifically, a method of transmitting SL CSI reporting through a PUCCH or PUSCH may be considered. Alternatively, when the base station and the UE are connected by Uu-RRC, the transmitting UE may transmit SL CSI reporting to the base station through Uu-RRC.

When the base station receives SL CSI reporting in the mode 1, the base station may reflect this to indicate information such as PSSCH DMRS pattern information, MCS configuration, and the number of transmission layers to the transmitting UE through Uu-RRC. In this case, it may be possible to indicate a transmission parameter more appropriate for a channel situation.

In contrast, in the mode 2, the transmitting UE may determine an occasion and frequency allocation position of initial transmission and retransmission through direct sensing. In the case of the mode 2, unlike the mode 1, the transmitting UE should directly select all transmission parameters without involvement of the base station. Even in the mode 2, a parameter configuring method of the transmitting UE may vary according to whether there is SL CSI reporting.

If there is SL CSI reporting, the transmitting UE may identify a channel state through the SL CSI and configure transmission parameters such as PSSCH DMRS pattern information, MCS configuration, and the number of transmission layers. The transmitting UE may transmit all of the selected PSSCH DMRS pattern information, MCS configuration, and information on the number of transmission layers to the receiving UE through SCI. Alternatively, a method of transmitting PSSCH DMRS pattern information through Pc5-RRC and transmitting MCS configuration information and information on the number of transmission layers through SCI may also be considered.

If there is no SL CSI reporting, the transmitting UE may configure PSSCH DMRS pattern information, MCS configuration, and the number of transmission layers according to an absolute speed thereof. An example thereof will be described with reference to [Table 8].

TABLE 8

```
-- ASN1START
SL-PSSCH-TxConfig-List ::=   SEQUENCE (SIZE (1..maxPSSCH-TxConfig)) OF SL-PSSCH-TxConfig
SL-PSSCH-TxConfig ::=        SEQUENCE {
    typeTxSync               SL-TypeTxSync           OPTIONAL,           -- Need OR
    thresUE-Speed            ENUMERATED {kmph60, kmph80, kmph100, kmph120,kmph140, kmph160, kmph180, kmph200},
    parametersAboveThres     SL-PSSCH-TxParameters,
    parametersBelowThres     SL-PSSCH-TxParameters,
    ...,
}
SL-PSSCH-TxParameters ::=    SEQUENCE {
    minMCS-PSSCH                             INTEGER (0..31)
    maxMCS-PSSCH                             INTEGER (0..31),
    additional-dmrsPSSCH                     INTEGER (0..3),
    Txlayer-NumberPSSCH                      ENUMERATED {n1, n2, both, spare1},
    minSubChannel-NumberPSSCH                INTEGER (1.. maxSubChannel),
    maxSubchannel-NumberPSSCH                INTEGER (1.. maxSubChannel),
    allowedRetxNumberPSSCH                   ENUMERATED {n0, n1, n2, n3, all},
    maxTxPower                               SL-TxPower              OPTIONAL     -- Cond CBR
}
-- ASN1STOP
```

Referring to [Table 8], in the mode 2, a set of transmission parameters (SL-PSSCH-TxParameters) may be determined for each synchronization source of the UE according to an absolute speed of the transmitting UE. Here, a synchronization source may be a base station or a global navigation satellite system (GNSS). When the UE is not Uu-RRC connected to the base station, the GNSS or the UE may be a synchronization source. One SL-PSSCH-TxConfig may be configured for each synchronization source.

Further, by configuring a threshold (thresUE-Speed) of an absolute speed of the UE and comparing the absolute speed of the transmitting UE with the threshold, a transmission parameter set (SL-PSSCH-TxParameters-Mode2) that may be selected according to whether the speed is greater than the threshold (parametersAboveThres) or smaller (parametersBelowThres) than the threshold may be determined.

The transmission parameter set (SL-PSSCH-TxParameters) may include at least one of PSSCH DMRS pattern information (additional-dmrsPSSCH), MCS configuration range (minMCS-PSSCH, maxMCS-PSSCH), the number of transmission layers (Txlayer-NumberPSSCH), a subchannel allocation range (minSubChannel)-NumberPSSCH, maxSubchannel-NumberPSSCH), or the number of retransmissions (allowedRetxNumberPSSCH).

In this case, the reason why the subchannel allocation range is included is that an actual coding rate may be determined by the configured MCS, the number of transmission layers, and the number of RBs to which the PSSCH is allocated. Here, the subchannel may be a unit of PSSCH allocation configured with one or more RBs.

In [Table 8], in additional-dmrsPSSCH, pattern information of a PSSCH DMRS refers to the number of additional DMRS symbols, and when the additional-dmrsPSSCH is configured to 0, only a front-loaded DMRS is transmitted, and a case in which an additional DMRS symbol is configured to 3 indicates a case in which up to 4 DMRS symbols including a front-loaded DMRS are transmitted. DMRS pattern information other than the number of additional DMRS symbols may be included.

Further, although an MCS configuration range is indicated to the minMCS-PSSCH and the maxMCS-PSSCH in [Table 8], it may be considered that only the maxMCS-PSSCH is configured.

In [Table 8], Txlayer-NumberPSSCH indicates the number of transmission layers, n1 indicates 1-layer transmission and n2 indicates 2-layer transmission. Both mean that the UE may be autonomously configured for 1 layer or 2 layers.

In [Table 8], allowedRetxNumberPSSCH indicates a configuration of the number of retransmissions of the UE, n0 indicates no retransmission, and n1, n2, and n3 mean retransmissions of 2, 3, and 4 times, respectively, including initial transmission. Further, all means that the UE may be configured autonomously.

In [Table 8], maxTxPower indicates a limited maximum transmission power value for congestion control when a CBR is used.

A configuration of the transmission parameter SL-PSSCH-TxParameters in [Table 8] may be (pre-)configured. This may be a value pre-stored in the UE or may be a value configured by the base station through an SL-SIB or Uu-RRC. In the disclosure, there is no limitation in other parameters and configuration values that may be included in the transmission parameter set (SL-PSSCH-TxParameters).

Hereinafter, an operation in which a transmitting UE selects a transmission parameter when there is SL CSI reporting in the mode 1 and the mode 2 will be described in more detail.

CQI and RI are considered as SL CSI reporting transmitted by the receiving UE, and MCS and the number of transmission layers are considered as transmission parameters selected by the transmitting UE. The MCS selection range may be determined in the selectable MCS index in the defined MCS table. A selection range of the number of transmission layers may be determined within the number of maximum transmission layers supported by the transmitting UE. The following description describes a case in which a CBR is not considered when selecting a transmission parameter, and a description of a case in which a CBR is considered refers to the following embodiment 4. The following method may be applied to both cases where the receiving UE reports SL CSI by reflecting a CBR or reports SL CSI without reflecting a CBR. In this case, the following method may be considered.

Method for the Transmitting UE to Select Transmission Parameters for SL CSI Reporting
* Method 1: Select by UE implementation
* Method 2: Select by UE implementation in a range of values lower than that of a CQI level and RI level received by SL CSI reporting
* Method 3: Select transmission parameters based on a CQI level and RI level received by SL CSI reporting The method 1 is a method in which, when the transmitting UE receives CQI and RI feedback by SL CSI reporting, the transmitting UE refers to only feedback and in which the selection of the transmission parameter is determined by UE implementation.

The method 2 is a method in which, when the transmitting UE receives CQI and RI feedback by SL CSI reporting, an MCS among transmission parameters is determined by UE implementation in a range lower than the fed back CQI level and in which the number of transmission layers is determined by UE implementation in a range lower than the fed back RI level.

The method 3 is a method in which, when the transmitting UE receives CQI and RI feedback by SL CSI reporting, the transmitting UE selects an MCS among transmission parameters as a value corresponding to the fed back CQI level, and selects the number of transmission layers as a value corresponding to the fed back RI level.

Embodiment 3-11

In the embodiment 3-1 of the disclosure, an additional method for the transmitting UE to select a transmission parameter according to whether there is SL CSI reporting described in the embodiment 3 will be described. Conditions for determining whether there is SL CSI reporting were described in the embodiment 3. As described above, SL CSI reporting in the sidelink may be supported in unicast; thus, a case in which SL CSI reporting may be limited only to unicast, and a case in which there is no SL CSI reporting may correspond to all of broadcast, unicast, and groupcast. This is because SL CSI reporting may be enabled/disabled even in unicast. Further, transmission parameters in which the transmitting UE may adaptively select according to a channel situation may include the following cases.
* Modulation and Coding Scheme (MCS)
** A transmission performance and transmission throughput may vary according to a selection of MCS.
* DMRS pattern information
** When the number of additional DMRS symbols in time and more than one DMRS pattern in frequency are supported, which pattern to use may be included.
** As the number of additional DMRS symbols increases in time, a time tracking performance may be increased upon estimating a channel; thus, high Doppler may be supported, and the number of DMRS REs may be increased, thereby improving a channel estimation capability. Further, when one or more DMRS patterns on a frequency are supported, a channel estimation performance may vary according to a use DMRS pattern. Further, transmission throughput may vary according to the number of DMRS REs.
* MIMO transmission method
** The number of transmission layers or a method of selecting a precoder may be included.
** Depending on the number of transmission layers and precoder selection, a performance according to the channel may vary. Further, transmission throughput may vary according to the number of transmission layers.

In the disclosure, transmission parameters that may be adaptively selected by the transmitting UE are not limited to parameters presented above.

Further, according to the above description, there are a mode 1, which is a method in which the base station allocates transmission resources in the sidelink and a mode 2, which is a method in which the UE directly allocates transmission resources of the sidelink through sensing. There may be the following methods for the base station to identify a state of the sidelink in the mode 1.

* Method 1: When the transmitting UE feeds back HARQ feedback information received from the receiving UE to the base station in the mode 1
* Method 2: When the transmitting UE feeds back CSI information received from the receiving UE to the base station in the mode 1
* Method 3: When the transmitting UE feeds back both HARQ feedback information and CSI information received from the receiving UE to the base station in the mode 1

In the mode 1, in order for the base station to identify a state of the sidelink, it may be possible when one of the above methods is provided. Specifically, when the transmitting UE receives HARQ NACK feedback several times, the transmitting UE may determine that the channel state is not good due to a high speed environment or a low SNR. Further, when receiving feedback of the CSI information, the transmitting UE may determine that the channel state is not good due to a high speed environment or a low SNR. When the above methods are used, the base station may identify a channel state of the sidelink; thus, it may be useful for the base station to indicate the transmitting UE for transmission parameters such as the above presented MCS, DMRS pattern information, or MIMO transmission method in the mode 1.

In this case, the base station may use Uu-RRC so as to indicate transmission parameters such as an MCS, DMRS pattern information, or MIMO transmission method to the transmitting UE. Further, in order to identify a channel state of the sidelink through one of the above methods, the base station may include the following information in DCI and transmit the DCI to the UE.

* DCI field triggering HARQ feedback. HARQ feedback may be turned on/off through 1-bit information.
* DCI field triggering CSI reporting: CSI reporting may be turned on/off through 1-bit information.

DCI may include all of the above information or only one of two. When the DCI includes the above information, a UE that has received the corresponding information may transmit SCI including the following information to another UE.

* SCI field triggering HARQ feedback; HARQ feedback may be turned on/off through 1-bit information.
* SCI field triggering CSI reporting: CSI reporting may be turned on/off through 1-bit information.

The SCI may include all of the above information or only one of two. When the information is included in the SCI, a UE that has received the information may perform an operation such as HARQ feedback or CSI reporting to the transmitting UE.

When all of the methods 1/2/3 are not used, it is difficult for the base station to identify a state of a sidelink in the mode 1, thus, it may be difficult for the base station to indicate the transmitting UE for transmission parameters such as the above presented MCS, DMRS pattern information, or MIMO transmission method in the mode 1.

Hereinafter, various methods for a transmitting UE to select a transmission parameter are proposed based on the above description. First, an example of a set and a subset for transmission parameters is presented as follows.

* MCS: All indexes defined in the sidelink MCS table may be defined to an MCS set. For example, when a 5-bit MCS table is used, it may be that MCS set={0, . . . ,31}. The MCS subset may be defined to all or part of the MCS set.
* Additional DMRS: The number of DMRS symbols supported in the sidelink may be defined to an additional DMRS set. For example, when the number of DMRS symbols of 1,2,3,4 is supported, it may be that additional DMRS set={0,1,2,3}. Here, information (number in the above example) included in the additional DMRS set may indicate the number of symbols of the additional DMRS.

For example, when additional DMRS is configured to 0, this may mean that only front-loaded DMRS of one symbol is transmitted without a configuration of additional DMRS, and when additional DMRS 3 is configured, this may mean that additional DMRS is configured to 3 symbols and that total 4 DMRS symbols including front-loaded DMRS are transmitted. Additional DMRS subset may be defined to all or part of additional DMRS sets.
  ** In the above description, the number of DMRS symbols may not be indicated by additional DMRS, but may be indicated by the number of general DMRS symbols. In this case, DMRS symbol set={1,2,3,4} may be used and the DMRS symbol subset may be defined to a part of the DMRS symbol set.
* Number of transmission layers: The number of transmission layers supported in the sidelink may be defined to a transmission layer set. For example, when only 2 layers are supported, it may be that the transmission layer set={1,2}. The transmission layer subset may be defined to all or part of the transmission layer set.

It is noted that MCS set/subset, additional DMRS set/subset, and transmission layer set/subset in the above description may be replaced with other terms representing the same meaning.

Further, information included in the set is not limited to the above proposal. For example, the number of symbols included in the additional DMRS set may be reduced to additional DMRS set={1,3}. In the case of the transmission layer set, both may be included as in layer set={1,2,both} to indicate that both 1 and 2 are possible. Further, the above examples may be applied interchangeably. Further, the set for the transmission parameter may be a set mapped by a CBR or priority, or a set mapped by simultaneously reflecting a CBR and priority. For example, when the MCS set is mapped by simultaneously reflecting a CBR and priority, the MCS set mapped by a priority of a packet to be currently transmitted by the UE and a CBR measured by the UE may be used. The corresponding mapping may be included in a resource pool configuration, which may be indicated by an SIB, (pre-)configured, or overwritten by RRC information. More specifically, assuming that MCS set={0, . . . ,31} when the CBR and priority are not considered, when the CBR and priority are considered, the corresponding MCS set may be mapped to MCS set={0, . . . ,10} and configured. Further, as described above, the subset for the transmission parameter may be configured to all or part of the set for the transmission parameter. Hereinafter, various methods for a transmitting UE to select a transmission parameter are proposed. If there is feedback below, one of the following conditions may be satisfied.

* If there is SL CSI reporting
* If there is SL HARQ feedback
* If there are both SL CSI reporting and SL HARQ feedback Further, a determination criterion and operation for determining a transmission parameter using the feedback information may be interpreted as UE implementation.

[Proposed method 1] The proposed method 1 is commonly applied to the mode 1 and the mode 2.
* If there is any feedback
** The transmitting UE selects an appropriate parameter from the set for the transmission parameter. (This may be interpreted as UE implementation.)
* If there is no feedback
** The transmitting UE selects an appropriate parameter from the subset for the transmission parameter. (This may be interpreted as UE implementation.)
*** The subset for transmission parameter may be determined by an absolute speed of the transmitting UE. For example, a threshold of a speed of the transmitting UE may be configured, and a subset for the transmission parameter using when a UE speed exceeds a threshold and a subset for the transmission parameter using when a UE speed does not exceed a threshold may be configured separately. The corresponding configuration may be included in a resource pool configuration, which may be indicated by an SIB, (pre-)configured, or overwritten by RRC information.

[Proposed Method 2] In the proposed method 2, distinguished operations are applied according to the mode 1 and the mode 2.
* If there is any feedback
** The transmitting UE selects an appropriate parameter from the set for the transmission parameter. (This may be interpreted as UE implementation.)
*** The mode 2 follows the above method. However, in the case of the mode 1, when the transmitting UE receives transmission parameter information configured by the base station with a higher layer, the transmitting UE selects the corresponding parameter as the transmission parameter. However, when there is no parameter configured with the upper layer, the transmitting UE selects an appropriate parameter from the set for the transmission parameter (This may be interpreted as UE implementation).
* If there is no feedback
** The transmitting UE selects an appropriate parameter from the subset for the transmission parameter. (This may be interpreted as UE implementation.)
*** The subset for transmission parameter may be determined by an absolute speed of the transmitting UE. For example, a threshold of a speed of the transmitting UE may be configured, and a subset for the transmission parameter using when a UE speed exceeds a threshold and a subset for the transmission parameter using when a UE speed does not exceed a threshold may be configured separately. The corresponding configuration may be included in a resource pool configuration, which may be indicated by an SIB, (pre-)configured, or overwritten by RRC information.
*** The mode 2 follows the above method. However, in the case of the mode 1, when the transmitting UE receives transmission parameter information configured by the base station with a higher layer, the transmitting UE selects the corresponding parameter as the transmission parameter. However, when there is no parameter configured with the upper layer, the transmitting UE selects an appropriate parameter from the set for the transmission parameter (This may be interpreted as UE implementation). [Proposed Method 3] In the proposed method 2, distinguished operations are applied according to the mode 1 and the mode 2.
* If there is any feedback
** The transmitting UE selects an appropriate parameter from the set for the transmission parameter. (This may be interpreted as UE implementation.)
*** Commonly applied to the mode 1 and the mode 2.
* If there is no feedback
** The transmitting UE selects an appropriate parameter from the subset for the transmission parameter. (This may be interpreted as UE implementation.)
*** The subset for transmission parameter may be determined by an absolute speed of the transmitting UE. For example, a threshold of a speed of the transmitting UE may be configured, and a subset for the transmission parameter using when a UE speed exceeds a threshold and a subset for the transmission parameter using when a UE speed does not exceed a threshold may be configured separately. The corresponding configuration may be included in a resource pool configuration, which may be indicated by an SIB, (pre-)configured, or overwritten by RRC information.
*** The mode 2 follows the above method. However, in the case of the mode 1, when the transmitting UE receives transmission parameter information configured by the base station with a higher layer, the transmitting UE selects the corresponding parameter as the transmission parameter. However, when there is no parameter configured with the upper layer, the transmitting UE selects an appropriate parameter from the set for the transmission parameter (This may be interpreted as UE implementation).

[Proposed Method 4] The proposed method 4 is commonly applied to the mode 1 and the mode 2.
* Regardless of presence or absence of feedback, the transmitting UE selects an appropriate parameter from a set for the transmission parameter. (This may be interpreted as UE implementation.)

[Proposed Method 5] In the proposed method 5, distinguished operations are applied according to the mode 1 and the mode 2.
* Regardless of presence or absence of feedback, the transmitting UE selects an appropriate parameter from the set for the transmission parameter. (This may be interpreted as UE implementation.)
** The mode 2 follows the above method. However, in the case of the mode 1, when the transmitting UE receives transmission parameter information configured by the base station with a higher layer, the transmitting UE selects the corresponding parameter as the transmission parameter. However, when there is no parameter configured with the upper layer, the transmitting UE selects an appropriate parameter from the set for the transmission parameter (This may be interpreted as UE implementation).

[Proposed Method 6] In the proposed method 6, distinguished operations are applied according to the mode 1 and the mode 2.
* In the case of the mode 1, when the transmitting UE receives transmission parameter information configured by the base station with an upper layer, the transmitting UE selects the corresponding parameter as the transmission parameter. However, when there is no parameter configured with the upper layer, the transmitting UE selects an appropriate parameter from the set for the transmission parameter (This may be interpreted as UE implementation).
* In the case of the mode 2, the transmitting UE selects an appropriate parameter from the subset for the transmission parameter. (This may be interpreted as UE implementation.)
** The subset for the transmission parameter may be determined by an absolute speed of the transmitting UE. For example, a threshold of a speed of the transmitting UE may be configured, and a subset for a transmission parameter using when a UE speed exceeds a threshold and a subset for the transmission parameter using when a UE speed does not exceed a threshold may be configured separately. The corresponding configuration may be included in the resource pool configuration, which may be indicated by an SIB, (pre-)configured, or overwritten by RRC information.

[Proposed Method 7] In the proposed method 7, distinguished operations according to the mode 1 and the mode 2 are applied.
* In the case of the mode 1, when the transmitting UE receives transmission parameter information configured by the base station with an upper layer, the transmitting UE selects the corresponding parameter as the transmission parameter. However, when there is no parameter configured with the upper layer, the transmitting UE selects an appropriate parameter from a subset for the transmission parameter. (This may be interpreted as UE implementation.)
** The subset for the transmission parameter may be determined by an absolute speed of the transmitting UE. For example, a threshold of a speed of the transmitting UE may be configured, and a subset for the transmission parameter using when a UE speed exceeds a threshold and a subset for the transmission parameter using when a UE speed does not exceed a threshold may be configured separately. The corresponding configuration may be included in the resource pool configuration, which may be indicated by an SIB, (pre-)configured, or overwritten by RRC information.
* In the case of the mode 2, the transmitting UE selects an appropriate parameter from the subset for the transmission parameter. (This may be interpreted as UE implementation.)
** The subset for the transmission parameter may be determined by an absolute speed of the transmitting UE. For example, a threshold of a speed of the transmitting UE may be configured, and a subset for the transmission parameter using when a UE speed exceeds a threshold and a subset for the transmission parameter using when a UE speed does not exceed a threshold may be configured separately. The corresponding configuration may be included in the resource pool configuration, which may be indicated by an SIB, (pre-)configured, or overwritten by RRC information.

According to the proposed method, when the transmitting UE determines a transmission parameter, the transmitting UE may transmit information on the transmission parameter to the receiving UE. Specifically, when an MCS, the number of DMRS symbols, and the number of transmission layers are determined, all of the corresponding information may be included in the SCI and transmitted. Alternatively, all of the corresponding information may be transmitted through PC5-RRC. Alternatively, a method of transmitting a combination of SCI and PC5-RRC may be considered. For example, a method of transmitting an MCS and the number of transmission layers through SCI and transmitting the number of DMRS symbols through PC5-RRC may be considered.

Embodiment 4

The embodiment 4 of the disclosure proposes a method of determining a transmission parameter by reflecting a CBR as a method for a transmitting UE to determine a transmission parameter in a sidelink. In this case, a method of reflecting a CBR even when the receiving UE transmits SL CSI is proposed. First, in a sidelink of V2X, a configuration range of the transmission parameter may be determined according to whether the corresponding channel is congested. This is a congestion control function in which the UE determines whether to access the channel when the channel is congested, and configures a transmission parameter in order to increase a transmission success probability of the UE when the UE is accessed to the channel. Accordingly, the UE may determine a configuration range of the transmission parameter based on the CBR. For example, the UE may appropriately determine a range of selectable transmission parameters according to a measured CBR value. Transmission parameters that may be considered may include an MCS for a PSSCH, the number of transmission layers, a size of a subchannel to which the PSSCH is allocated, the number of retransmissions, and a maximum value of transmission power.

Specifically, when the channel is congested (when a CBR value is measured high), by reducing a size of the subchannel to which the PSSCH is allocated, lowering a maximum value of transmission power, and reducing the number of retransmissions, interference between UEs in a congestion situation may be minimized. Further, by configuring the MCS to be low and reducing the number of transmission layers, it is possible to adjust the transmitted signal to be successfully received. Therefore, a method of configuring a range of transmission parameters by reflecting the CBR is a very valid method of selecting a parameter appropriate for a channel situation along with congestion control.

First, the CBR may be defined as follows.
CBR
  The CBR measured in a slot n is as follows.
  * A sidelink received signal strength indicator (SL RSSI) measured by the UE in the resource pool is defined to a ratio of subchannels exceeding a (pre-)configured threshold. Here, CBR measurement may be performed in a slot [n-X, n-1]. Here, the slot index is based on a physical slot index.
  ** CBR measurement in terms of transmission may be performed for a PSSCH region. In this case, it is assumed that the PSSCH region and the PSCCH region are positioned in adjacent resource regions. Here, when a frequency resource region to which the PSSCH is allocated and a frequency domain in which the PSCCH is transmitted overlap, it is interpreted that the PSSCH region and the PSCCH region are adjacent. When the PSSCH region and the PSCCH region are not positioned in adjacent resource regions, CBR measurement may be performed in the PSCCH region.
** CBR measurement in terms of feedback on transmission may be performed in a PSFCH region.
*** In this case, it is assumed that ACK/NACK feedback is transmitted through a PSFCH, and it is assumed that SL CSI is transmitted through the PSFCH. When SL CSI is transmitted through the PSSCH, it is noted that a CBR is measured in the PSSCH region, as described above.
** X is a window value in which a CBR is measured, and a value of X may be a fixed value or a configurable value.

the measured CBR value. The UE may report the measured CBR to the base station. Specifically, when the base station and the UE are connected through Uu-RRC, the UE may report a CBR to the base station through the Uu-RRC. Therefore, in the mode 1, when the transmitting UE requests a transmission resource capable of performing sidelink communication with the receiving UE to the base station, the base station may allocate the transmission resource using the reported CBR information, determine the related transmission parameter, and indicate the UE.

However, in the case of the mode 2, the UE may not only perform resource allocation through sensing, but also determine a transmission parameter using a CBR measured by the UE (or a CBR received from the receiving UE). An example thereof will be described with reference to [Table 9].

TABLE 9

| | |
|---|---|
| -- ASN1START | |
| SL-CBR-CommonTxConfigList ::= | SEQUENCE { |
| cbr-RangeCommonConfigList | SEQUENCE (SIZE (1..maxSL-V2X-CBRConfig)) OF SL-CBR-Levels-Config, |
| s1-CBR-PSSCH-TxConfigList | SEQUENCE (SIZE (1..maxSL-V2X-TxConfig)) OF SL-CBR-PSSCH-TxConfig |
| } | |
| SL-CBR-Levels-Config ::= | SEQUENCE (SIZE (1..maxCBR-Level)) OF SL-CBR |
| SL-CBR-PSSCH-TxConfig ::= | SEQUENCE { |
| cr-Limit | INTEGER(0..10000), |
| tx-Paramters | SL-PSSCH-TxParameters |
| } | |
| SL-CBR ::= | INTEGER(0..100) |
| -- ASN1STOP | |

*** When X is a fixed value, it may be configured to 100 slots. When X is a configurable value, a configuration of the corresponding value may be included in resource pool configuration information, and before the UE is connected to the base station, the corresponding values in the UE may be pre-configured, and be configured from the base station through an SIB, and be configured UE-specifically after RRC connection with the base station. Further, the corresponding values may be configured through a PC5-RRC connection between UEs.
** SL RSSI means received signal strength, indicates how much power (in [W]) is received from the receiving UE, and is observed by valid OFDM symbol positions of the corresponding channel in the slot of the sidelink and the configured subchannel.
*** The subchannel configured here may mean a subchannel allocated to the resource pool. Further, the subchannel may be configured differently according to the corresponding channel. For example, the PSSCH may have a minimum configurable subchannel size of 4 RB and be allocated up to 20 subchannels, and the PSFCH may have a minimum configurable subchannel size of 2 RB and be allocated up to 40 subchannels. This is an example, and the size of the subchannels or the number of maximum subchannels may vary according to the SCS.

According to the definition of the CBR, it may be determined whether the corresponding channel is congested by Referring to [Table 9], a CBR (SL-CBR) may be measured in a value between 0 and 100, but it may be classified and quantized according to a CBR range. For example, CBR values may be classified into CBR levels up to 16, and the CBR measurement result may be mapped to the CBR level and used. In this case, the number of CBR levels is only an example and may be a predetermined number or a configurable number.

Further, tx-Parameters included in SL-CBR-PSSCH-TxConfig of [Table 9] may include parameters included in SL-PSSCH-TxParameters described with reference to [Table 8], and the parameters may be configured according to the CBR level.

Further, cr-Limit included in SL-CBR-PSSCH-TxConfig is a parameter for congestion control, and the UE may measure a channel occupancy ratio (CR) to drop transmission or may enable to not exceed a CR limit through implementation. This may be applied when the transmitting UE transmits data to the receiving UE, and even when the receiving UE reports SL CSI to the transmitting UE, when a CR measured by the receiving UE does not satisfy a CR limit, an operation of dropping SL CSI reporting and HARQ reporting may also be considered.

Further, the SL-PSSCH-TxParameters described with reference to [Table 8] may be determined according to a priority of the transport packet as well as a CBR level. An example thereof will be described with reference to [Table 10].

TABLE 10

| | |
|---|---|
| -- ASN1START | |
| SL-CBR-PPPP-TxConfigList ::= | SEQUENCE (SIZE (1..3)) OF SL-PPPP-TxConfigIndex |
| SL-PPPP-TxConfigIndex ::= | SEQUENCE { |
| priorityThreshold | SL-Priority, |
| defaultTxConfigIndex | INTEGER(0..maxCBR-Level-1), |
| cbr-ConfigIndex | INTEGER(0..maxSL-V2X-CBRConfig-1), |

TABLE 10-continued

| | |
|---|---|
| tx-ConfigIndexList | SEQUENCE (SIZE (1..maxCBR-Level)) OF Tx-ConfigIndex |
| } | |
| Tx-ConfigIndex ::= | INTEGER(0..maxSL-V2X-TxConfig-1) |
| -- ASN1STOP | |

Referring to [Table 10], the SL-PPPP-TxConfigIndex may map transmission parameters (see SL-PSSCH-TxParameters of [Table 8]) based on a priority and CBR of the packet. For example, in [Table 9], when CBR levels of SL-CBR-Levels-Config are divided into 16 and cbr-Range-CommonConfigList is configured up to 4, sl-CBR-PSSCH-TxConfigList may be made up to 16×4=64. In other words, a list (sl-CBR-PSSCH-TxConfigList) in which up to 64 parameters in SL-CBR-PSSCH-TxConfig are divided and sequentially mapped may be configured. The cbr-ConfigIndex of [Table 10] is a parameter indicating which number of parameter of parameter sets 1 to 4 divided into each 16 by a CBR level among 64 parameter lists, and may be determined which parameter among parameter lists of 64 parameters indicates for the measured CBR level. According to [Table 10], a finally mapped parameter may be determined by a priority and CBR level. Further, if the CBR level is not available, the CBR level configured to the defaultTxConfigIndex of [Table 10] is referred to.

Here, the tx-ConfigIndexList is information on transmission parameters (tx-Parameters) described with reference to [Table 9].

In [Table 10], the defaultTxConfigIndex is a default value to be used when there is no CBR measurement result available in the UE. Therefore, when the UE measures a CBR and knows the corresponding CBR level and a priority of a packet to be transmitted, a range of the corresponding transmission parameter SL-PSSCH-TxParameters is determined (see [Table 8] for SL-PSSCH-TxParameters).

In the case of the mode 2, a packet priority means a priority of a packet corresponding to a highest priority among packets to be transmitted by the UE. In this case, a configuration of the transmission parameter SL-PSSCH-TxParameters may be (pre-)configured. That is, the configuration may be a value previously stored in the UE or may be a value configured by the base station through an SL-SIB or Uu-RRC.

An operation in which the UE measures a CBR in the sidelink may be determined as a default feature or as an optional feature. When the operation is determined as a selectable operation, it may be divided into four cases, as illustrated in [Table 11] according to a CBR measurement capability of the transmitting UE and the receiving UE.

TABLE 11

| | CBR measurement capability of TX UE | CBR measurement capability of RX UE |
|---|---|---|
| Case 1 | X | X |
| Case 2 | X | O |
| Case 3 | O | X |
| Case 4 | O | O |

In [Table 11], a case in which CBR measurement of the UE is determined as a default feature in the sidelink may correspond to a case 4. When an operation for the UE to measure a CBR is a selectable operation, information exchange may be required for a CBR measurement capability between the transmitting UE and the receiving UE not only when the transmitting UE selects a transmission parameter but also when the receiving UE reflects the CBR upon transmitting SL CSI. In this case, information exchange may be performed by PC5-RRC.

As described with reference to FIGS. 4 and 5, PC5-RRC connection between UEs may be performed in unicast of the sidelink. An example of a method in which the receiving UE reflects a CBR even when transmitting SL CSI will be described in more detail with reference to Table 12.

TABLE 12

| | |
|---|---|
| -- ASN1START | |
| SL-CBR-CSI-Config-List::= | SEQUENCE { |
|   cbr-RangeCommonConfigList | SEQUENCE (SIZE (1..maxSL-V2X-CBRConfig)) OF SL-CBR-Levels-Config, |
|   SL-CBR-CSI-ConfigList | SEQUENCE (SIZE (1..maxSL-V2X-CSIConfig)) OF SL-CBR-CSI-Config |
| } | |
| SL-CBR-CSI-Config::= | SEQUENCE { |
|   minCQI | INTEGER (0.. maxCQI-Level-1), |
|   maxCQI | INTEGER (0.. maxCQI-Level-1), |
|   allowedRI | ENUMERATED {n1, n2, both, spare1}, |
| } | |
| SL-CBR-Levels-Config ::= | SEQUENCE (SIZE (1..maxCBR-Level)) OF SL-CBR |
| SL-CBR ::= | INTEGER(0..100) |
| -- ASN1STOP | |

Referring to [Table 12], when the CQI and RI are included in the SL CSI information, a configuration (SL-CBR-CSI-Config) of the SL CSI parameter reflecting the CBR may be determined through the following method.

First, a parameter selection range for RI may be determined within the number of maximum transmission layers supported by the transmitting UE. In [Table 12], allowed RI indicates a reportable RI, n1 indicates a rank 1, and n2 indicates a rank 2. Both means that the UE can autonomously configure a configuration for ranks 1 and 2.

Thereafter, a parameter selection range (minCQI, maxCQI) for CQI may be determined by the use SL CQI table. For example, when the SL CQI table reuses a CQI table using in NR Uu, a parameter selection range (minCQI, maxCQI) for CQI may be determined within up to 16 levels. Alternatively, when the SL CQI table reuses an MCS table using in the NR Uu, a parameter selection range (minCQI, maxCQI) for CQI may be determined within up to 32 levels. As illustrated in [Table 12], when the receiving UE reports CQI and RI as SL CSI information, CQI and RI may be selected within the selection range for CQI and RI configured by the CBR level. Therefore, the CQI reflecting the CBR in the sidelink may be defined as follows.

SL CQI with CBR

The UE corresponding to the receiver in the sidelink determines each CQI value reported in a slot n to a highest CQI index satisfying the following condition.
* One PSSCH TB transport block configured with a combination of a modulation scheme, a target code rate, and a transport block size corresponding to the CQI index should be able to be received so that it does not exceed the following transport block error probability. Here, the PSSCH TB transport block occupies a sidelink physical resource block or subchannels referred to as SL CSI reference resources.
** 0.1, when the cqi-Table in SL-CSI-ReportConfig indicates the following 'table1' ([Table 2] or [Table 5]) or 'table2' ([Table 3] or [Table 6]) as an upper layer configuration,
** 0.00001, when the cqi-Table in SL-CSI-ReportConfig indicates the following 'table3' ([Table 4] or [Table 7]) as a higher layer configuration, The CQI index that may be selected in the cqi-Table is limited to selected tables among [Table 2] to [Table 7] by the selection range of the SL CSI parameter (SL-CBR-CSI-Config), and only some CQI indexes may be used. In [Table 12], the selection range (SL-CBR-CSI-Config) of the SL CSI parameters that may be selected according to the CBR level may be (pre-)configured. This may be a value stored in advance by the UE or may be a value configured by the base station through an SL-SIB or Uu-RRC.

Thereafter, an operation in which a transmitting UE selects a transmission parameter when there is SL CSI reporting in the mode 1 and the mode 2 will be described in more detail. Hereinafter, a case in which a CBR is considered when selecting a transmission parameter will be described, and it may be applied to both cases where the receiving UE reports SL CSI by reflecting a CBR or SL CSI without reflecting a CBR.

CQI and RI are considered with SL CSI reporting transmitted by the receiving UE. As transmission parameters selected by the transmitting UE, the MCS and the number of transmission layers are considered. As described with reference to [Table 9] and [Table 10], when the UE reflects a CBR (directly measures a CBR or receives a CBR) and knows the corresponding CBR level and a priority of a packet to be transmitted, the corresponding transmission parameter SL-PSSCH-TxParameters (see [Table 8]) may be determined, and a MCS selection range may be determined in a MCS selection range (minMCS-PSSCH, maxMCS-PSSCH) in the SL-PSSCH-TxParameters, and a selection range of the number of transmission layers may be determined in a selection range of the number of transmission layers (Txlayer-NumberPSSCH). In this case, the configuration of the transmission parameter SL-PSSCH-TxParameters may be (pre-)configured. This may be a value stored in advance in the UE, or may be a value configured by the base station through an SL-SIB or Uu-RRC. In this case, the following methods may be considered.

Method for the Transmitting UE to Select Transmission Parameters for SL CSI Reporting (CBR Reflection)
* Method 1: Select by UE implementation
* Method 2: Select by UE implementation in a range of values lower than that of a CQI level and RI level received by SL CSI reporting
* Method 3: Select transmission parameters based on a CQI level and RI level received by SL CSI reporting The method 1 is a method in which when the transmitting UE receives CQI and RI feedback by SL CSI reporting, the transmitting UE only refers to the feedback, and determines the selection of transmission parameters by UE implementation in an MCS selection range of SL-PSSCH-TxParameters and a selection range of the number of transmission layers.

In the method 2, when the transmitting UE receives CQI and RI feedback by SL CSI reporting, an MCS among transmission parameters may be determined by UE implementation in a range lower than the fed back CQI level among MCS selection ranges of SL-PSSCH-TxParameters. Further, the number of transmission layers may be determined by UE implementation in a range lower than the fed back RI level among selection ranges of the number of transmission layers of SL-PSSCH-TxParameters. In the method 2, if there is no range lower than the fed back CQI level among MCS selection ranges of SL-PSSCH-TxParameters for the MCS, the method 1 may be used. In the method 2, if there is no range lower than the fed back RI level among selection ranges of the number of transmission layers of SL-PSSCH-TxParameters for the number of transmission layers, the method 1 may be used.

The method 3 is a method in which when the transmitting UE receives CQI and RI feedback by SL CSI reporting, the transmitting UE selects an MCS among transmission parameters as an MCS value corresponding to the fed back CQI level among MCS selection ranges of SL-PSSCH-TxParameters, and selects the number of the transmission layers as the number of transmission layers corresponding to the fed back RI level among selection ranges of the number of transmission layers of SL-PSSCH-TxParameters. In the method 3, if there is no MCS corresponding to the fed back CQI level among MCS selection ranges of SL-PSSCH-TxParameters for the MCS, the method 1 may be used, and although the MCS does not exist in the MCS selection range of SL-PSSCH-TxParameters, a method of selecting an MCS corresponding to the CQI level may be used. In the method 3, if the number of transmission layers corresponding to the fed back RI level does not exist among selection ranges of the number of transmission layers of SL-PSSCH-TxParameters for the number of transmission layers, the method 1 may be used, and although the number of transmission layers does not exist in a selection range of the number of transmission layers of SL-PSSCH-TxParameters, a method of selecting the number of transmission layers corresponding to the RI level may be used.

Selection of transmission parameters of the transmitting UE reflecting the above-described CBR and SL CSI reporting of the receiving UE reflecting the CBR may be enabled/disabled by a configuration.

In [Table 11], even in the case 3 or the case 4, which is a case in which the transmitting UE may measure a CBR, when CBR reflection is disabled, it may be interpreted as the case 1 and the case 2, respectively (i.e., transmission parameters cannot be selected by reflecting the CBR). This will be described with reference to the following embodiments.

Similarly, in [Table 11], even in the case 2 or the case 4, which is a case in which the receiving UE may measure a CBR, when CBR reflection is disabled, it may be interpreted as the case 1 and the case 3, respectively (i.e., SL CSI reporting cannot be performed by reflecting the CBR). This will be described with reference to the following embodiments.

Further, in [Table 11], even in the case 4, which is a case where both the transmitting UE and the receiving UE may measure a CBR, when CBR reflection is disabled in the transmitting UE and the receiving UE, it may be interpreted as the case 1. A case where only CBR reflection in the transmitting UE is disabled may be interpreted as the case 2. Alternatively, a case where only CBR reflection in the receiving UE is disabled may be interpreted as the case 3. This will be described with reference to the following embodiments.

Figure 10:
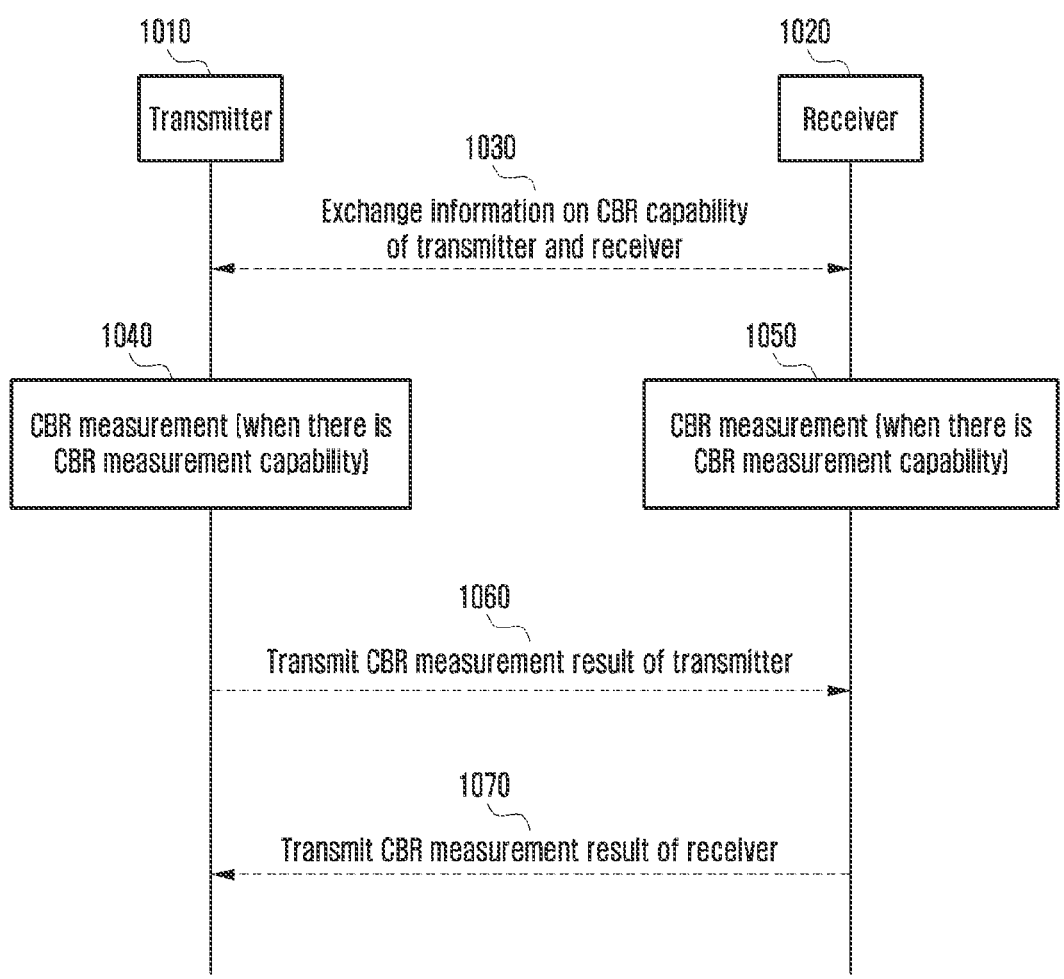
FIG. 10 is a message flow diagram illustrating a process in which a transmitting UE and a receiving UE measure and exchange a CBR according to an embodiment of the disclosure.

FIG. 10 is a message flow diagram illustrating a process in which a transmitting UE and a receiving UE measure and exchange a CBR according to an embodiment of the disclosure.

FIG. 10 illustrates an operation of measuring a CBR of the transmitting UE and the receiving UE described with reference to Table 11 according to a measurement capability, and transmitting the CBR measured by the transmitting UE to the receiving UE or transmitting the CBR measured by the receiving UE to the transmitting UE, if necessary.

Specifically, in FIG. 10, reference numeral 1010 denotes a transmitter and reference numeral 1020 denotes a receiver. In general, a transmitter and a receiver may be indicated as subjects that transmit and receive data. In a V2X system, the UE may be a transmitter or a receiver.

As described with reference to Table 11, CBR capability information of the transmitting UE and the receiving UE may be exchanged in a PC5-RRC connection process (1030). However, the exchange of the CBR capability information may be omitted.

Only a transmitting UE or a receiving UE having a CBR measurement capability may perform CBR measurement (1040, 1050). According to a situation of the sidelink, there may be a situation in which CBR measurement cannot be performed despite a CBR measurement capability. Further, a difference may occur between a CBR measured by the transmitting UE and a CBR measured by the receiving UE according to an environment of the transmitting UE and the receiving UE.

Therefore, a method in which the transmitting UE transmits the CBR measurement result to the receiving UE (1060) or in which the receiving UE transmits the CBR measurement result to the transmitting UE (1070) may be considered.

For example, the transmitting UE having a CBR capability may measure a CBR in step 1040 and transmit the CBR measurement result to the receiving UE in step 1060.

Similarly, the receiving UE having a CBR capability may measure a CBR in step 1050 and transmit the CBR measurement result to the receiving UE in step 1070.

Further, when both the transmitting UE and the receiving UE have a CBR capability, steps 1040 to 1070 may all be performed.

However, the embodiment of the disclosure is not limited thereto, and even when the transmitting UE and the receiving UE have a CBR capability, step of transmitting a CBR may be omitted. That is, the transmitting UE with a CBR capability may not perform step 1060, and the receiving UE with a CBR capability may not perform step 1070.

For example, whether to transmit the measured CBR information may be determined by the UE according to a channel environment. Alternatively, whether to transmit the CBR measurement result may be configured or determined in advance (e.g., when the receiving UE or the transmitting UE has a CBR capability, the receiving UE or the transmitting UE may be configured to transmit a CBR).

Alternatively, a method of transmitting the CBR measurement result according to an indicator indicating transmission of the CBR measurement result is also possible. For example, the transmitting UE that has received a CBR capability of the receiving UE may transmit an indicator indicating to transmit the CBR measurement result to the receiving UE, thereby receiving the CBR measurement result from the receiving UE.

When the transmitting UE and the receiving UE receive CBR information measured by another UE, the transmitting UE and the receiving UE may more accurately determine a congestion situation of the channel. Accordingly, the transmitting UE may determine a transmission parameter using CBR information, and the receiving UE may determine a receiving parameter using the CBR information. In this case, the CBR information may be a result received or a result measured by the UE itself. A specific method of using CBR information refers to the following embodiments.

An operation of the receiving UE and an operation of the transmitting UE when the receiving UE reports SL CSI and when the transmitting UE determines a transmission parameter will be described through the following embodiment. First, a case in which there is no information exchange on a CBR between UEs will be described in an embodiment 5. A case in which the transmitting UE notifies the receiving UE of CBR information will be described in an embodiment 6. A case in which the receiving UE notifies the transmitting UE of the CBR information will be described in an embodiment 7. Finally, a case in which CBR information is exchanged between the transmitting UE and the receiving UE will be described in an embodiment 8.

Embodiment 5

The embodiment 5 of the disclosure describes a case where there is no exchange of CBR information between the transmitting UE and the receiving UE. In each of four cases of [Table 11], an operation of the receiving UE in which the receiving UE reports SL CSI to the transmitting UE and an operation of the transmitting UE in which the transmitting UE determines a transmission parameter will be described. As described above, information on a CBR measurement capability between the transmitting UE and the receiving UE may be exchanged by PC5-RRC. In the embodiment of the disclosure, CQI and RI are considered with SL CSI reporting.

First, a case 1 of [Table 11] corresponds to a case where both the transmitting UE and the receiving UE do not have a CBR measurement capability. First, a selection range for RI of the receiving UE may be determined within the number of maximum transmission layers supported by the transmitting UE. Further, the selection of CQI of the receiving UE refers to the above-described definition of 'SL CQI'.

The receiving UE feeds back the selected RI and CQI with SL CSI to the transmitting UE. The transmitting UE may determine a transmission parameter using one of 'methods for the transmitting UE to select a transmission parameter for SL CSI reporting' of the above-described embodiment 3.

Thereafter, a case 2 of [Table 11] corresponds to a case where only the receiving UE has a CBR measurement capability. In this case, two methods for the receiving UE to report SL CSI may be considered.

A first method is a method of reporting SL CSI by reflecting a CBR because the receiving UE has a CBR measurement capability. As described above with reference to [Table 11] of the embodiment 4, when the receiving UE reports CQI and RI as SL CSI information, CQI and RI may be selected within the selection range for CQI and RI configured by a CBR level.

Alternatively, the receiving UE may select RI and the CQI without reflecting the CBR as in the case of the case1. The transmitting UE may determine a transmission parameter using one of 'methods for the transmitting UE to select a transmission parameter for SL CSI reporting' of the above-described embodiment 3.

Thereafter, a case 3 of [Table 11] corresponds to a case where only the transmitting UE has a CBR measurement capability. In this case, the receiving UE includes the determined RI and CQI in the SL CSI without reflecting a CBR to feed back to the transmitting UE as in the case1. The transmitting UE may determine the transmission parameter using one of 'methods for the transmitting UE to select a transmission parameter for SL CSI reporting' of the above-described embodiment 4.

Finally, a case 4 of [Table 11] corresponds to a case where both the transmitting UE and the receiving UE have a CBR measurement capability. In this case, two methods for the receiving UE to report SL CSI may be considered.

A first method is a method of reporting SL CSI by reflecting the measured CBR because the receiving UE has a CBR measurement capability. As described above with reference to [Table 11] of the embodiment 4, when the receiving UE reports CQI and RI as SL CSI information. CQI and RI may be selected within a selection range for CQI and RI configured by a CBR level. Alternatively, as in the case 1, the receiving UE may select RI and CQI without reflecting a CBR.

The transmitting UE may determine a transmission parameter using one of 'methods for the transmitting UE to select a transmission parameter for SL CSI reporting' of the above-described embodiment 4.

Embodiment 6

In the embodiment 6 of the disclosure, among methods in which a transmitting UE and a receiving UE exchange CBR information, a method of transmitting CBR information of the transmitting UE to the receiving UE is considered. In this case, an operation of the receiving UE in which the receiving UE reports SL CSI to the transmitting UE and an operation of the transmitting UE in which the transmitting UE determines a transmission parameter will be described. It is assumed that the transmitting UE is a UE capable of measuring a CBR. This may correspond to the case 3 and the case 4 in [Table 11].

According to this embodiment, a method in which the UE that has received CBR information reflects the CBR information to generate SL CSI information and feeds the SL CSI information back to the transmitting UE may be considered. As described above, the CBR is a value in which the UE measures whether a channel is congested in a predetermined time interval, and a congestion control may be performed using a CBR value. Further, when the receiving UE determines a parameter appropriate for a channel situation in consideration of such a congestion situation upon generating SL CSI information and feeds the parameter back to the transmitting UE, it may be more valid information for the transmitting UE to select a transmission parameter. However, according to an environment of the transmitting UE and the receiving UE, a difference between a CBR measured by the transmitting UE and a CBR measured by the receiving UE may occur. Therefore, as in this embodiment, a method of transmitting CBR information of the transmitting UE to the receiving UE may be considered.

For example, the transmitting UE may transmit 16 CBR levels with 4 bits of information. Considering V2V in a sidelink communication environment, channel congestion information may change rapidly according to a movement of a transmission vehicle. Therefore, in consideration of this, a method in which the transmitting UE transmits CBR information measured by the transmitting UE to the receiving UE through SCI may be considered. In contrast, a method in which the transmitting UE transmits CBR information to the receiving UE through PC5-RRC may be considered on the assumption that congestion information of the channel does not change quickly. In the above embodiment, a method of transmitting a CBR level with CBR information has been described as an example, but the disclosure is not limited thereto, and a method of transmitting a CBR measurement result is also possible.

First, when CBR information of the transmitting UE is signaled to the receiving UE, a method and operation in which the receiving UE reflects the CBR information to generate SL CSI information will be described. In this embodiment, CQI and RI are considered as SL CSI information. However, in the disclosure, SL CSI information is not limited to CQI and RI. According to the disclosure, a selection range of selectable SL CSI parameters according to a CBR level may be (pre-)configured. This may be a value stored in advance in the UE or may be a value configured by the base station through an SL-SIB or Uu-RRC. Alternatively, it may be a value to be configured through PC5-RRC of the UE.

Therefore, referring to [Table 12], when the CBR level is determined, a selection range of the corresponding SL CSI parameter may be determined. First, a case in which the receiving UE is a UE capable of measuring a CBR and a case in which the receiving UE is a UE incapable of measuring a CBR will be separately described. When the receiving UE is a UE incapable of measuring a CBR, the receiving UE may determine CSI (CQI/RI) within a selection range for CQI and RI determined based on a CBR level received from the transmitting UE.

In contrast, when the receiving UE is a UE capable of measuring a CBR, the receiving UE may determine a CBR level using both a CBR level (RX) measured by the receiving UE and a CBR level (TX) received from the transmitting UE. For example, a CBR level may be determined based on Max (CBR level (TX), CBR level (RX)), and CSI (CQI/RI) may be determined within a selection range for CQI and RI determined based on the CBR level. However, the CBR determination method is only an example of a method of determining a CBR level and is not limited thereto. For example, although a method using a maximum value has been described above, a method using a minimum value may be considered. Alternatively, a method using an average value may be considered.

Further, the transmitting UE may transmit a CBR value other than a CBR level, and the receiving UE may determine a CBR level using an average, a weighted average, and the like with a CBR value measured by itself.

Hereinafter, when the receiving UE reports SL CSI that reflects CBR information to the transmitting UE, a method and operation for the transmitting UE to determine a transmission parameter may use one of 'methods for the transmitting UE to select a transmission parameter for SL CSI reporting' in the above-described embodiment 4.

Embodiment 7

In the embodiment 7 of the disclosure, among methods in which a transmitting UE and a receiving UE exchange CBR information, a method of transmitting CBR information of the receiving UE to the transmitting UE is considered. In this case, a method in which the receiving UE reports SL CSI to the transmitting UE and in which the transmitting UE determines a transmission parameter will be described. It is assumed that the receiving UE is a UE capable of measuring a CBR. It may correspond to the case 2 and the case 4 in [Table 11].

According to this embodiment, a method of generating SL CSI information and feeding the SL CSI information back to the transmitting UE by reflecting a CBR measured by the receiving UE may be considered. Further, the transmitting UE may reflect SL CSI and CBR information received from the receiving UE to determine a transmission parameter.

First, when the receiving UE measures the CBR, a method in which the receiving UE generates SL CSI information by reflecting the CBR will be described. In this embodiment, CQI and RI are considered as SL CSI information. However, in the disclosure, SL CSI information is not limited to CQI and RI. According to the disclosure, a selection range of selectable SL CSI parameters according to a CBR level may be (pre-)configured. This may be a value stored in advance in the UE or may be a value configured by the base station through an SL-SIB or Uu-RRC. Alternatively, it may be a value to be configured through PC5-RRC of the UE.

Therefore, referring to [Table 12], the receiving UE may determine CSI (CQI/RI) within a selection range of CQI and RI determined based on the determined CBR level. As described above, the CBR is a value in which the UE measures whether a channel is congested in a predetermined time interval, and congestion control may be performed using the CBR value. In this way, when the receiving UE selects a parameter appropriate for a channel situation in consideration of such a congestion situation upon generating SL CSI information and feeds the parameter back to the transmitting UE, it may be more valid information for the transmitting UE to select a transmission parameter. However, according to an environment of the transmitting UE and the receiving UE, a difference between a CBR measured by the transmitting UE and a CBR measured by the receiving UE may occur. Therefore, as in this embodiment, a method of transmitting CBR information of the receiving UE to the transmitting UE may be considered.

For example, 16 CBR levels may be transmitted with 4 bits of information. When the receiving UE feeds back SL CSI information to the transmitting UE, the receiving UE may feed back together CBR information thereof. This may be interpreted that CBR information is included in SL CSI information. According to the above-described method, as a method of transmitting SL CSI, a method was considered in which SL CSI is piggybacked and transmitted through a PSSCH together with data, in which SL CSI is transmitted through a PSSCH without data (transmit only SL CSI), or in which SL CSI is transmitted through a PSFCH. CBR information may also be transmitted through the transmission channel together with SL CSI information. Alternatively, a method in which the receiving UE transmits CBR information to the transmitting UE through PC5-RRC may be considered on the assumption that congestion information of the channel does not change quickly. In the above embodiment, a method of transmitting a CBR level with CBR information has been described as an example, but the disclosure is not limited thereto, and a method of transmitting a CBR value is also possible.

Further, the receiving UE may transmit CBR information according to a request or configuration of the transmitting UE separately from transmission of CSI information.

Hereinafter, when the receiving UE reports SL CSI that reflects CBR information to the transmitting UE and feeds back the CBR information, a method and operation for the transmitting UE to determine transmission parameters may use one of 'methods in which the transmitting UE selects a transmission parameter for SL CSI reporting' of the above-described embodiment 4.

Embodiment 8

In the embodiment 8 of the disclosure, among methods in which a transmitting UE and a receiving UE exchange CBR information, a method in which the transmitting UE and the receiving UE exchange CBR information with each other is considered. In this case, a method in which the receiving UE reports SL CSI to the transmitting UE and in which the transmitting UE determines transmission parameters will be described. It is assumed that both the transmitting UE and the receiving UE are UEs capable of measuring CBR. It may correspond to the case 4 in [Table 11].

According to this embodiment, a method of generating SL CSI information and feeding the SL CSI information back to the transmitting UE by reflecting a CBR measured by the receiving UE and CBR information transmitted by the transmitting UE may be considered. Further, the transmitting UE may reflect a CBR measured by itself and SL CSI and CBR information received from the receiving UE to determine a transmission parameter.

As described above, the CBR is a value in which the UE measures whether the channel is congested in a predetermined time interval, and congestion control may be performed using a CBR value. Further, when the receiving UE selects a parameter appropriate for a channel situation in consideration of such a congestion situation upon generating SL CSI information and feeds the parameter back to the transmitting UE, it may be more valid information for the transmitting UE to select a transmission parameter. However, according to an environment of the transmitting UE and the receiving UE, a difference between a CBR measured by the transmitting UE and a CBR measured by the receiving UE may occur. Therefore, as in this embodiment, a method in which the transmitting UE and the receiving UE exchange CBR information may be considered.

For example, 16 CBR levels may be transmitted with 4 bits of information. Assuming that congestion information of the channel does not change quickly, a method in which the transmitting UE and the receiving UE exchange CBR information through PC5-RRC may be considered. Alternatively, when V2V is considered in a communication environment of the sidelink, the congestion information of the channel may change rapidly according to a movement of a transmission vehicle. Therefore, in consideration of this, a method in which the transmitting UE transmits CBR information to the receiving UE through SCI may be considered. In the above embodiment, a method of transmitting a CBR level with CBR information has been described as an example, but the disclosure is not limited thereto, and a method of transmitting a CBR value is also possible.

When CBR information of the transmitting UE is transmitted to the receiving UE through SCI, the receiving UE that has received the CBR information may feed back the CBR information thereof to the transmitting UE. A method in which the receiving UE is piggybacked and transmitted through a PSSCH to feed back CBR information to the transmitting UE, transmitted through a PSSCH without data, or transmitted through a PSFCH may be considered. Alternatively, when SL CSI is fed back, CBR information of the receiving UE may be fed back together. This may be interpreted as a CBR being included in SL CSI information.

First, when CBR information of the transmitting UE is signaled to the receiving UE, a method and operation in which the receiving UE reflects the CBR information and generates SL CSI information will be described. In this embodiment, CQI and RI are considered as SL CSI information. However, in the disclosure, SL CSI information is not limited to CQI and RI. According to the disclosure, a selection range of selectable SL CSI parameters according to a CBR level may be (pre-)configured. This may be a value stored in advance in the UE or may be a value configured by the base station through an SL-SIB or Uu-RRC. Alternatively, it may be a value to be configured through PC5-RRC of the UE.

Therefore, referring to [Table 12], when the CBR level is determined, a selection range of the corresponding SL CSI parameter may be determined. According to the assumption of this embodiment, a CBR level may be determined using both a CBR level (RX) measured by the receiving UE and a CBR level (TX) received from the transmitting UE. For example, a CBR level may be determined based on Max (CBR level (TX), CBR level (RX)), and CSI (CQI/RI) may be determined within a selection range of CQI and RI determined based on the CBR level.

Thereafter, the transmitting UE may reflect a CBR measured by itself, the SL CSI and CBR information received from the receiving UE to determine a transmission parameter, and in the embodiment 4, one of 'methods for the transmitting UE to select the transmission parameter for SL CSI reporting' may be used. However, in this case, the transmitting UE may determine a CBR level using both a CBR level (TX) according to a CBR measured by itself and a CBR level (RX) measured by the receiving UE. For example, when a CBR level is determined based on Max (CBR level (TX), CBR level (RX)) and a priority of a packet to be transmitted is known, the corresponding transmission parameter SL-PSSCH-TxParameters (see [Table 8]) may be determined. However, the CBR determination method is only an example of a method of determining a CBR level and the disclosure is not limited thereto. For example, although a method using a maximum value has been described above, a method using a minimum value may be considered. Alternatively, a method using an average value may be considered.

Further, the receiving UE or the transmitting UE may transmit a CBR value other than a CBR level, and the receiving UE may determine a CBR level using an average, a weighted average, and the like with a CBR value measured by itself.

The embodiments 1 to 8 may be interpreted in combination. That is, the method of the disclosure may be implemented in combination with part or all of the contents included in each embodiment within a range that does not impair the essence of the disclosure.

For example, even when both the transmitting UE and the receiving UE have a CBR capability, the transmitting UE may not reflect the CBR measurement result and transmit the CBR measurement result to the receiving UE, and may determine a transmitting parameter using the CBR measurement result and CSI received from the receiving UE.

Further, as described above, the transmission parameter may be determined in consideration of both the CBR measurement result received from the receiving UE and the CBR measurement result measured by the transmitting UE. In this case, as described above, the transmitting UE may request and receive the CBR measurement result or may receive the CBR measurement result without a separate request when the receiving UE has a CBR measurement capability.

Accordingly, a method of the transmitting UE of the disclosure may include steps of receiving channel busy ratio (CBR) information and channel state information (CSI) determined based on the CBR information from the receiving UE, determining a transmission parameter based on the CSI, and transmitting the transmission parameter to the receiving UE.

In this case, the CBR is determined by a ratio of sub-channels in which received signal strength exceeds a pre-determined threshold in a resource pool, and the CBR information may include a CBR level determined based on the CBR measurement result.

Further, the step of determining the transmission parameter includes step of determining an MCS value corresponding to a channel quality indicator (CQI) included in the CSI and the number of transmission layers corresponding to a rank indicator (RI), wherein the CQI and the RI may be determined based on a range of the RI and a range of the CQI determined by the CBR information.

Further, in step of receiving the CSI, before receiving the CSI, when the transmitting UE has a CBR measurement capability, the transmitting UE may measure a CBR and transmit the CBR measurement result, and the CBR information may be determined based on the CBR measurement result of the transmitting UE and the CBR measurement result of the receiving UE.

Further, the CBR information may be determined based on at least one of a maximum value, a minimum value, or an average value of a CBR level corresponding to the CBR measurement result of the transmitting UE and a CBR level corresponding to the CBR measurement result of the receiving UE.

Embodiment 9

In the embodiment 9 of the disclosure, an operation in which the UE performs RLM/RLF in the sidelink will be described. When describing RLM/RLF for an Uu link between the base station and the UE, the receiving UE performs radio link monitoring (RLM) on a link state using a reference signal transmitted by the base station, and accordingly, when the receiving UE transmits a link state for in synchronization (ISYout of synchronization (OOS) to an upper layer of the UE, the UE may determine a radio link failure (RLF) based on the link state. When the UE identifies the RLF in the Uu link between the base station and the UE, in order to recover again the link, a procedure for the UE to find the base station again may be performed.

In the disclosure, an expression that RLM/RLF is performed or an RLM/RLF operation may mean a process of performing RLM to determine whether it is RLF.

In the case of an LTE Uu link, a cell-specific reference signal (CRS) was used as a reference signal for RLM, and in the case of an NR Uu link, a synchronization signal block (SSB) or CSI-RS may be used as a reference signal for RLM. A method of determining RLM/RLF in the sidelink may be different from a method of determining RLM/RLF in the Uu link.

First, in the sidelink, RLM/RLF may be performed only in unicast. Further, a reference signal for the receiving UE to perform RLM/RLF may not be transmitted periodically. Finally, when the receiving UE does not transmit a reference signal to the transmitting UE, it may be difficult for the transmitting UE to perform RLM/RLF. In this embodiment, an RLM/RLF execution operation is specifically proposed in consideration of problems that occur in supporting RLM/RLF in the sidelink, as described above.

First, according to a method in which broadcast, unicast, and groupcast transmissions are distinguished in the sidelink, a method in which RLM/RLF is configured and operated may vary. First, conditions for determining unicast transmission in order to perform RLM/RLF are presented below.

[Prerequisites for Performing RLM/RLF]
* Condition 1: A transmission method of broadcast, unicast, and groupcast may be distinguished through a resource pool. In other words, it is a case in which a transmission method of one or more of broadcast, unicast, and groupcast are not used simultaneously in one resource pool. In this case, only an UE using a resource pool configured to unicast may perform RLM/RLF.
* Condition 2: When a transmission method of one or more of broadcast, unicast, and groupcast are used simultaneously in one resource pool, a transmission method may be distinguished through a resource pool configuration. Specifically, information on which transmission method is used may be included in the resource pool configuration, and the resource pool configuration may be indicated by an SIB, (pre-)configured, or overwritten by RRC information. In this case, only an UE whose transmission method is configured to unicast in the resource pool configuration may perform RLM/RLF.
* Condition 3: A transmission method of broadcast, unicast, and groupcast may be distinguished by an SCI format or by a field distinguishing transmission methods included in SCI. A method classified by the SCI format is a possible method when each transmission method is distinguished by the SCI format. Alternatively, by including information of a predetermined number of bits (e.g., 2 bits) in the SCI, a transmission method may be distinguished and indicated. In this case, when a UE that has received the SCI identifies a transmission method from the SCI and the transmission method is configured to unicast, the UE may perform RLM/RLF.
** In case of the condition 3, a transmission method of broadcast, unicast, and groupcast may be used together with a method distinguished by a DCI format or by a field identifying a transmission method included in DCI. The method classified by the DCI format is a possible method when each transmission method is distinguished by the DCI format. Alternatively, by including information of a predetermined number of bits (e.g., 2 bits) in the DCI, a current transmission method may be distinguished and indicated. In this case, even when each transmission method is not distinguished by the DCI format, the transmission method may be distinguished using a predetermined number of bits.

In this case, when the UE identifies a transmission method based on DCI and the transmission method is configured to unicast, the UE may perform RLM/RLF. Further, the corresponding UE may signal the corresponding transmission method to another UE through SCI.
* Condition 4: A transmission method of broadcast, unicast, and groupcast may be distinguished by a higher layer. A detailed method of distinguishing a transmission method by an upper layer will be described below, and a method corresponding to the condition 4 in the disclosure is not limited to the following methods. In general, when a transmission method is classified by a higher layer, it may be included in the condition 4.
** As one method of the condition 4, a transmission method of broadcast, unicast, and groupcast may be distinguished through a destination L2 ID included in an MAC PDU transmitted from an application layer. In this case, only an UE that has received the MAC PDU in which the destination L2 ID is configured to unicast may perform RLM/RLF.
** As another method of the condition 4, a transmission method of broadcast, unicast, and groupcast is distinguished through a PC5-RRC configuration. In this case, only an UE configured to perform RLM/RLF with PC5-RRC may perform RLM/RLF.

When the method is determined as a unicast transmission method, as described above, a prerequisite for performing RLM/RLF is satisfied, and RLM/RLF is performed, a method of performing RLM/RLF will be described in detail.

First, when the UE performs RLM/RLF, a related operation is performed within the sidelink BWP. When a plurality of sidelink BWPs are supported to be configured, the UE may perform an RLM/RLF-related operation such as a measurement operation of a link state only in an active sidelink BWP. That is, the UE may not perform a sidelink RLM/RLF operation in the BWP other than the active sidelink BWP.

In the sidelink, a UE may be a transmitting UE or a receiving UE at any time. When bidirectional communication between UEs is performed, that is, when UEs transmit and receive signals to each other, both UEs have received signals; thus, the UE may perform RLM/RLF using the received signals.

However, when unidirectional communication is performed, that is, when only one UE transmits a signal and the other UE only receives a signal, the transmitting UE performing transmission does not receive a signal for the corresponding link. Therefore, in order for the transmitting UE to perform RLM/RLF, a method different from the case of bidirectional communication may be required.

First, a method in which a receiving UE performs RLM/RLF using a data signal received from a transmitting UE on the assumption of bidirectional communication may be considered as follows.

[Method for the Receiving UE to Perform RLM/RLF when there is a Received Data Signal]
* When a data signal is received, signals usable for performing RLM/RLF may include an SSB, PSCCH DMRS, PSSCH DMRS, SL PTRS, and SL CSI-RS.
** When one or more signals may be used for RLM/RLF (i.e., when RLM/RLF is supported), information on which signal to use may be configured. Corresponding information may be configured as resource pool information, and the resource pool configuration may be indicated by an SIB, (pre-)configured, or overwritten with RRC information.
** When the signal is used, a statistical PSSCH error probability may be obtained by determining reference signal received power (RSRP) of the received signal. When a link state for IS/OOS is transmitted to the upper layer of the UE through the PSSCH error probability, the UE may determine the RLF based on the link state.
* By identifying success/failure through PSCCH decoding, RLM/RLF may be performed.
** In the case of this method, in order to derive an error probability of the PSCCH from success/failure through PSCCH decoding, it is necessary to obtain statistics by receiving the PSCCH several times. When a link state for IS/OOS is transmitted to an upper level of the UE through the PSSCH error probability, the UE may determine the RLF based on the link state.
* A method of transmitting a dummy signal through a PSCCH, PSSCH, or PSCCH/PSSCH even if actual scheduling is not received may be considered.
** The above method may be a method of performing RLM/RLF when there is no periodically transmitted signal. Further, a detailed method of performing RLM/RLF when the dummy signal is received through the PSCCH/PSSCH may be similar to an operation of determining IS/OOS using the received signal described above.

Next, a method for the transmitting UE to perform RLM/RLF when there is no received data signal in consideration of unidirectional communication may be considered as follows.

[Method for the Transmitting UE to Perform RLM/RLF when there is No Received Data Signal]
* When no ACK is received for a predetermined time or the number of retransmissions exceeds a predetermined threshold using an acknowledged mode (AM) in an RLC layer (or RLC entity), RLF may be declared.
* When continuous NACK is received using HARQ ACK/NACK in the physical layer or when feedback is not received for a predetermined time after feedback has been previously received, RLF may be declared.
** In the case of declaring RLF by counting the number of consecutive NACKs, when a threshold of the number of consecutive NACK receptions is determined and continuous NACKs greater than or equal to the threshold (X≥1) are received for a predetermined time, conditions of RLF declaration may be determined. Further, the number of consecutive NACKs is counted within a predetermined time, and when a predetermined time has elapsed, the accumulated counting may be reset.
* In the case of using SL CSI reporting in the physical layer, when the CQI index indicates 0 or when CSI reporting is not received for a predetermined time after feedback has been previously received, RLF may be declared.
 SL CSI reporting may include information such as CQI and RI. The CQI index having a value of 0 indicates that a current channel state is in out-of-range. RLF may be determined by indicating the CQI index 0, for example, when a threshold of the number of times reception of the CQI index 0 is determined and when a CQI equal to or greater than the threshold (X≥1) indicates an index 0** for a predetermined time, the condition of RLF declaration may be determined. Further, when the number of times in which the CQI index indicates 0 within a predetermined time is counted, and when the predetermined time has elapsed, the accumulated counting may be reset.

In the method, information on a threshold and a predetermined time may be configured. In one method of configuring the threshold and information on the predetermined time, the information may be configured as resource pool information, and the resource pool configuration may be indicated by an SIB, (pre-)configured, or overwritten with RRC information.

The following two cases may be considered for performing RLM/RLF when it is determined as unicast transmission and prerequisites for performing RLM/RLF are satisfied. First, a method of always performing RLM/RLF by assuming that all UEs corresponding to prerequisites perform RLM/RLF as a default feature may be considered, and alternatively, RLM/RLF may be enabled/disabled by a configuration, and a method in which RLM/RLF is performed only when RLM/RLF is enabled may be considered. In order for perform a process of performing RLM/RLF as a default feature, the following conditions should be satisfied.

[When a Process of Performing RLM/RLF by the Receiving UE when there is a Received Data Signal is Performed as a Default Feature]
* When a data signal is received, signals usable for performing RLM/RLF may include an SSB, PSCCH DMRS, PSSCH DMRS, SL PTRS, and SL CSI-RS.
** In order for perform a process of performing RLM/RLF by default, at least one of the signals may be configured to default and transmitted periodically, or when at least one of the signals is not transmitted periodically, at least one of the signals may be transmitted together with PSCCH/PSSCH transmission. For example, in a case in which a periodic SL CSI-RS is not supported, when an SL CSI-RS is used for performing RLM/RLF, the SL CSI-RS should always be transmitted together when a PSSCH is transmitted.
* A method of transmitting a dummy signal through a PSCCH, a PSSCH, or a PSCCH/PSSCH even if actual scheduling is not received may be considered.

[When a Process of Performing RLM/RLF by the Transmitting UE in a Case in which there is No Received Data Signal is Performed as a Default Feature]
* Because HARQ ACK/NACK or SL CSI reporting cannot be used as a default feature in the sidelink, only AM in an RLClayer may be used in this case.

Next, a case in which RLM/RLF is enabled/disabled by a configuration may be considered. Further, when RLM/RLF is enabled, it may be interpreted that an RLM/RLF operation is activated, and when RLM/RLF is enabled, introduction of additional signaling for activating an RLM/RLF operation may be considered. First, in a method of configuring RLM/RLF to be enabled/disabled, the corresponding information may be configured as resource pool information, and the resource pool configuration may be indicated by an SIB, (pre-)configured, or overwritten with RRC information. Alternatively, the following conditions in which RLM/RLF is enabled or activated in an indirect method, as illustrated below may be considered.
* When an SL CSI-RS is used for an RLM/RLF operation, if the SL CSI-RS is transmitted, it is determined that RLM/RLF is enabled/activated, or
* When SL CSI reporting is enabled, it is determined that RLM/RLF is enabled/activated, or
* When HARQ ACK/NACK reporting is enabled, it is determined that RLM/RLF is enabled/activated.

In other words, when the above condition is not satisfied, it may be determined that RLM/RLF is disabled. The method may be applied to both the transmitting UE and the receiving UE. In other words, the method may be applied to a transmitting UE that does not receive data in unidirectional communication. Similarly, the following conditions may be considered in a method in which RLM/RLF is enabled or activated.
* When SL CSI reporting is activated, it is determined that RLM/RLF is enabled/activated, or
* When HARQ ACK/NACK reporting is activated, it is determined that RLM/RLF is enabled/activated.

A method in which SL CSI reporting is activated or HARQ ACK/NACK reporting is activated is indicated through SCI; thus, it may be determined that the RLM/RLF is activated. In other words, because the UE receives SCI and determines enabling/activation of RLM/RLF according to whether SL CSI reporting or HARQ ACK/NACK is activated, the method may be applied only to the receiving UE that receives the SCI.

Finally, when the UE performs an RLM/RLF operation to declare RLF, the following procedure may be considered for link recovery. A UE corresponding to the receiving end may declare RLF and perform one or more of the following procedures for link recovery.

* The UE corresponding to the receiving end stops sidelink transmission.
** Sidelink transmission to be canceled (released) may include one or more of the following cases.
*** Semi-persistent scheduling (SPS), channel quality indicator (CQI), channel state information (CSI) feedback, HARQ feedback, sounding reference signal (SRS), and scheduling request (SR)
* The UE corresponding to the receiving end may perform one or more of the following methods for sidelink recovery and re-establishment.
** The UE corresponding to the receiving end notifies the base station that it is in an RLF state.
** The UE corresponding to the receiving end requests the base station to cancel the corresponding link.
** The UE corresponding to the receiving end attempts to transmit an SL SS/PBCH block.

In contrast, a UE corresponding to the transmitting end may declare RLF and perform one or more of the following procedures for the next link recovery.

* The UE corresponding to the transmitting end stops sidelink transmission.
** In this case, the UE may instruct a request to send a keep alive message to an upper layer before stopping transmission.
* The UE corresponding to the transmitting end performs sidelink transmission in a fallback mode.
* The UE corresponding to the transmitting end may perform one or more of the following methods for sidelink recovery and re-establishment.
** The UE corresponding to the transmitting end notifies the base station that it is in an RLF state.
** The UE corresponding to the transmitting end requests the base station to cancel the corresponding link.
*** In the case of platooning, it is possible to request replacement of a leader UE.
** The UE corresponding to the receiving end attempts to transmit the SL SS/PBCH block.

Figure 11:
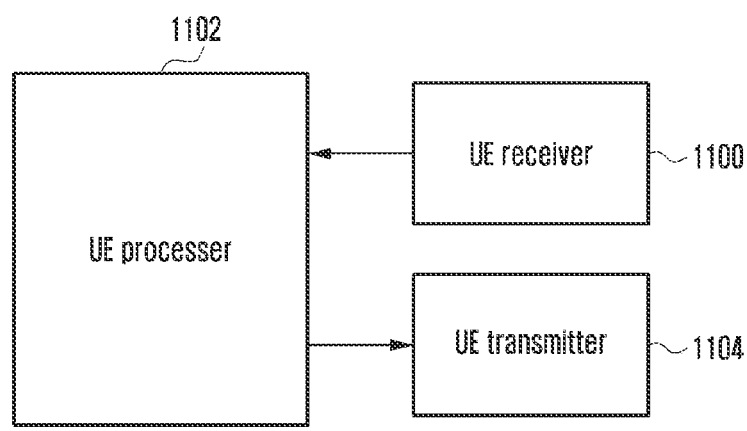
FIG. 11 is a block diagram illustrating an internal structure of a UE according to an embodiment of the disclosure.
Figure 12:
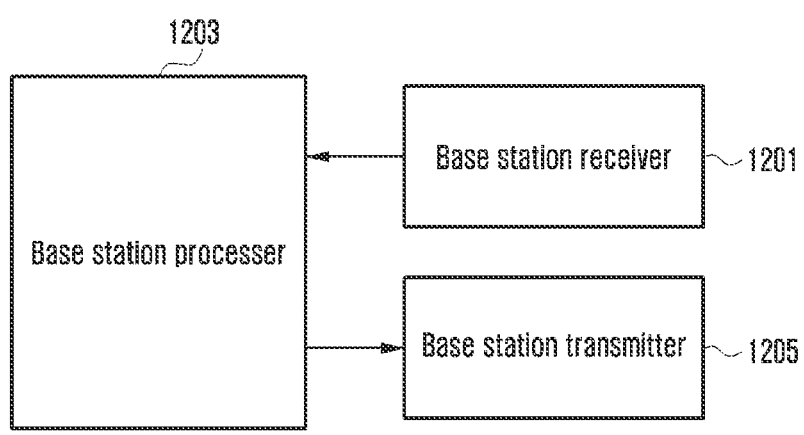
FIG. 12 is a block diagram illustrating an internal structure of a base station according to an embodiment of the disclosure.

In order to carry out the above embodiments of the disclosure, a transmitter, a receiver, and a processor of the UE and the base station are illustrated in FIGS. 11 and 12, respectively. In the above embodiment, in a process in which a vehicle UE supporting vehicle communication exchanges information using a sidelink with another vehicle UE and a pedestrian portable UE, a method in which the receiving UE measures a channel state and reports the channel state to the transmitting UE, and an operation of the UE are illustrated, and in order to perform this, the receiver, processor, and transmitter of the base station and the UE, respectively should operate according to the embodiment.

Specifically, FIG. 11 is a block diagram illustrating an internal structure of a UE according to an embodiment of the disclosure.

As illustrated in FIG. 11, the UE of the disclosure may include a UE receiver 1100, a UE transmitter 1104, and a UE processor 1102. The UE receiver 1100 and the UE transmitter 1104 may be collectively referred to as a transceiver in the embodiment of the disclosure.

The transceiver may transmit and receive a signal to and from the base station. The signal may include control information and data. To this end, the transceiver may include an RF transmitter for up-converting and amplifying a frequency of a signal to be transmitted, and an RF receiver for low-noise amplifying a received signal and down-converting a frequency thereof. Further, the transceiver may receive a signal through a wireless channel, output the signal to the UE processer 1102, and transmit the signal output from the UE processer 1102 through a wireless channel.

The UE processor 1102 may control a series of processes so that the UE may operate according to the above-described embodiment of the disclosure.

FIG. 12 is a block diagram illustrating an internal structure of a base station according to an embodiment of the disclosure.

As illustrated in FIG. 12, the base station of the disclosure may include a base station receiver 1201, a base station transmitter 1205, and a base station processor 1203. The base station receiver 1201 and the base station transmitter 1205 may be collectively referred to as a transceiver in the embodiment of the disclosure.

The transceiver may transmit and receive a signal to and from the UE. The signal may include control information and data. To this end, the transceiver may include an RF transmitter for up-converting and amplifying a frequency of a signal to be transmitted, and an RF receiver for low-noise amplifying a received signal and down-converting a frequency thereof. Further, the transceiver may receive a signal through a wireless channel, output the signal to the base station processor 1203, and transmit the signal output from the base station processor 1203 through the wireless channel.

The base station processor 19203 may control a series of processes so that the base station may operate according to the above-described embodiment of the disclosure.

In the drawings illustrating the method of the disclosure, the order of description does not necessarily correspond to the order of execution, and the sequence relationship may be changed or may be executed in parallel.

Alternatively, some components may be omitted and only some components may be included in the drawings illustrating the method of the disclosure within a range that does not impair the essence of the disclosure.

Further, the method of the disclosure may be implemented in a combination of part or all of contents included in each embodiment within a range that does not impair the essence of the disclosure.

In the specific embodiments of the disclosure described above, elements included in the disclosure are expressed in the singular or plural according to the presented specific embodiments. However, the singular or plural expression is appropriately selected for the situation presented for convenience of description, and the disclosure is not limited to the singular or plural element, and even if the element is expressed in the plural, it may be configured with the singular, or even if the element is expressed in the singular, it may be configured with the plural.

In the detailed description of the disclosure, although specific embodiments have been described, various modifications are possible without departing from the scope of the disclosure. Therefore, the scope of the disclosure should not be limited to the described embodiments and should be defined by the claims described below and equivalents to the claims.

The invention claimed is:

1. A method performed by a transmitting UE in a wireless communication system, the method comprising:
   receiving, from a receiving UE, channel busy ratio (CBR) information and channel state information (CSI) determined based on the CBR information;
   determining a transmission parameter based on the CSI; and
   transmitting the transmission parameter to the receiving UE.

2. The method of claim 1, wherein the CBR is determined by a ratio of subchannels in which received signal strength exceeds a predetermined threshold in a resource pool, and
   the CBR information includes a CBR level determined based on a CBR measurement result.

3. The method of claim 1, wherein determining a transmission parameter comprises determining the number of transmission layers corresponding to a rank indicator (RI) and a modulation and coding scheme (MCS) value corresponding to a channel quality indicator (CQI) included in the CSI, and
   wherein the CQI and RI are determined based on a range of the CQI and a range of the RI determined by the CBR information.

4. The method of claim 1, wherein receiving CBR information and channel state information (CSI) comprises:
   measuring a CBR, when the transmitting UE has a CBR measurement capability before receiving the CSI; and
   transmitting a CBR measurement result,
   wherein the CBR information is determined based on the CBR measurement result of the transmitting UE and a CBR measurement result of the receiving UE, and
   the CBR information is determined based on at least one of a maximum value, a minimum value, or an average value of a CBR level corresponding to the CBR measurement result of the receiving UE and a CBR level corresponding to the CBR measurement result of the transmitting UE.

5. A method performed by a receiving UE in a wireless communication system, the method comprising:
   determining channel state information (CSI) based on channel busy ratio (CBR) information;
   transmitting the CSI; and
   receiving a transmission parameter determined based on the CSI.

6. The method of claim 5, wherein the CBR is determined by a ratio of subchannels in which received signal strength exceeds a predetermined threshold in a resource pool, and
   the CBR information includes a CBR level determined based on a CBR measurement result.

7. The method of claim 5, wherein the transmission parameter includes a modulation and coding scheme (MCS) value corresponding to a channel quality indicator (CQI) included in the CSI and the number of transmission layers corresponding to a rank indicator (RI), and
   the CQI and RI are determined based on a range of the CQI and a range of the RI determined by the CBR information.

8. The method of claim 5, wherein determining channel state information (CSI) comprises
   receiving a CBR measurement result when a transmitting UE has a CBR measurement capability,
   wherein the CBR information is determined based on the CBR measurement result of the transmitting UE and a CBR measurement result of the receiving UE, and
   the CBR information is determined based on at least one of a maximum value, a minimum value, or an average value of a CBR level corresponding to the CBR measurement result of the receiving UE and a CBR level corresponding to the CBR measurement result of the transmitting UE.

9. A transmitting UE in a wireless communication system, the transmitting UE comprising:
   a transceiver; and
   a controller configured to:
   receive channel busy ratio (CBR) information and channel state information (CSI) determined based on the CBR information from a receiving UE,
   determine a transmission parameter based on the CSI, and
   transmit the transmission parameter to the receiving UE.

10. The transmitting UE of claim 9, wherein the CBR is determined by a ratio of subchannels in which received signal strength exceeds a predetermined threshold in a resource pool, and
    the CBR information includes a CBR level determined based on a CBR measurement result.

11. The transmitting UE of claim 9, wherein the controller is configured to determine the number of transmission layers corresponding to a rank indicator (RI) and a modulation and coding scheme (MCS) value corresponding to a channel quality indicator (CQI) included in the CSI, and
    the CQI and RI are determined based on a range of the CQI and a range of the RI determined by the CBR information.

12. The transmitting UE of claim 9, wherein the controller is configured to:
    measure a CBR, when the transmitting UE has a CBR measurement capability, before receiving the CSI, and
    transmit a CBR measurement result,
    wherein the CBR information is determined based on the CBR measurement result of the transmitting UE and a CBR measurement result of the receiving UE, and
    the CBR information is determined based on at least one of a maximum value, a minimum value, or an average value of a CBR level corresponding to the CBR measurement result of the receiving UE and a CBR level corresponding to the CBR measurement result of the transmitting UE.

13. A receiving UE in wireless communication system, the receiving UE comprising:
    a transceiver; and
    a controller configured to:
    determine channel state information (CSI) based on channel busy ratio (CBR) information,
    transmit the CSI, and
    receive a transmission parameter determined based on the CSI.

14. The receiving UE of claim 13, wherein the CBR is determined by a ratio of subchannels in which received signal strength exceeds a predetermined threshold in a resource pool,
    the CBR information includes a CBR level determined based on a CBR measurement result,
    the transmission parameter includes a modulation and coding scheme (MCS) value corresponding to a channel quality indicator (CQI) included in the CSI and the number of transmission layers corresponding to a rank indicator (RI), and
    the CQI and RI are determined based on a range of the CQI and a range of the RI determined by the CBR information.

15. The receiving UE of claim 13, wherein the controller receives a CBR measurement result when a transmitting UE has a CBR measurement capability, the CBR information is determined based on the CBR measurement result of the transmitting UE and a CBR measurement result of the receiving UE, and the CBR information is determined based on at least one of a maximum value, a minimum value, or an average value of a CBR level corresponding to the CBR measurement result of the receiving UE and a CBR level corresponding to the CBR measurement result of the transmitting UE.

* * * * *